United States Patent
Liu et al.

(10) Patent No.: US 12,407,469 B2
(45) Date of Patent: Sep. 2, 2025

(54) PHASE TRACKING REFERENCE SIGNAL SENDING METHOD AND RECEIVING METHOD AND COMMUNICATION APPARATUS

(71) Applicant: HUAWEI TECHNOLOGIES CO., LTD., Shenzhen (CN)

(72) Inventors: Fengwei Liu, Chengdu (CN); Minghui Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 387 days.

(21) Appl. No.: 18/170,041

(22) Filed: Feb. 16, 2023

(65) Prior Publication Data

US 2023/0198715 A1 Jun. 22, 2023

Related U.S. Application Data

(63) Continuation of application No. PCT/CN2020/109647, filed on Aug. 17, 2020.

(51) Int. Cl.
H04L 5/00 (2006.01)

(52) U.S. Cl.
CPC ................... H04L 5/0051 (2013.01)

(58) Field of Classification Search
None
See application file for complete search history.

(56) References Cited

U.S. PATENT DOCUMENTS

| 2018/0091350 | A1 | 3/2018 | Akkarakaran et al. | |
| 2018/0205528 | A1* | 7/2018 | Bai | H04L 5/0092 |
| 2019/0149299 | A1 | 5/2019 | Lee et al. | |
| 2020/0178222 | A1* | 6/2020 | Wang | H04L 5/0051 |
| 2020/0235979 | A1* | 7/2020 | Yokomakura | H04W 88/02 |
| 2022/0094496 | A1* | 3/2022 | Xiong | H04W 72/0453 |

FOREIGN PATENT DOCUMENTS

| CN | 108111283 A | 6/2018 |
| CN | 108809598 A | 11/2018 |
| CN | 111095843 A | 5/2020 |
| EP | 3745620 A1 | 12/2020 |
| WO | 2019194577 A1 | 10/2019 |

OTHER PUBLICATIONS

CMCC, "Discussion on PT-RS design", 3GPP TSG RAN WG1 Meeting 90bis, Prague, CZ, Oct. 9-13, 2017, R1-1717882, 10 pages.
(Continued)

*Primary Examiner* — Diane L Lo
(74) *Attorney, Agent, or Firm* — Maier & Maier, PLLC

(57) ABSTRACT

A PTRS sending method and receiving method and a communication apparatus. The method includes: a terminal device sends first information to a network device, receives first indication information from the network device, and sends a DFT-s-OFDM symbol to which a PTRS is mapped to the network device. In the method, a rule for mapping the PTRS to a plurality of layers of the DFT-s-OFDM symbol is specified, to ensure phase noise estimation performance and improve a demodulation capability.

20 Claims, 13 Drawing Sheets

(56) References Cited

OTHER PUBLICATIONS

Huawei et al., "Further details of PTRS", 3GPP TSG RAN WG1 Meeting #90bis, Prague, Czech Republic, Oct. 9-13, 2017, R1-1717306, 13 pages.
Huawei et al., "Further details of PTRS", 3GPP TSG RAN WG1 NR Ad-Hoc#3, Nagoya, Japan, Sep. 18-21, 2017, R1-1716724, 12 pages.
Samsung, "Evaluations on pre-OFT PT-RS insertion", 3GPP TSG RAN WG1 Meeting 91, Reno, USA, Nov. 27-Dec. 1, 2017, R1-1720318, 4 pages.
Ericsson, "Feature lead summary 1 of PT-RS", 3GPP TSG RAN WG1 Meeting #92, Athens, Greece, Feb. 26-30, 2018, R1-1803245, 17 pages.

\* cited by examiner

PHASE TRACKING REFERENCE SIGNAL SENDING METHOD AND RECEIVING METHOD AND COMMUNICATION APPARATUS

CROSS-REFERENCE TO RELATED APPLICATIONS

This application is a continuation of International Application No. PCT/CN2020/109647, filed on Aug. 17, 2020, the disclosure of which is hereby incorporated by reference in its entirety.

TECHNICAL FIELD

The embodiments relate to the field of wireless communication technologies, a phase tracking reference signal sending method, a receiving method, and a communication apparatus.

BACKGROUND

In a new generation wireless communication network (for example, a 5th generation mobile network (5G) or 6th generation mobile network (6G) communication network), an operating band of a system is higher than 6 GHz, for example, bands such as 28 GHz, 39 GHz, 60 GHz, and 73 GHz, and a high throughput may be implemented. However, as an operating band increases, phase noise and a center frequency offset (CFO) increase, a phase error caused to a transmit signal also increases, and demodulation performance of a system deteriorates.

A phase compensation reference signal (PCRS) is used for estimating the phase noise, and phase noise error compensation is performed through the estimated phase noise, to improve communication quality. The PCRS may also be referred to as a phase tracking reference signal (PTRS) or PT-RS, which are collectively referred to as a PTRS hereinafter for ease of description.

A transmitting end may send the PTRS to a receiving end according to a mapping rule of the PTRS. It should be understood that the mapping rule of the PTRS may be used for indicating a mapping location of the PTRS on a time-frequency resource, and the receiving end also receives the PTRS based on the mapping rule. In a new radio (NR) technology, the PTRS is mapped to a cyclic prefix-orthogonal frequency division multiplexing (CP-OFDM) waveform, and the PTRS is also mapped to a discrete fourier transformation-spread-OFDM (DFT-s-OFDM) waveform. For the CP-OFDM waveform, a mapping rule for mapping the PTRS to one layer or a plurality of layers of a CP-OFDM symbol has been specified. However, for the DFT-s-OFDM, there is no mapping rule for mapping the PTRS to a plurality of layers of a DFT-s-OFDM symbol.

SUMMARY

The embodiments may provide a PTRS sending method and receiving method and a communication apparatus. A mapping rule for mapping a PTRS to a plurality of layers of a DFT-s-OFDM symbol may improve a system throughput.

According to a first aspect, a PTRS sending method is provided. The method may be performed by a first communication apparatus, and the first communication apparatus may be a communication device or a communication apparatus capable of supporting the communication device to implement functions required by the method, such as a chip system. An example in which the communication device is a terminal device is used below for descriptions. The method includes:

A terminal device sends first information to a network device, receives first indication information from the network device, and sends a DFT-s-OFDM symbol to which a PTRS is mapped to the network device, where the first information indicates a number of first PTRS ports, and the number of first PTRS ports is a number of ports recommended by the terminal device; the first indication information is used for determining mapping information of the PTRS on the DFT-s-OFDM symbol, and the mapping information includes at least one of a number of second PTRS ports scheduled by the network device, a mapping layer of each PTRS port, a number of PTRSs in a PTRS group at a mapping layer, or a number of samples per PTRS group; and a number of PTRS mapping layers is less than or equal to a number of DFT-s-OFDM scheduling layers, the number of PTRS mapping layers is greater than or equal to 1, the number of DFT-s-OFDM scheduling layers is greater than 1, and data is mapped to a location corresponding to a PTRS at a layer to which the PTRS is not mapped at the DFT-s-OFDM scheduling layers.

According to a second aspect, a PTRS receiving method is provided. The method may be performed by a first communication apparatus, and the first communication apparatus may be a communication device or a communication apparatus capable of supporting the communication device to implement functions required by the method, such as a chip system. An example in which the communication device is a terminal device is used below for descriptions. The method includes:

A terminal device sends first information to a network device, receives first indication information from the network device, and receives a DFT-s-OFDM symbol to which a PTRS is mapped from the network device, where the first information indicates a number of first PTRS ports, and the number of first PTRS ports is a number of ports recommended by the terminal device; the first indication information is used for determining mapping information of the PTRS on the DFT-s-OFDM symbol, and the mapping information includes at least one of a number of second PTRS ports scheduled by the network device, a mapping layer of each PTRS port, a number of PTRSs in a PTRS group at a mapping layer, or a number of samples per PTRS group; and a number of PTRS mapping layers is less than or equal to a number of DFT-s-OFDM scheduling layers, the number of PTRS mapping layers is greater than or equal to 1, the number of DFT-s-OFDM scheduling layers is greater than 1, and data is mapped to a location corresponding to a PTRS at a layer to which the PTRS is not mapped at the DFT-s-OFDM scheduling layers.

According to a third aspect, a PTRS sending method is provided. The method may be performed by a second communication apparatus, and the second communication apparatus may be a communication device or a communication apparatus capable of supporting the communication device in implementing functions required by the method, such as a chip system. An example in which the communication device is a network device is used below for descriptions. The method includes:

A network device receives first information from a terminal device, sends first indication information to the terminal device, and sends a DFT-s-OFDM symbol to which a PTRS is mapped to the terminal device, where the first information indicates a number of first PTRS ports, and the number of first PTRS ports is a number of ports recommended by the terminal device; the first indication information is used for determining mapping information of the PTRS on the DFT-s-OFDM symbol, and the mapping information includes at least one of a number of second PTRS ports scheduled by the network device, a mapping layer of each PTRS port, a number of PTRSs in a PTRS group at a mapping layer, or a number of samples per PTRS group; and a number of PTRS mapping layers is less than or equal to a number of DFT-s-OFDM scheduling layers, the number of PTRS mapping layers is greater than or equal to 1, the number of DFT-s-OFDM scheduling layers is greater than 1, and data is mapped to a location corresponding to a PTRS at a layer to which the PTRS is not mapped at the DFT-s-OFDM scheduling layers.

According to a fourth aspect, a PTRS receiving method is provided. The method may be performed by a second communication apparatus, and the second communication apparatus may be a communication device or a communication apparatus capable of supporting the communication device in implementing functions required by the method, such as a chip system. An example in which the communication device is a network device is used below for descriptions. The method includes:

A network device receives first information from a terminal device, sends first indication information to the terminal device, and receives a DFT-s-OFDM symbol to which a PTRS is mapped from the terminal device, where the first information indicates a number of first PTRS ports, and the number of first PTRS ports is a number of ports recommended by the terminal device; the first indication information is used for determining mapping information of the PTRS on the DFT-s-OFDM symbol, and the mapping information includes at least one of a number of second PTRS ports scheduled by the network device, a mapping layer of each PTRS port, a number of PTRSs in a PTRS group at a mapping layer, or a number of samples per PTRS group; and a number of PTRS mapping layers is less than or equal to a number of DFT-s-OFDM scheduling layers, the number of PTRS mapping layers is greater than or equal to 1, the number of DFT-s-OFDM scheduling layers is greater than 1, and data is mapped to a location corresponding to a PTRS at a layer to which the PTRS is not mapped at the DFT-s-OFDM scheduling layers.

In the first aspect to the fourth aspect, the network device may determine, based on the number of ports recommended by the terminal device, to map the PTRS to one layer or a plurality of layers of the DFT-s-OFDM symbol, to ensure phase noise estimation performance and improve a demodulation capability. When the number of DFT-s-OFDM scheduling layers is greater than 1, data is mapped to a location corresponding to a PTRS at a layer to which the PTRS is not mapped at the DFT-s-OFDM scheduling layers, which may improve resource utilization, to improve a system throughput.

PTRSs between mapping layers may be superimposed with an orthogonal cover code (OCC) in a unit of PTRS groups, and a length of the OCC is equal to a number of samples per PTRS group; or a PTRS sequence at the mapping layer is scrambled by using a layer number or a port number. In the solution, an OCC may be introduced before the terminal device sends the PTRS, to avoid mutual interference between PTRSs at each mapping layer.

Considering that the PTRS is mapped to a plurality of layers of the DFT-s-OFDM symbol, PTRS mapping locations may be different at different layers. In other words, resources that may be used for transmitting data at each layer are not the same. In other words, when the resources that may be used for transmitting data are asymmetric at each layer, an existing layer mapping manner is still used. As a result, a transmitting end cannot determine a location to which data is mapped, and alternatively a receiving end cannot determine a location at which the data is received. This embodiment may provide the following two data mapping solutions.

Solution 1. Data is mapped by using a modulation symbol corresponding to a transport block size (TBS), the data is punctured at a location of the PTRS at the mapping layer, the PTRS is mapped, and the TBS is obtained based on a total number of resources of the PTRS and a total number of resources of the data.

Solution 2. A first symbol sequence is sequentially mapped to all scheduling layers, where symbols $\{k, P_0+k, 2P_0+k, \ldots\}$ in the first symbol sequence are mapped to a $k^{th}$ scheduling layer, $P_0$ is a total number of scheduling layers, the first symbol sequence is generated after PTRSs at all the scheduling layers and the modulation symbol corresponding to the TBS are re-sorted based on a preset rule, and the TBS is obtained based on the total number of resources of the data.

In either of the two solutions, even if the PTRS mapping locations are different at the plurality of layers, the existing layer mapping manner is still used. The transmitting end may determine the location to which the data is mapped, and the receiving end may determine the location at which the data is received.

A number of PTRS mapping layers corresponding to the first PTRS port among PTRS ports may be greater than 1, and PTRS pattern parameters at the mapping layers corresponding to the first PTRS port may be different; and/or PTRS mapping locations at the mapping layers corresponding to the first PTRS port may be different.

In the solution, PTRS pattern parameters at a mapping layer corresponding to one PTRS port are different, and a PTRS pattern may be dynamically adjusted by using a channel status, to ensure demodulation performance and reduce PTRS overheads. PTRS mapping locations at the mapping layer corresponding to one PTRS port are different, so that interference of PTRSs between layers may be reduced, and estimation accuracy may be improved. Therefore, in this embodiment, the PTRS pattern parameters and the PTRS mapping locations at the mapping layer corresponding to one PTRS port may be determined based on a channel condition.

A number of samples per PTRS group mapped to a first layer is greater than a number of samples per PTRS group mapped to a second layer, a difference between channel quality of the first layer and channel quality of the second layer is greater than a preset value, and the preset value is a positive number. In the solution, the number of samples per PTRS group mapped to the first layer is greater than the number of samples per PTRS group mapped to the second layer, so that impact of noise may be better reduced, performance is more robust, and accuracy of phase noise estimation may be improved.

The PTRS mapping layers corresponding to the first PTRS port may include a first layer and a second layer. A PTRS pattern parameter at the second layer is the same as a PTRS pattern parameter at the first layer, and a PTRS mapping location at the second layer is located in the middle of two adjacent PTRS groups at the first layer. In the solution, for dual-layer mapping, a mapping location at one layer is agreed on to be in the middle of two adjacent PTRS groups at the other layer, so that an interpolation distance between PTRS groups may be shortened, and estimation accuracy may be improved. In addition, it is simple that a pattern parameter and a location at the second layer may be directly determined by a pattern parameter and a location at the first layer, thereby reducing complexity of PTRS pattern parameter indication signaling.

The PTRS mapping layers corresponding to the first PTRS port may include a first layer and a second layer. In a unit of PTRS groups, odd-numbered PTRS groups are mapped to the first layer, and even-numbered PTRS groups are mapped to the second layer. In the solution, it may be agreed on that the odd-numbered PTRS groups are mapped to the first layer, and the even-numbered PTRS groups are mapped to the second layer. Compared with a case in which a number of scheduling layers is 1, overheads may be reduced by at least half. In addition, a mapping rule is simple, and pattern parameters and locations at a plurality of layers may also be directly determined by existing pattern parameters, thereby reducing complexity of PTRS pattern parameter indication signaling.

The PTRS mapping layers corresponding to the first PTRS port may include a first layer and a second layer, and after being divided based on the number of PTRS mapping layers, mapped PTRS groups may be mapped to the first layer and the second layer in a dispersive manner. Compared with a pattern in which a number of scheduling layers is 1, in the solution, PTRS overheads may be reduced while performance is ensured.

The first indication information may further indicate an offset value of a PTRS at another layer to which the PTRS is mapped than the first layer relative to an initial time domain location of the PTRS at the first layer. In the solution, a PTRS pattern at the first layer is used as a reference, and a location of another layer relative to the PTRS pattern at the first layer is indicated through the offset value, so that various PTRS patterns may be implemented, which is flexible.

The first indication information may include a group of PTRS pattern association parameter thresholds, an association relationship between the PTRS pattern parameter and the PTRS pattern association parameter threshold is agreed on or configured in advance, and the PTRS pattern association parameter includes one or more of the following parameters: a scheduled bandwidth, a modulation and coding scheme MCS, or channel quality. The solution provides a manner of indirectly indicating the PTRS pattern parameters. That is, the PTRS pattern parameters may be indirectly indicated through parameters associated with the PTRS pattern parameters, for example, the scheduled bandwidth, the modulation and coding scheme MCS, the channel quality, or the like, thereby saving signaling overheads for notifying specific pattern parameters each time. In addition, the pattern parameters may dynamically change with the parameters, and are flexible.

The first indication information may further include a layer number of the PTRS mapping layer; or the first indication information may further include one or more of the following parameters: the MCS, the scheduled bandwidth, a subcarrier spacing, a number of scheduling layers, or a demodulation reference signal DMRS port configuration parameter. A correspondence between the one or more parameters and a mapping layer is predefined or pre-configured. In the solution, the first indication information may directly indicate the PTRS mapping layer. For example, the first indication information includes the layer number of the PTRS mapping layer, so that complexity of obtaining information about PTRS mapping layer by the terminal device may be reduced. Alternatively, the first indication information may indirectly indicate the PTRS mapping layer through one or more parameters, and an indication manner is more flexible.

The method may further include: the terminal device sends second information to the network device. The second information includes the one or more groups of PTRS pattern association parameter thresholds, and the PTRS pattern association parameter includes one or more of the following parameters: a phase noise model, an operating frequency, a subcarrier spacing, a number of uplink PTRS ports, a channel quality indication (CQI), or a reference signal received power (RSRP). In the solution, the terminal device may report the recommended PTRS pattern association parameter thresholds to the network device. That is, the terminal device reports the recommended PTRS pattern parameters to the network device. The network device may reset more proper PTRS pattern parameters for the terminal device based on the PTRS pattern parameters recommended by the terminal device with reference to system performance, a scheduling requirement, or the like.

According to a fifth aspect, an embodiment may provide a communication apparatus. The communication apparatus may be a terminal device or a communication apparatus that capable of supporting the terminal device in implementing a function required by the method, for example, a chip or a chip system. The function may be implemented by hardware or may be implemented by hardware executing corresponding software. The hardware or the software includes one or more modules corresponding to the function.

The communication apparatus may include a processing module and a transceiver module. The processing module is configured to generate first information. The first information indicates a number of first PTRS ports, and the number of first PTRS ports is a number of ports recommended by the communication apparatus; and the transceiver module is configured to send the first information to a network device, receive first indication information from the network device, and send a DFT-s-OFDM symbol to which a PTRS is mapped to the network device, where the first indication information is used for determining mapping information of the PTRS on the DFT-s-OFDM symbol, and the mapping information includes at least one of a number of second PTRS ports scheduled by the network device, a mapping layer of each PTRS port, a number of PTRSs in a PTRS group at a mapping layer, or a number of samples per PTRS group; and a number of PTRS mapping layers is less than or equal to a number of DFT-s-OFDM scheduling layers, the number of PTRS mapping layers is greater than or equal to 1, the number of DFT-s-OFDM scheduling layers is greater than 1, and data is mapped to a location corresponding to a PTRS at a layer to which the PTRS is not mapped at the DFT-s-OFDM scheduling layers.

The communication apparatus may include a processing module and a transceiver module. The processing module is configured to generate first information. The first information indicates a number of first PTRS ports, and the number of first PTRS ports is a number of ports recommended by the communication apparatus; and the transceiver module is configured to send the first information to a network device, receive first indication information from the network device, and receive the DFT-s-OFDM symbol to which the PTRS is mapped from the network device, where the first indication information is used for determining mapping information of the PTRS on the DFT-s-OFDM symbol, and the mapping information includes at least one of a number of second PTRS ports scheduled by the network device, a mapping layer of each PTRS port, a number of PTRSs in a PTRS group at a mapping layer, or a number of samples per PTRS group; and a number of PTRS mapping layers is less than or equal to a number of DFT-s-OFDM scheduling layers, the number of PTRS mapping layers is greater than or equal to 1, the number of DFT-s-OFDM scheduling layers is greater than 1, and data is mapped to a location corresponding to a PTRS at a layer to which the PTRS is not mapped at the DFT-s-OFDM scheduling layers.

The processing module in the fifth aspect may perform corresponding functions in method examples of the first aspect and/or the second aspect. For details, refer to detailed descriptions in the method examples, which will not be repeated herein.

According to a sixth aspect, an embodiment may provide a communication apparatus. The communication apparatus may be a network device or a communication apparatus that may support the network device in implementing a function required in the method, for example, a chip or a chip system. The function may be implemented by hardware or may be implemented by hardware executing corresponding software. The hardware or the software includes one or more modules corresponding to the function.

The communication apparatus may include a processing module and a transceiver module. The transceiver module is configured to receive first information from a terminal device, send first indication information determined by the processing module to the terminal device, and send a DFT-s-OFDM symbol to which a PTRS is mapped to the terminal device, where the first information indicates a number of first PTRS ports, and the number of first PTRS ports is a number of ports recommended by the terminal device; the first indication information is used for determining mapping information of the PTRS on the DFT-s-OFDM symbol, and the mapping information includes at least one of a number of second PTRS ports scheduled by the network device, a mapping layer of each PTRS port, a number of PTRSs in a PTRS group at a mapping layer, or a number of samples per PTRS group; and a number of PTRS mapping layers is less than or equal to a number of DFT-s-OFDM scheduling layers, the number of PTRS mapping layers is greater than or equal to 1, the number of DFT-s-OFDM scheduling layers is greater than 1, and data is mapped to a location corresponding to a PTRS at a layer to which the PTRS is not mapped at the DFT-s-OFDM scheduling layers.

The communication apparatus may include a processing module and a transceiver module. The transceiver module is configured to receive first information from a terminal device, send first indication information determined by the processing module to the terminal device, and receive a DFT-s-OFDM symbol to which a PTRS is mapped from the terminal device, where the first information indicates a number of first PTRS ports, and the number of first PTRS ports is a number of ports recommended by the terminal device; the first indication information is used for determining mapping information of the PTRS on the DFT-s-OFDM symbol, and the mapping information includes at least one of a number of second PTRS ports scheduled by the network device, a mapping layer of each PTRS port, a number of PTRSs in a PTRS group at a mapping layer, or a number of samples per PTRS group; and a number of PTRS mapping layers is less than or equal to a number of DFT-s-OFDM scheduling layers, the number of PTRS mapping layers is greater than or equal to 1, the number of DFT-s-OFDM scheduling layers is greater than 1, and data is mapped to a location corresponding to a PTRS at a layer to which the PTRS is not mapped at the DFT-s-OFDM scheduling layers.

The processing module in the sixth aspect may perform corresponding functions in method examples of the third aspect and/or the fourth aspect. For details, refer to detailed descriptions in the method examples, which will not be repeated herein.

According to a seventh aspect, an embodiment may provide a communication apparatus. The communication apparatus may be the communication apparatus in the fifth aspect or the sixth aspect in the foregoing embodiments, or a chip or a chip system disposed in the communication apparatus in the fifth aspect or the sixth aspect. The communication apparatus includes a communication interface and a processor, and optionally, further includes a memory. The memory is configured to store a computer program, instructions, or data. The processor is coupled to the memory and the communication interface. When the processor reads the computer program, the instructions, or the data, the communication apparatus is enabled to perform the method performed by the terminal device or the network device in the foregoing method embodiments.

According to an eighth aspect, an embodiment may provide a chip system. The chip system may include a processor and may further include a memory and/or a communication interface, configured to implement the method in the first aspect, the second aspect, the third aspect, or the fourth aspect. In a possible implementation, the chip system may further include the memory, configured to store program instructions and/or data. The chip system may include a chip or may include a chip and another discrete device.

According to a ninth aspect, an embodiment may provide a communication system. The communication system may include the communication apparatus in the fifth aspect and the communication apparatus in the sixth aspect.

According to a tenth aspect, the embodiments may provide a non-transitory computer-readable storage medium. The non-transitory computer-readable storage medium stores a computer program, and when the computer program is run, the method in the first aspect, the second aspect, the third aspect, or the fourth aspect is implemented.

According to an eleventh aspect, a computer program product is provided. The computer program product includes computer program code, and when the computer program code is run, the method in the first aspect, the second aspect, the third aspect, or the fourth aspect is performed.

For beneficial effects of the fifth aspect to the eleventh aspect and implementations of the fifth aspect to the eleventh aspect, refer to descriptions of beneficial effects of aspects or aspects and implementations of the aspects.

DETAILED DESCRIPTION OF THE EMBODIMENTS

To make objectives, solutions, and advantages of the embodiments clearer, the following further describes the embodiments in detail with reference to the accompanying drawings.

An operating band of a new generation wireless communication network may be higher than 6 GHz. As the operating band increases, phase noise and CFO also increase, a phase error caused to a transmit signal also increases, and system demodulation performance deteriorates. The phase noise is used as an example. Because the phase noise is a type of noise introduced by non-ideality of a frequency component in a communication system, as a frequency band increases, a power spectrum density of the phase noise increases, strength of the phase noise increases as a carrier frequency increases, and impact on a receive signal increases.

Figure 1A:
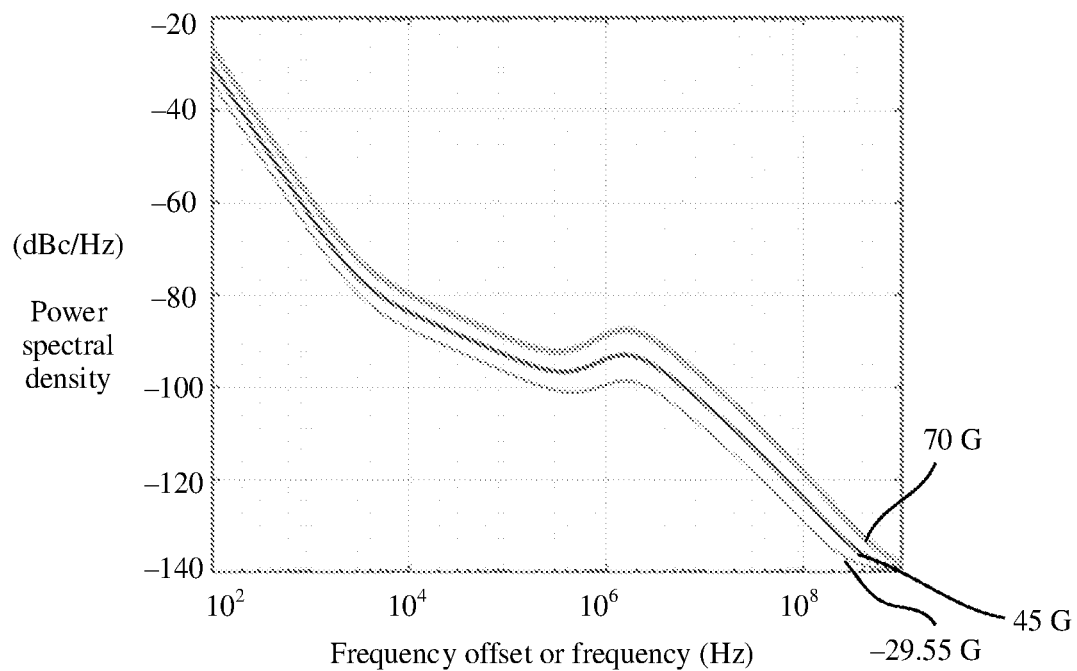
FIG. 1A is a schematic diagram of a power spectrum density of a phase noise model according to an embodiment.
Figure 1B:
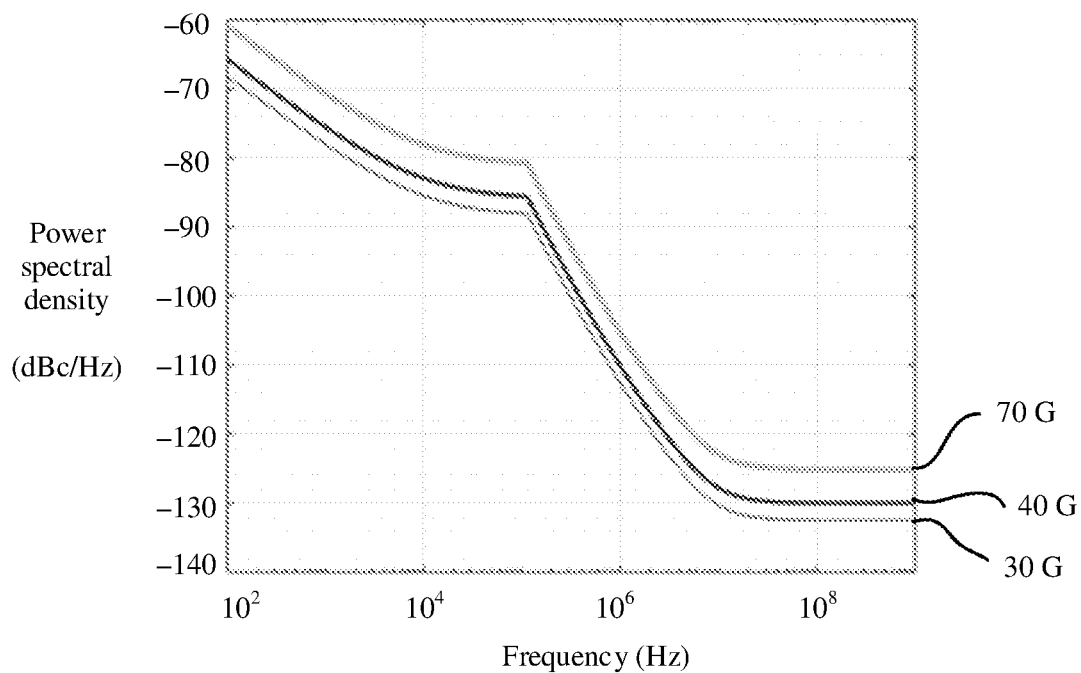
FIG. 1B is a schematic diagram of a power spectrum density of another phase noise model according to an embodiment.

FIG. 1A and FIG. 1B each show a phase noise model. It may be understood from FIG. 1A and FIG. 1B that a higher frequency band indicates greater phase noise.

Figure 2A:
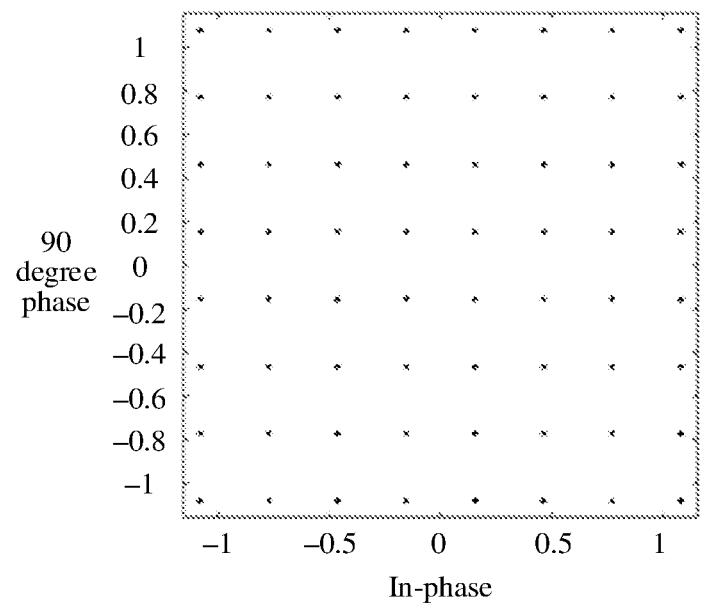
FIG. 2A is a schematic diagram of a frequency domain receive signal without impact of phase noise when a 64 QAM modulation signal is used.
Figure 2B:
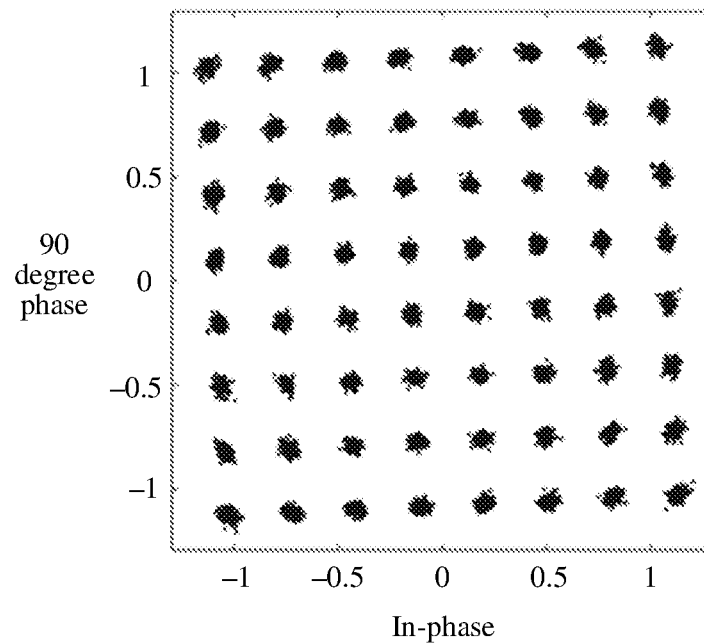
FIG. 2B is a schematic diagram of impact of phase noise on a frequency domain receive signal when a 64 QAM modulation signal is used.
Figure 2C:
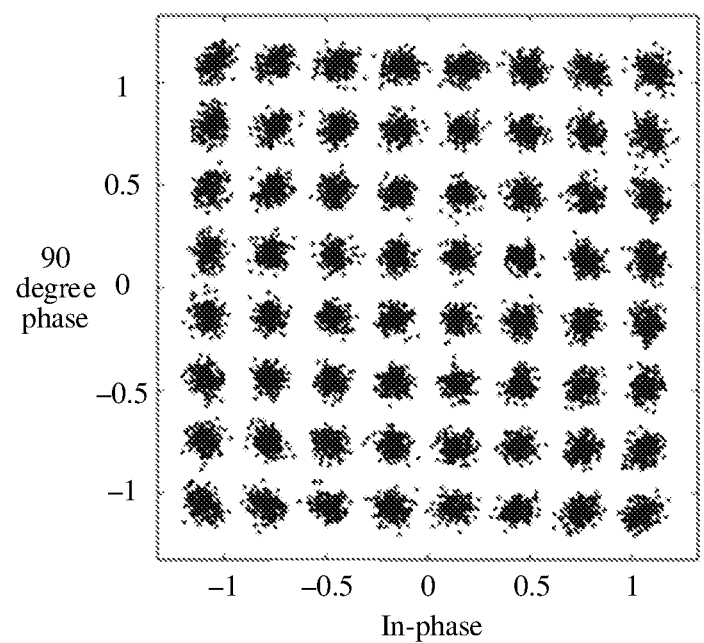
FIG. 2C is a schematic diagram of impact of phase noise on a frequency domain receive signal when a 256 QAM modulation signal is used.

FIG. 2A to FIG. 2C show impact of different phase noise on a frequency domain receive signal (a horizontal coordinate is in-phase, and a vertical coordinate is 90-degree phase (quadrature)). FIG. 2A is a schematic diagram of a frequency domain receive signal without impact of phase noise when a 64 quadrature amplitude modulation (QAM) modulation signal is used. FIG. 2B is a schematic diagram of impact of phase noise on a frequency domain receive signal when a 64 QAM modulation signal is used. FIG. 2C is a schematic diagram of impact of phase noise on a frequency domain receive signal when a 256 QAM modulation signal is used. It may be understood from FIG. 2A to FIG. 2C that, when there is the impact of the phase noise, 64 QAM constellation points are rotated and spread. Compared with the 64 QAM constellation points, 256 QAM constellation points have a higher ratio of a diffusion radius to a minimum Euclidean distance. This is because after a phase noise power spectrum density reaches a certain level, when a modulation order is high, in addition to a common phase error (CPE), inter-carrier interference (ICI) caused by the phase noise is large. Therefore, estimation and compensation of the CPE and the ICI introduced by the phase noise need to be considered for modulation of a high frequency, a high order, and a high bit rate, so that an OFDM system performs phase tracking, that is, determines phase noise of a signal in the OFDM system.

A PTRS (which may also be denoted as a PT-RS) is introduced for both a CP-OFDM waveform and a DFT-s-OFDM waveform in an NR protocol. The phase noise is estimated through the PTRS, and phase noise error compensation is performed through the estimated phase noise, to improve demodulation performance in a phase noise condition, and improve communication quality. A network-side device may map the PTRS to a CP-OFDM symbol or a DFT-s-OFDM symbol based on a PTRS mapping rule (a PTRS pattern) and send the PTRS to a terminal-side device. The terminal-side device receives the PTRS sent by the network-side device based on the PTRS pattern. Alternatively, the terminal-side device may map the PTRS to the CP-OFDM symbol or the DFT-s-OFDM symbol based on the PTRS pattern and send the PTRS to the network-side device. The network-side device receives the PTRS sent by the terminal-side device based on the PTRS pattern.

Figure 3:
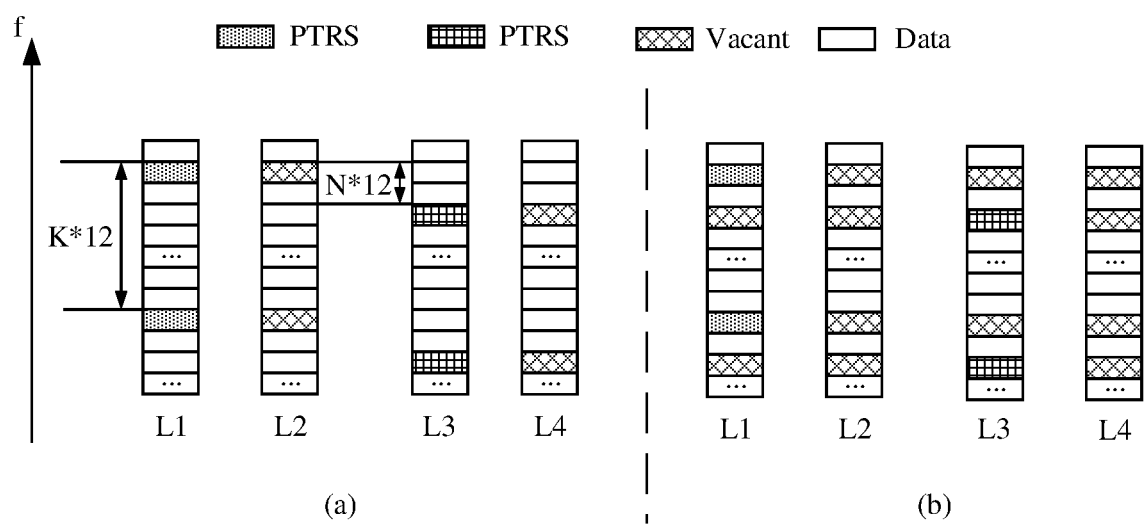
FIG. 3 is a schematic diagram of PTRS mapping in multi-layer CP-OFDM.

For the CP-OFDM waveform, a mapping rule (referred to as a PTRS mapping rule) for mapping the PTRS to one layer or a plurality of layers of the CP-OFDM symbol is currently specified. FIG. 3 is a schematic diagram of PTRS mapping in multi-layer CP-OFDM. In FIG. 3, each column represents all subcarriers of the CP-OFDM symbol to which a PTRS is mapped at one layer, and each grid in each column is one RE. A layer L1 and a layer L2 in (a) in FIG. 3 correspond to one terminal device, and a layer L3 and a layer L4 correspond to one terminal device. A layer L1 to a layer L4 in (b) in FIG. 3 correspond to one terminal device. It may be understood that FIG. 3 is a schematic diagram of PTRS mapping in which four layers of a terminal device are scheduled.

For the CP-OFDM waveform, the PTRS mapping rule is related to a signal transmission direction (uplink transmission or downlink transmission). The following separately describes the PTRS mapping rule for the uplink transmission and the downlink transmission. It should be noted that the uplink transmission and the downlink transmission are relative. If transmission from a network-side device to a terminal is referred to as the downlink transmission, transmission from the terminal to the network-side device is referred to as the uplink transmission; on the contrary, if the transmission from the network-side device to the terminal is referred to as the uplink transmission, the transmission from the terminal to the network-side device is referred to as the downlink transmission. In this embodiment, an example in which the transmission from the network-side device to the terminal is the downlink transmission, and the transmission from the terminal to the network-side device is the uplink transmission is used.

For the downlink transmission, one terminal has one PTRS port. When a plurality of terminals perform transmission at a plurality of layers, that is, each terminal corresponds to the plurality of layers, each terminal may perform transmission at the plurality of layers. However, because one terminal has only one PTRS port, the PTRS port may be mapped to one of the plurality of layers (that is, the PTRS is mapped to the layer), and the PTRS port is not mapped to another layer. For example, it is currently specified that another layer is vacant at a corresponding location of a first layer to which the PTRS is mapped, that is, no signal is mapped to the corresponding location.

For example, as shown in (a) in FIG. 3, an example in which the layer L1 and the layer L2 are layers of a terminal 1, and the layer L3 and the layer L4 are layers of a terminal 2 is used. For the terminal 1, the PTRS may be mapped to the layer L1, the PTRS is not mapped to the layer L2, and corresponding locations of the layer L2 and the layer L1 to which the PTRS is mapped are vacant. For the terminal 2, the PTRS may be mapped to the layer L3, the PTRS is not mapped to the layer L4, and corresponding locations of the layer L4 and the layer L3 to which the PTRS is mapped are vacant.

In addition, PTRSs of different terminals may be separated. As shown in (a) in FIG. 3, the PTRSs of different terminals may be mapped at an interval of N*12 resource elements (RE), and frequency division is not required. It may be understood that when N=0, the PTRS of the terminal 1 and the PTRS of the terminal 2 are multiplexed on a same RE at different layers. When N≠0, the PTRS of the terminal 1 and data of the terminal 2 are multiplexed on a same RE at different layers.

For the uplink transmission, one terminal may transmit a plurality of PTRS ports. For example, one terminal may transmit two PTRS ports, and the terminal may perform transmission at two layers. Currently, it is specified that one PTRS port may be mapped to a layer (for example, a first layer) of a plurality of layers corresponding to the port, another PTRS port is mapped to another layer (for example, a second layer) of the plurality of layers corresponding to the port, and locations at another layer corresponding to locations at the first layer and the second layer to which the PTRS is mapped are vacant. For example, as shown in (b) in FIG. 3, an example in which the layer L1 to the layer L4 are layers of a terminal 3 is used. One PTRS port of the terminal 3 may be mapped to the layer L1, another PTRS port of the terminal 3 may be mapped to the layer L3, and the layer L2 and the layer L4 are vacant at corresponding locations at the L1 and the L3 to which the PTRS is mapped. It should be noted that in (b) in FIG. 3, an example in which one PTRS port respectively corresponds to two layers is used. A number of layers corresponding to one PTRS port is not limited in this embodiment. For example, one PTRS port may correspond to one layer (that is, may be mapped only to the layer), and another PTRS port may correspond to three layers. In this case, the PTRS port may be mapped to one of the three layers.

It should be understood that if signals at a plurality of layers are sent together, that is, a same transmit antenna is used to send the signals at the plurality of layers, no RE to which the PTRS is mapped is located at the plurality of layers. In other words, a vacant RE may be used to increase a transmit power of the PTRS at the layer to which the PTRS is mapped, thereby increasing a signal-to-noise ratio (SNR) of the PTRS and improving phase noise estimation precision. However, when layers are in a one-to-one correspondence with transmit antennas or one layer corresponds to a plurality of transmit antennas, because each antenna corresponds to only one layer, and RE-level power sharing cannot be completed between antennas, a power cannot be borrowed across layers. In this way, a power on an RE that is at a layer to which no PTRS is mapped and that corresponds to a location at another layer to which the PTRS is mapped cannot be used to increase a transmit power of a PTRS at a layer to which the PTRS is mapped, and performance is not improved. In this case, a null resource at the layer to which no PTRS is mapped actually causes a waste of resource overheads.

For the DFT-s-OFDM waveform, currently, a mapping rule for mapping the PTRS to one layer of the DFT-s-OFDM symbol is specified. PTRS pattern parameters, for example, a number of PTRS groups and a number of samples per PTRS group in the DFT-s-OFDM symbol, may be determined based on the mapping rule. A PTRS modulation symbol is mapped to the DFT-s-OFDM symbol based on the PTRS pattern parameters, to form a PTRS pattern. The PTRS pattern may represent a mapping location of the PTRS on a modulation symbol. Assuming that a number of PTRS groups is N, and a number of samples per PTRS group is M, a number of PTRSs in the PTRS pattern is N*M. In other words, a DFT-s-OFDM symbol to which the PTRS is mapped includes N*M PTRSs.

The number of PTRS groups and the number of samples per PTRS group are related to a scheduled bandwidth. Scheduled bandwidths located in different scheduled bandwidth threshold intervals correspond to different numbers of PTRS groups and different numbers of samples per PTRS group. Table 1 shows a correspondence between the scheduled bandwidth and the PTRS pattern parameters. In Table 1, $N_{RB0}$ to $N_{RB4}$ represent scheduled bandwidth thresholds, and $N_{RB}$ represents a value of the scheduled bandwidth. When $N_{RB}$ is located between $[N_{RB0}, N_{RB1})$, N=2, and M=2; and when $N_{RB}$ is located between $[N_{RB1}, N_{RB2})$, N=2, M=4, and so on. $N_{RB0}$, $N_{RB1}$, $N_{RB2}$, $N_{RB3}$, and $N_{RB4}$ may be pre-configured. For a same terminal or a same network device (with a same frequency and a same subcarrier spacing), there may be $N_{RBi} \leq N_{RBi+1}$ (i=0, 1, 2, 3). If $N_{RBi} \leq N_{RBi+1}$, a row corresponding to $[N_{RBi}, N_{RBi+i})$ in the table is invalid. It may be understood from Table 1 that N and M may be indirectly indicated through the current scheduled bandwidth. In this embodiment, Table 1 may be used as the mapping rule for mapping the PTRS to one layer of the DFT-s-OFDM symbol, and N and M, namely, the PTRS pattern parameters, may be determined through Table 1.

TABLE 1

Correspondence between a scheduled bandwidth and PTRS pattern parameters

| Scheduled bandwidth (Scheduled bandwidth) | Number of PT-RS groups (Number of PT-RS groups) | Number of samples per PT-RS group (Number of samples per PT-RS group) |
|---|---|---|
| $N_{RB0} \leq N_{RB} < N_{RB1}$ | 2 | 2 |
| $N_{RB1} \leq N_{RB} < N_{RB2}$ | 2 | 4 |

TABLE 1-continued

Correspondence between a scheduled bandwidth
and PTRS pattern parameters

| Scheduled bandwidth (Scheduled bandwidth) | Number of PT-RS groups (Number of PT-RS groups) | Number of samples per PT-RS group (Number of samples per PT-RS group) |
| --- | --- | --- |
| $N_{RB2} \leq N_{RB} < N_{RB3}$ | 4 | 2 |
| $N_{RB3} \leq N_{RB} < N_{RB4}$ | 4 | 4 |
| $N_{RB4} \leq N_{RB}$ | 8 | 4 |

Figure 4:
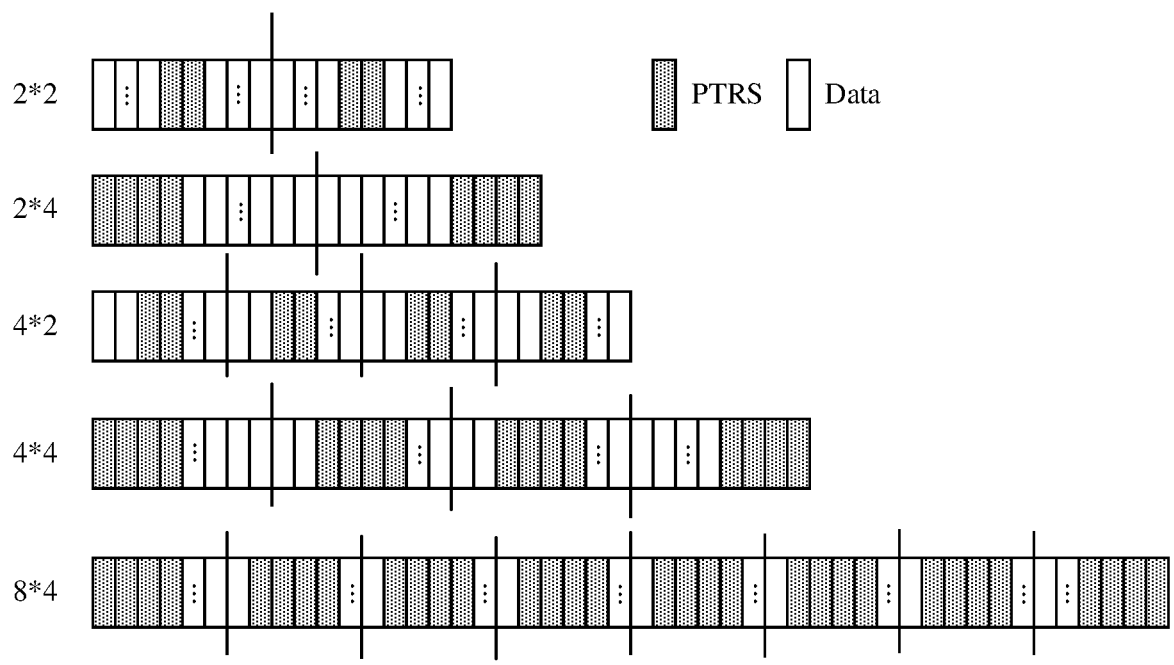
FIG. 4 is a schematic diagram of PTRS mapping in single-layer DFT-s-OFDM.

For ease of understanding, FIG. 4 is a schematic diagram of a PTRS pattern of single-layer DFT-s-OFDM. Each grid on a time-frequency resource shown in FIG. 4 represents a modulation symbol (a DFT-s-OFDM symbol) (a sample). The modulation symbol is, for example, a QAM symbol, a π/2 binary phase shift keying (BPSK) symbol, or a quadrature phase shift keying (QPSK) symbol. A PTRS sample (sample) may be one PTRS signal (one modulation symbol, for example, one pi/2 BPSK symbol), and a signal carried on one RE may also be one PTRS signal.

Based on the rule shown in Table 1, the scheduled bandwidth may be evenly divided into N segments or N intervals. It is specified that when M=2, one PTRS group is mapped in the middle of each segment or each interval. When M=4, one PTRS group is mapped in each segment or each interval. A PTRS group in a first segment is mapped to a header of the first segment, a PTRS group in an $N^{th}$ segment is mapped to a tail of the $N^{th}$ segment, and PTRS groups in other segments (intervals) are mapped to the middle.

For example, when M=2, and N=2, the scheduled bandwidth may be evenly divided into two segments (a first segment and a second segment), and one PTRS group is separately mapped to the middle of the first segment and the middle of the second segment, as shown in a first row in FIG. 4. Alternatively, when M=2, and N=4, the scheduled bandwidth may be evenly divided into four segments (a first segment to a fourth segment), and one PTRS group is separately mapped to the middle of the first segment to the middle of the fourth segment, as shown in a third row in FIG. 4. Similarly, when M=4, and N=2, the scheduled bandwidth may be evenly divided into two segments (a first segment and a second segment). One PTRS group is mapped to a header of the first segment, and one PTRS group is mapped to a tail of the second segment, as shown in a second row in FIG. 4. Alternatively, when M=4, and N=4, the scheduled bandwidth may be evenly divided into four segments (a first segment to a fourth segment). One PTRS group is mapped to a header of the first segment, one PTRS group is mapped to a tail of the fourth segment, and one PTRS group is separately mapped to the middle of a second segment and the middle of a third segment, as shown in a fourth row in FIG. 4. Alternatively, when M=4, and N=8, the scheduled bandwidth may be evenly divided into eight segments (a first segment to an eighth segment). One PTRS group is mapped to a header of the first segment, one PTRS group is mapped to a tail of the eighth segment, and one PTRS group is separately mapped to the middle of a second segment to the middle of a seventh segment, as shown in a fifth row in FIG. 4.

To improve a system throughput, transmission of a multi-layer DFT-s-OFDM signal is proposed, and a problem of how to map the PTRS to a multi-layer DFT-s-OFDM symbol naturally appears. Although there is an existing mapping rule for mapping the PTRS to a plurality of layers of a CP-OFDM symbol, due to a difference between DFT-s-OFDM and CP-OFDM, a mapping rule for mapping the PTRS to the plurality of layers of the CP-OFDM symbol cannot be used for mapping the PTRS to a plurality of layers of the DFT-s-OFDM symbol. For example, currently, there is no mapping rule for mapping the PTRS to the plurality of layers of the DFT-s-OFDM symbol. In other words, for the DFT-s-OFDM symbol, there may not be a multi-layer PTRS pattern.

In view of this, an embodiment may provide a PTRS sending method. A mapping rule for mapping a PTRS to a plurality of layers of a DFT-s-OFDM symbol is provided, so that PTRS overheads may be reduced while a system throughput is improved.

The communication method provided in embodiments may be applied to various communication systems including a transmitting end and a receiving end, for example, an NR system, an LTE system, an LTE-A system, worldwide interoperability for microwave access (WiMAX), a wireless local area network (WLAN), and a 5G system. Particularly, this embodiment may be applicable to a scenario in which high frequency phase noise is severe. In an example, referring to FIG. 5, this embodiment may be further applicable to the following scenarios: scenarios of a high frequency, a high order, and a high bit rate such as enhanced mobile broadband (eMBB) (shown by a solid line in FIG. 5), a backhaul scenario (shown by a dashed line ① in FIG. 5), device to device (D2D) (shown by a dashed line ③ in FIG. 5), multi-station transmission (a same terminal transmits a signal to a plurality of stations) (shown by a dashed line ② in FIG. 5), or the like.

Figure 5:
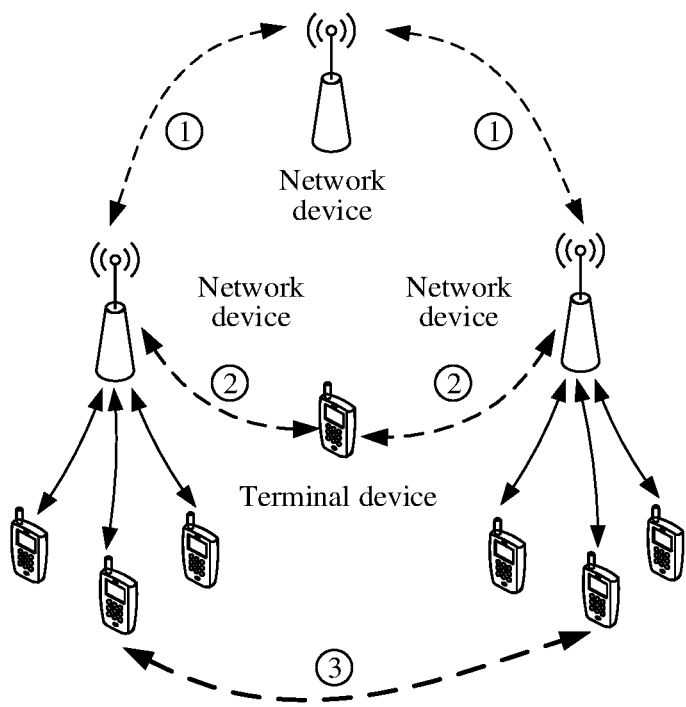
FIG. 5 is a schematic diagram of a network architecture to which an embodiment is applicable.

The PTRS sending method provided in this embodiment may be applied to any scenario in the network architecture shown in FIG. 5. The method may be performed by two communication apparatuses. For example, the two communication apparatuses may be referred to as a transmitting end and a receiving end. For example, the transmitting end and the receiving end may be two devices in any scenario in FIG. 5, for example, may be a network-side device and a terminal-side device in an eMBB scenario.

In an example, the transmitting end may be the network-side device, and the receiving end may be the terminal-side device. The network-side device may also be referred to as a network device, and is an entity configured to transmit or receive a signal on a network side. The network-side device is a device that connects the terminal-side device to a wireless network in a communication system and may be connected to a core network through a line link (for example, an optical fiber cable), for example, a new generation NodeB (gNodeB). The network-side device may be responsible for receiving data from the core network and forwarding data to a wireless backhaul device or receiving the data from the wireless backhaul device and forwarding the data to the core network. The network device may be a device configured to communicate with a mobile device. The network device may be an AP in a wireless local area network (WLAN), an evolved NodeB (eNB) in long term evolution (LTE), or may include a next generation NodeB (gNB) in a 5G NR system, a relay station, an access point, an in-vehicle device, a wearable device, and a network device in a future 5G network, a network device in a future evolved public land mobile network (PLMN), a gNodeB/gNB in an NR system, or the like. The following uses an example in which the network device is the gNB.

The gNB may include an antenna, a base band unit (BBU), and a remote radio unit (RRU). The BBU may be connected to the RRU through a common public radio interface (CPRI), an enhanced CPRI (eCPRI), or the like. The RRU may be connected to the antenna through a feeder. The antenna may be a passive antenna, is separated from the RRU, and may be connected to the RRU through a cable. Alternatively, the antenna may be an active antenna unit (AAU), that is, an antenna unit of the AAU and the RRU are integrated. The AAU implements some physical layer processing functions, radio frequency processing, and a function related to an active antenna.

In some deployments, the gNB may include a central unit (CU) and a distributed unit (DU). The CU implements some functions of the gNB, and the DU implements some functions of the gNB. For example, the DU may be configured to implement receiving and sending of a radio frequency signal, conversion between the radio frequency signal and a baseband signal, and some baseband processing. The CU may be configured to perform baseband processing, control a base station, or the like. In some embodiments, the CU is responsible for processing non-real-time protocols and services, and implementing functions of a radio resource control (RRC) layer and a packet data convergence protocol (PDCP) layer. The DU is responsible for processing a physical layer protocol and a real-time service and implements functions of a radio link control (RLC) layer, a medium access control (MAC) layer, and a physical (PHY) layer. Information at the RRC layer eventually becomes information at the PHY layer or is changed from information at the PHY layer. Therefore, in this architecture, higher-layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (RAN), or the CU may be classified into a network device in a core network (CN). This is not limited.

A terminal-side device may also be referred to as a terminal device or a terminal and may be a wireless terminal device that may receive scheduling and indication of a network device. The terminal-side device may refer to a device that provides a user with voice and/or data connectivity, a handheld device with a wireless connection function, or another processing device connected to a wireless modem.

The terminal-side device may communicate with one or more core networks or the internet via a radio access network, such as a radio access network (RAN), and exchange voice and/or data with the RAN. The terminal-side device may include user equipment (UE), a wireless terminal device, a mobile terminal device, a device-to-device (D2D) communication terminal device, a V2X terminal device, a machine-to-machine/machine-type communication (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal may include a mobile phone (or referred to as a "cellular" phone), a computer with a mobile terminal device, or a portable, pocket-sized, handheld, or computer built-in mobile apparatus. In another example, the terminal may include a virtual reality (VR) terminal device, an augmented reality (AR) terminal device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, a terminal device in a future evolved public land mobile network (PLMN), a vehicle device in vehicle to everything (V2X), customer premises equipment (CPE), or the like. In another example, the terminal may include a device such as a personal communication service (PCS) phone, a cordless telephone set, a session initiation protocol (SIP) phone, a wireless local loop (WLL) station, or a personal digital assistant (PDA). The terminal alternatively includes a limited device, for example, a device having low power consumption, a device having a limited storage capability, or a device having a limited computing capability. For example, the terminal includes an information sensing device such as a barcode, radio frequency identification (RFID), a sensor, a global positioning system (GPS), or a laser scanner.

As an example, instead of a limitation, in the embodiments, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that is directly worn on a body or integrated into clothes or an accessory of a user. The wearable device is not only a hardware device, but is used to implement a powerful function through software support, data exchange, and cloud interaction. In a board sense, wearable intelligent devices include full-featured and large-sized devices that can implement complete or partial functions without depending on smartphones, for example, smart watches or smart glasses, and devices that focus on only one type of application function and need to work with other devices such as smartphones, such as various smart bands, smart helmets, or smart jewelry for monitoring physical signs. If the various terminal devices described above are located in a vehicle (for example, placed in the vehicle or installed in the vehicle), the terminal devices may be all considered as vehicle-mounted terminal devices. For example, the vehicle-mounted terminal device is also referred to as an on-board unit (OBU).

In the embodiments, the network device and the terminal may be deployed on land, including indoors or outdoors, handheld, or vehicle-mounted, may alternatively be deployed on water, and may alternatively be deployed on an airplane, a balloon, and a satellite in the air. Application scenarios of the network device and the terminal are not limited in the embodiments.

It should be noted that a device that sends a signal may be referred to as a transmitting end and a device that receives a signal may be referred to as a receiving end. In this the embodiment, a device that sends a PTRS may be referred to as the transmitting end, and a device that receives the PTRS may be referred to as the receiving end. For example, in some embodiments, the transmitting end may be a terminal-side device, and the receiving end may be a network-side device. In some other embodiments, the transmitting end may be the network-side device, and the receiving end may be the terminal-side device. In another example, the transmitting end may be two terminal-side devices in the D2D scenario in FIG. 5. That is, the transmitting end is a terminal device, and the receiving end is also the terminal device.

Figure 6:
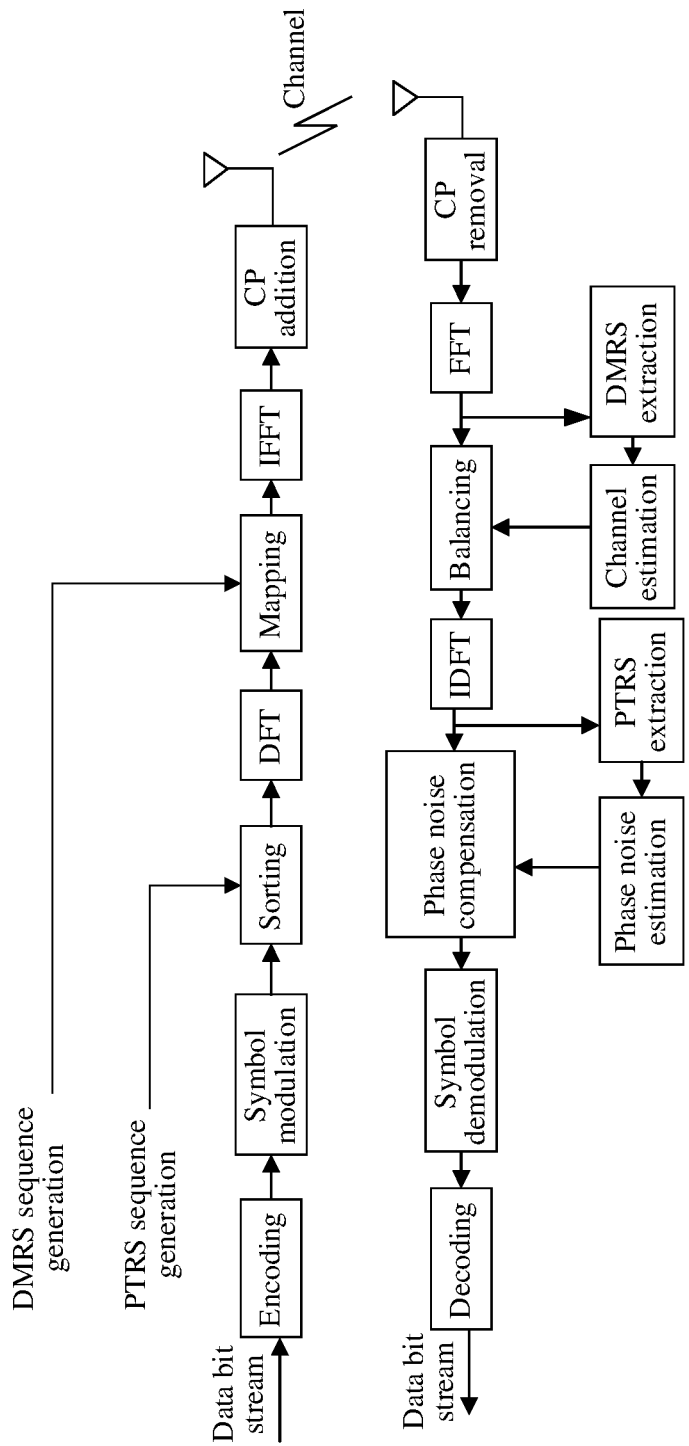
FIG. 6 is a schematic diagram of function modules of a transmitting end and a receiving end to which an embodiment is applicable.

FIG. 6 is a schematic diagram of function modules of a transmitting end and a receiving end to which an embodiment is applicable. An apparatus configured to transmit a PTRS may be located in a communication module at the transmitting end and a communication module at the receiving end. The transmitting end may generate a PTRS sequence, encode a bit rate of to-be-sent data, and perform modulation through quadrature amplitude modulation QAM modulation, quadrature phase shift keying (QPSK) modulation, π/2 binary phase shift keying (π/2-BPSK) modulation, amplitude phase shift keying (APSK) modulation, or non-uniform QAM modulation, to obtain a modulated sequence. The modulated sequence and the generated PTRS sequence are sorted, and a DFT operation is performed on the sorted sequence. The sequence after DFT and the generated DMRS sequence are mapped to a DFT-s-OFDM symbol, inverse fast fourier transform (IFFT) is performed, and a cyclic prefix (CP) code is superimposed to obtain a final symbol sequence. Then, the final symbol sequence is sent to the receiving end.

The receiving end is an inverse process opposite to the transmitting end. That is, after receiving the symbol sequence from the transmitting end, the receiving end removes the superimposed CP from the symbol sequence, and performs fast fourier transform (FFT). Then, the receiving end extracts a DMRS, and performs channel estimation in frequency domain, to complete signal equalization. Next, the receiving end performs inverse discrete fourier transform (IDFT) on the equalized sequence. Then, the receiving end extracts a PTRS, and performs phase noise estimation based on the extracted PTRS. The receiving end may perform phase noise compensation based on the phase noise estimation and demodulate and decode a sequence obtained after the phase noise compensation, to restore a data bit stream sent by the transmitting end.

For ease of understanding the embodiments, the following describes in detail a communication method provided in the embodiments with reference to the accompanying drawings. In the following description process, an example in which the method is applied to the communication system shown in FIG. 5 is used. In addition, the method may be performed by two communication apparatuses, and the two communication apparatuses are, for example, a first communication apparatus and a second communication apparatus. For ease of description, an example in which the method is performed by a terminal device and a network device is used below. An example in which the first communication apparatus is the terminal device and the second communication apparatus is the network device may be used. It should be noted that this embodiment may use the communication system in FIG. 5 as an example and is not limited to the scenario. In this embodiments, a layer to which the PTRS is mapped is referred to as a mapping layer.

Figure 7:
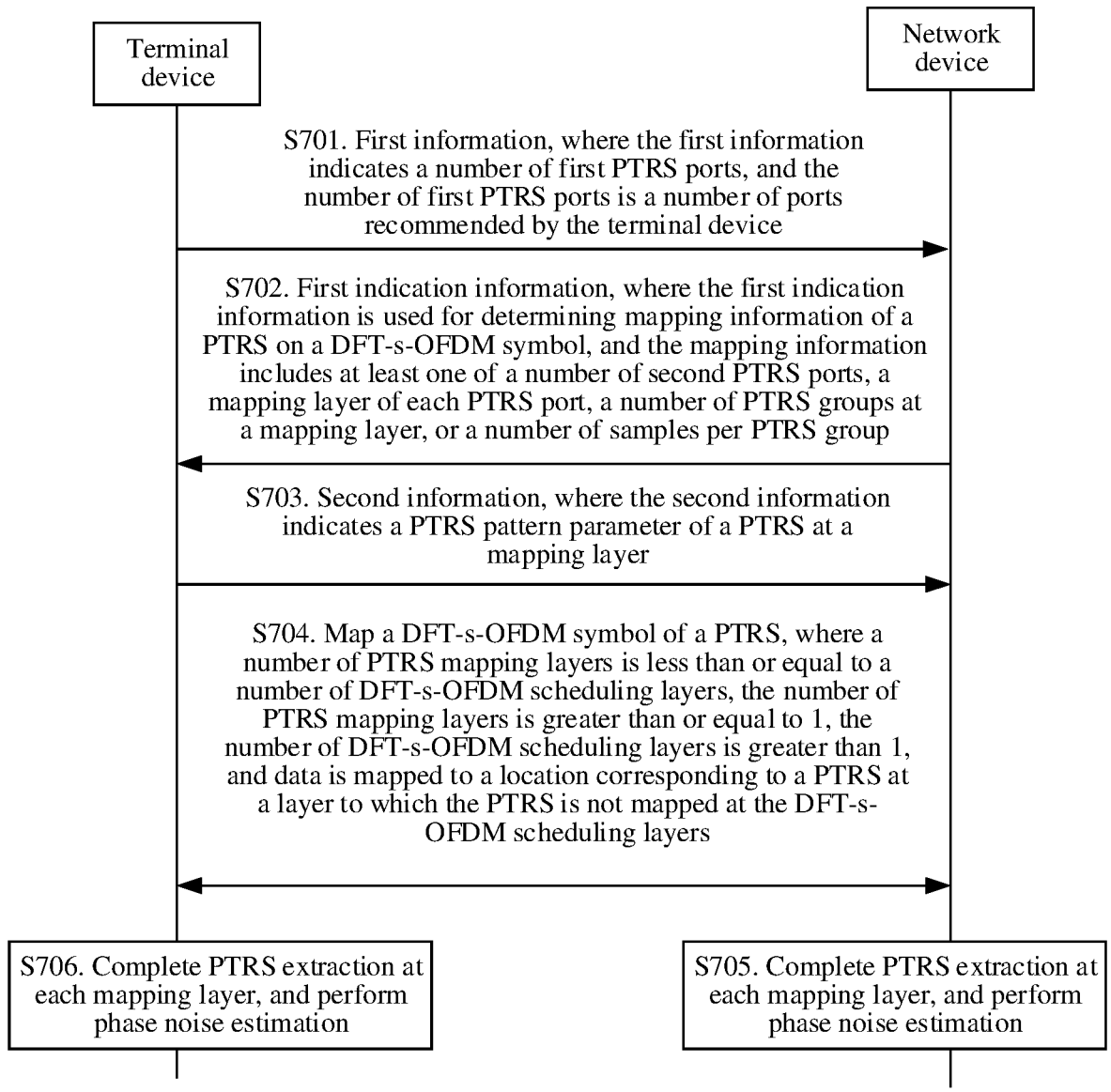
FIG. 7 is a schematic flowchart of a PTRS sending method according to an embodiment.

FIG. 7 is a flowchart of a PTRS sending method according to an embodiment. A procedure of the method is described as follows.

S701. A terminal device sends first information to a network device, and the network device receives the first information, where the first information indicates a number of first PTRS ports, and the number of first PTRS ports is a number of ports recommended by the terminal device.

This embodiment aims to provide a mapping rule for mapping a PTRS to a plurality of layers of a DFT-s-OFDM symbol, that is, mapping the PTRS to a mapping layer or mapping layers of the DFT-s-OFDM symbol, pattern parameters of the PTRS at the mapping layer, or the like. The mapping rule for mapping the PTRS to the plurality of layers of the DFT-s-OFDM symbol varies with a local oscillation capability of the terminal device. In this embodiment, a maximum number of PTRS ports required by the terminal device may be used for representing the local oscillation capability of the terminal device, that is, a local oscillation number of the terminal device. For ease of description, the maximum number of PTRS ports required by the terminal device is referred to as a number of first PTRS ports below. The terminal device may notify the network device of the number of first PTRS ports in advance, so that the network device determines the mapping rule for mapping the PTRS to the plurality of layers of the DFT-s-OFDM symbol based on the local oscillation capability of the terminal device.

The terminal device may send first information used for indicating the number of first PTRS ports to the network device. When the network device receives the first information, it may be considered that the terminal device requests the number of first PTRS ports from the network device, or a number of ports recommended by the network device to the terminal device is the number of first PTRS ports. Because the number of first PTRS ports may be used for reflecting the local oscillation number of the terminal device, the first information may also be considered as capability information of the terminal device.

In this embodiment, the first information indicates the number of first PTRS ports. In different implementations, the first information may directly indicate the number of first PTRS ports or may indirectly indicate the number of first PTRS ports. This is not limited in this embodiment. In addition, the first information may also be carried in one or more fields of existing signaling, which helps be compatible with the existing signaling. For example, the first information is carried in one or more of radio resource control (RRC) signaling, uplink control information (UCI) signaling, or media access control element (MAC CE) signaling. The one or more fields may be a field defined by the RRC signaling, a field defined by the MAC CE signaling, or a field defined by the UCI signaling, or may be a newly defined RRC field, MAC CE field, or UCI field. This is not limited in this embodiment. For example, the first information may also be carried in newly defined signaling.

In an example, the first information may be carried in the RRC signaling. For example, the first information may be carried in a transformPrecoderEnabled element in a PTRS-UplinkConfig information element. For example, a field may be newly added to the transformPrecoderEnabled element, and a name of the field may be, for example, maxNrofPorts of DFT-s-OFDM. The newly added field may be used for carrying the number of first PTRS ports. The number of first PTRS ports may be directly indicated through the maxNrofPorts of DFT-s-OFDM field newly added to the transformPrecoderEnabled element. It should be noted that a name of the newly added field is not limited in this embodiment.

In another example, the first information may alternatively be a reference signal sent by the terminal device to the network device, and the network device may determine the number of first PTRS ports based on the received reference signal. For example, the network device may indicate the terminal device to transmit a specified reference signal on all antennas (antenna ports). Assuming that one antenna corresponds to one reference signal port, the network device may estimate phase noise experienced by a plurality of reference signal ports. If estimated phase noise on any at least two ports is in a given range, it is considered that the at least two ports share a local oscillator and correspond to one PTRS port. In this way, the network device may determine the number of first PTRS ports by collecting statistics on phase noise on all the antennas.

After determining the number of first PTRS ports, the network device may determine to-be-scheduled number of second PTRS ports based on the number of first PTRS ports. The number of second PTRS ports may be the same as the number of first PTRS ports, or may be different from the number of first PTRS ports. Further, the network device may determine a mapping layer of each PTRS port in the scheduled PTRS ports, a number of PTRSs in a PTRS group at a mapping layer, and a number of samples per PTRS group, to determine how to map the PTRS. It should be understood that the terminal device or the network device may map the PTRS to the DFT-s-OFDM symbol based on a number of second PTRS ports, a mapping layer of each PTRS port, a number of PTRSs in a PTRS group at a mapping layer, and a number of samples per PTRS group. Therefore, the number of second PTRS ports, the mapping layer of each PTRS port, the number of PTRSs in the PTRS group at the mapping layer, and the number of samples per PTRS group may be collectively referred to as mapping information of the PTRS on the DFT-s-OFDM symbol.

In this embodiment, any PTRS port may be mapped to one layer or a plurality of layers on the DFT-s-OFDM symbol. In other words, a number of mapping layers of any PTRS port may be greater than or equal to 1 and may be less than or equal to a number of scheduling layers of DFT-s-OFDM. The network device may determine, based on a requirement of PTRS overheads, to map the PTRS to which mapping layer or mapping layers on the DFT-s-OFDM symbol, to reduce the PTRS overheads as much as possible. Further, the network device may determine a PTRS pattern parameter at each mapping layer based on a requirement of PTRS complexity, for example, a number of PTRS groups and a number of samples per PTRS group, to reduce the PTRS complexity as much as possible.

After determining mapping information of the PTRS on the DFT-s-OFDM symbol, the network device may map the PTRS to the DFT-s-OFDM symbol based on the mapping information, and send the PTRS to the terminal device. Correspondingly, the terminal device may receive, from the network device based on the mapping information, the DFT-s-OFDM symbol to which the PTRS is mapped. Alternatively, the network device may send the determined mapping information to the terminal device. After receiving the mapping information, the terminal device may map the PTRS to the DFT-s-OFDM symbol based on the mapping information, and send the PTRS to the network device. Correspondingly, the network device receives, from the terminal device based on the mapping information, the DFT-s-OFDM symbol to which the PTRS is mapped. In the following description, an example in which the terminal device maps the PTRS to the DFT-s-OFDM symbol is used to describe the embodiments.

In this embodiment, mapping information that is of the PTRS on the DFT-s-OFDM symbol and that is determined by the network device varies with a number of layers to which one port is mapped. The following cases may be included.

In a first case, a number of mapping layers to which one PTRS port is mapped is 1, and a set including layers associated with the port is S. It should be understood that all layers in S share a local oscillator, that is, phase noise at all the layers is the same. The network device may select one scheduling layer from scheduling layers (scheduling layers at which phase noise is the same) that share the local oscillator, that is, the set S, as a mapping layer. In this way, the PTRS overheads may be reduced while system performance is ensured. When a number of layers included in the set S is greater than 1, data is mapped to a location corresponding to a PTRS at a layer to which the PTRS is not mapped at a scheduling layer in the set S, to improve resource utilization.

In an example, the network device may determine that a PTRS pattern parameter at the mapping layer is the same as a PTRS pattern parameter when a number of ports is 1 and a number of scheduling layers is 1. A PTRS mapping location at each mapping layer is the same as a PTRS mapping location when the number of ports is 1 and the number of scheduling layers is 1. The network device may determine to map the PTRS by using the PTRS pattern parameter shown in Table 1 and an association criterion (or a mapping relationship) between the PTRS pattern parameter and a scheduled bandwidth, which is simple.

For ease of understanding, the following describes possible PTRS pattern parameters determined by the network device with reference to the accompanying drawings. It should be noted that the following uses an example in which a PTRS pattern parameter is "4*2" when the number of ports is 1 and the number of scheduling layers is 1, that is, a number of PTRS groups is 4, and a number of samples per PTRS group is 2. It should be understood that the PTRS pattern parameter may be any pattern parameter in FIG. 4 when the number of ports is 1 and the number of scheduling layers is 1. A pattern parameter may be determined by a scheduled bandwidth threshold and the current scheduled bandwidth.

Figure 8:
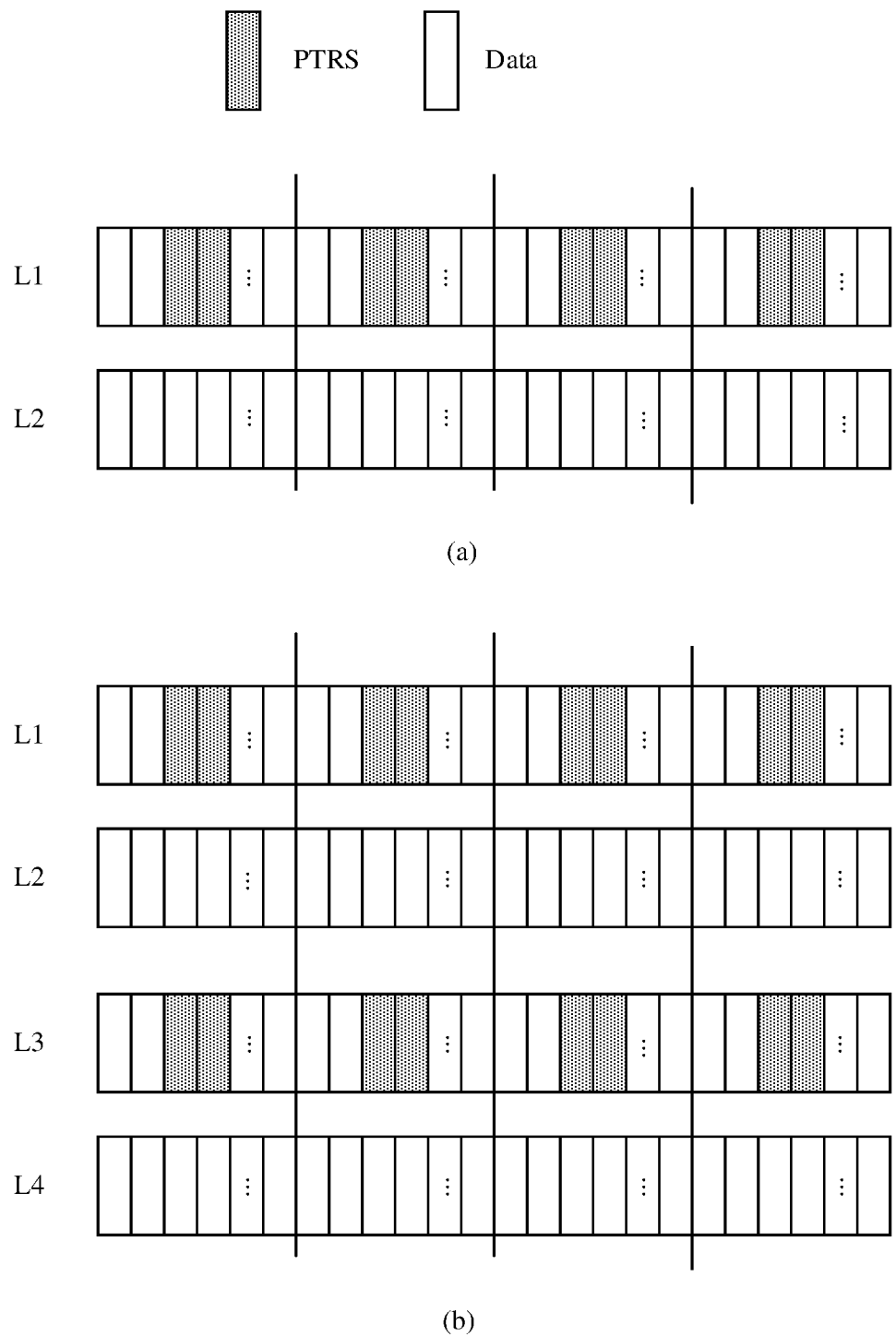
FIG. 8 is a schematic diagram of a PTRS pattern in which one PTRS port is mapped to one layer according to an embodiment.

For example, FIG. 8 is a schematic diagram of a PTRS pattern. (a) in FIG. 8 shows that two scheduling layers (L1 and L2) correspond to one PTRS port. (b) in FIG. 8 shows that four scheduling layers (L1 to L4) correspond to two PTRS ports. L1 and L2 correspond to one PTRS port, and L3 and L4 correspond to the other PTRS port. For ease of description, the PTRS port corresponding to the L1 and the L2 is referred to as a PTRS port P1, and the PTRS port corresponding to the L3 and the L4 is referred to as a PTRS port P2 below.

As shown in (a) in FIG. 8, a network device may determine to schedule one PTRS port, that is, a number of second PTRS ports is 1. The network device may determine that the PTRS port is mapped to the L1, and a PTRS pattern parameter at the L1 is the same as a PTRS pattern parameter when a number of ports is 1 and a number of scheduling layers is 1. Similarly, in (b) in FIG. 8, the network device may determine to schedule the PTRS port P1 and the PTRS port P2, and determine that the PTRS port P1 is mapped to the L1 and the PTRS port P2 is mapped to L3. A PTRS pattern parameter at the L1 and the L3 is the same as the PTRS pattern parameter when the number of ports is 1 and the number of scheduling layers is 1. Different from that a plurality of layers of CP-OFDM share one PTRS port, in this embodiment, data is mapped to a location corresponding to a PTRS at a layer to which the PTRS is not mapped at the DFT-s-OFDM scheduling layers, so that resource utilization may be improved.

In another example, the network device may determine that a PTRS pattern parameter at the mapping layer is the same as the PTRS pattern parameter when the number of ports is 1 and the number of scheduling layers is 1. A PTRS mapping location at each mapping layer is different from a PTRS mapping location when the number of scheduling layers is 1, which is flexible.

For example, a PTRS offset may be introduced in this embodiment, and the PTRS offset is relative to the PTRS mapping location when the number of ports is 1 and the number of scheduling layers is 1. For example, in some embodiments, it may be specified that a PTRS offset of a PTRS group is negative (−). In this case, the PTRS group moves toward one end (for example, left) relative to a PTRS group when the number of ports is 1 and the number of scheduling layers is 1. Relatively, a PTRS offset of a PTRS group is positive (+). In this case, the PTRS group moves toward the other end (for example, right) relative to a corresponding PTRS group when the number of scheduling layers is 1 (which is used as an example in the embodiments). The network device may determine a PTRS offset of a mapping location of each PTRS group at the mapping layer relative to a mapping location of a PTRS group when the number of ports is 1 and the number of scheduling layers is 1 and may indicate a PTRS mapping location at the mapping layer through the PTRS offset.

It should be noted that when a number of samples per PTRS group is four, as shown in FIG. 4, there are PTRS groups at both a header and a tail. In this case, an initial time domain location of each PTRS group when the number of ports is 1 and the number of scheduling layers is 1 is used as a reference. An offset at the L1 and the L3 is determined through an offset. In other words, a PTRS mapping location is moved based on the offset when the number of ports is 1 and the number of scheduling layers is 1. As a result, a mapping location of a first PTRS group or a last PTRS group on some PTRS ports disappears as a result of exceeding a symbol length of DFT-s-OFDM. That is, the first PTRS group or the last PTRS group is not mapped to the DFT-s-OFDM. As a result, a PTRS configuration between ports is unfair.

Therefore, in this embodiment, it may be specified that when there are a plurality of PTRS ports and there is a PTRS offset at a mapping location between ports, all PTRS groups are mapped to the middle of each segment, or all PTRS groups are mapped to a header of each segment, or all PTRS groups are mapped to a tail of each segment. A number of segments may be determined by a number of PTRS groups. Because the PTRS group is mapped to the middle of each segment, even if the PTRS group is moved based on the PTRS offset, it may be ensured that the first PTRS group or the last PTRS group on each PTRS port does not disappear, thereby ensuring fairness of a PTRS configuration between ports. All the PTRS groups are mapped to the header of each segment. It may be determined that the PTRS offset is positive (+) and may be similarly ensured that the first PTRS group on each PTRS port does not disappear, thereby ensuring the fairness of the PTRS configuration between ports. Similarly, all the PTRS groups are mapped to the tail of each segment. It may be determined that the PTRS offset is negative (−) and may be ensured that the last PTRS group on each PTRS port does not disappear, thereby ensuring the fairness of the PTRS configuration between ports.

It should be noted that for a reference point of the PTRS offset, the initial time domain location of each PTRS group when the number of ports is 1 and the number of scheduling layers is 1 is used as a reference. However, the reference point of the PTRS offset is not limited in this embodiment. For ease of understanding, the following describes several possible reference points of the PTRS offset with reference to FIG. 9.

Figure 9:
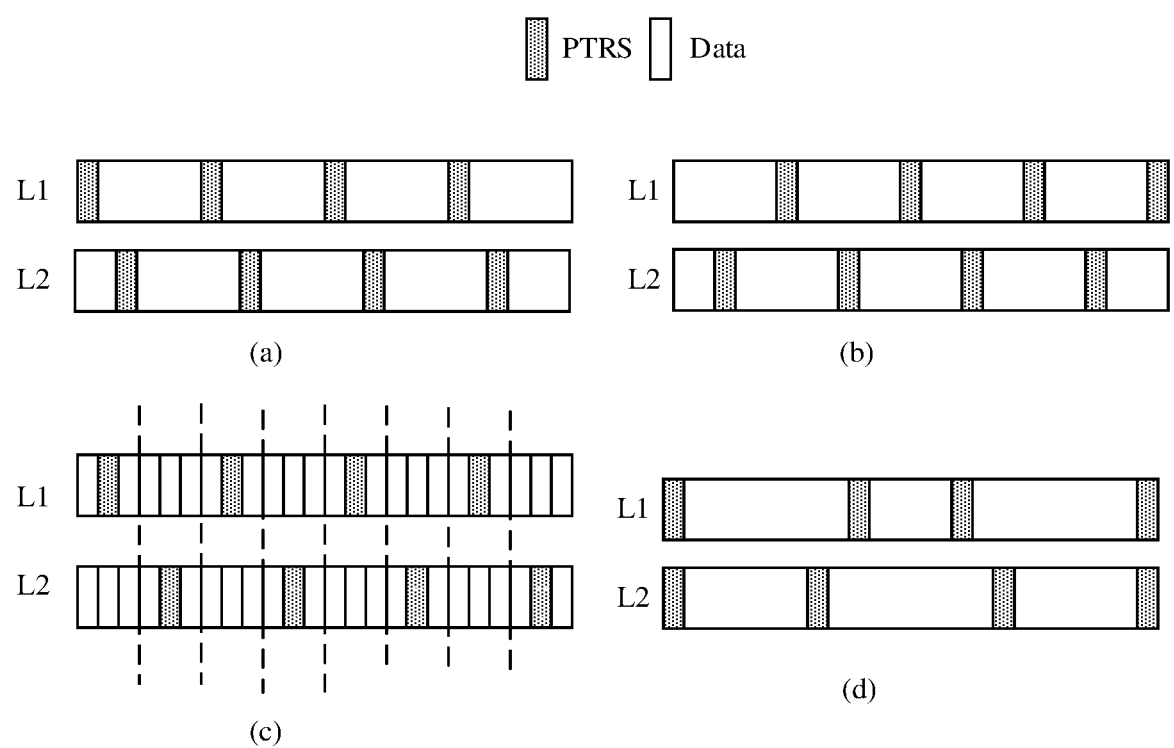
FIG. 9 is a schematic diagram of a PTRS pattern in which two PTRS ports are separately mapped to one layer according to an embodiment.

FIG. 9 is a schematic diagram of a PTRS pattern in which a number of PTRS groups is four. Each shaded part in FIG. 9 is a PTRS group, and an example in which a granularity of a PTRS offset is a size of the PTRS group is used in FIG. 9. Similar to (b) in FIG. 8, as shown in FIG. 9, four scheduling layers (L1 to L4) correspond to two PTRS ports. The L1 and the L2 correspond to a PTRS port P1, and the L3 and the L4 correspond to a PTRS port P2. The network device may determine that mapping layers are the L1 and the L3, and map data to locations of the PTRS corresponding to the L1 and the L3 at the L2 and the L4.

In an example, the PTRS offset uses a start location or an end location of a first symbol (that is, a first sample) to which a PTRS is mapped as a reference. For example, assuming that the PTRS offset is 0, mapping locations of all PTRS groups are located at a header of each segment. If a PTRS offset of each PTRS group at the L1 is 0, four PTRS groups at the L1 are respectively located at the header corresponding to each segment. A PTRS offset corresponding to each PTRS group at the L3 is greater than 0, and the PTRS offset of each PTRS group at the L3 relative to each PTRS group at the L1 is the same. In this case, a PTRS group on each segment may be moved rightward based on the PTRS offset corresponding to each PTRS group, as shown in (a) in FIG. 9.

In another example, the PTRS offset uses a start location or an end location of a last symbol (a last sample) to which the PTRS is mapped as a reference. For example, assuming that the PTRS offset is 0, the mapping locations of all the PTRS groups are located at a tail of each segment. If the PTRS offset of each PTRS group at the L1 is 0, the four PTRS groups at the L1 are separately located at the tail corresponding to each segment. The PTRS offset corresponding to each PTRS group at the L3 is less than 0, and the PTRS offset of each PTRS group at the L3 relative to each PTRS group at the L1 is the same. In this case, the PTRS group on each segment may be moved leftward based on the PTRS offset corresponding to each PTRS group, as shown in (b) in FIG. 9.

Further, a PTRS offset corresponding to any PTRS group at each mapping layer uses a mapping location of a first PTRS group when a number of ports is 1 and a number of scheduling layers is 1 as a reference. Alternatively, at different mapping layers, a PTRS offset corresponding to a PTRS group at a mapping layer uses a mapping location corresponding to a PTRS group at another mapping layer as a reference.

In still another example, a reference point of the PTRS offset is related to the number of ports. For example, all samples are divided into N*P segments, and P is a number of PTRS ports. In this case, a first PTRS port is mapped to the middle of a $(1, 1+P, 1+2P, \ldots)^{th}$ segment, and a second PTRS port is mapped to the middle of a $(2, 2+P, 2+2P, \ldots)^{th}$ segment. For example, as shown in (c) in FIGS. 9, N=4, and P=2. In this case, there are eight segments. The first PTRS port is mapped to the middle of a first segment, a third segment, a fifth segment, and a seventh segment, and a second PTRS port is mapped to the middle of a second segment, a fourth segment, a sixth segment, and an eighth segment. Alternatively, a location of each segment to which a PTRS port is mapped may be a header, a tail, or the like. This is not limited.

In an alternative solution, when the number of PTRS groups is four, an offset may be introduced only to a PTRS group mapped to the middle of each segment. A PTRS group in a first segment is still located at a header of the first segment, and a PTRS group in a last segment is still located at a tail of the last segment. Similarly, it may be ensured that a first PTRS group or a last PTRS group on each PTRS port does not disappear, thereby ensuring fairness of a PTRS configuration between ports. Further, it may be specified that an offset direction of a PTRS group adjacent to the first PTRS group points to the first PTRS group, and an offset direction of a PTRS group adjacent to the last PTRS group points to the last PTRS group, to shorten a distance between the first PTRS group and a second PTRS group, and shorten a distance between an (N−1)$^{th}$ PTRS group and an N$^{th}$ PTRS group. When a number of mapping layers of one port is 1, compared with a corresponding pattern when a number of ports is 1 and a number of scheduling layers is 1, a distance between the first PTRS group and the second PTRS group and a distance between the (N−1)$^{th}$ PTRS group and the N$^{th}$ PTRS group are shorter, so that interpolation distances between PTRS groups are more even, and interpolation performance is more stable.

As shown in (d) in FIG. 9, numbers of the PTRS groups are sequentially 1, 2, 3, and 4 from left to right. For example, the first PTRS group at the L1 is mapped to the header of the first segment, the last (namely, the fourth) PTRS group is mapped to the tail of the last segment, and other PTRS groups are mapped to the middle of the segment, which is the same as a pattern mapping manner in single-layer scheduling. A mapping location of a PTRS group at the L3 may be the same as or different from a mapping location of a PTRS group at the L1. For example, a first PTRS group at the L3 layer is mapped to the header of the first segment, and a last PTRS group is mapped to the tail of the last segment. A PTRS offset of the second PTRS group is negative, and a PTRS offset of a third PTRS group is positive. The first PTRS group and the second PTRS group may be shortened. Compared with a location of a single layer, in other words, compared with a location of the L1 layer, a distance between an (N−1)$^{th}$ PTRS group and an N$^{th}$ PTRS group is shortened. It should be noted that (d) in FIG. 9 is only an example. A value of the PTRS offset may be determined by the network device, predefined, or defaulted by the terminal device.

In a second case, the network device may determine that a number of PTRS mapping layers corresponding to one PTRS port (for example, a PTRS port P1) of a scheduled PTRS port is greater than 1, that is, map one PTRS port to a plurality of layers. In other words, a number of mapping layers of each PTRS port is greater than 1, and the number of PTRS mapping layers is less than or equal to a number of layers in a layer set S associated with the PTRS port. Same as the first case, when the number of mapping layers is less than the number of layers in the set S, data is mapped to a location corresponding to a PTRS at a layer to which the PTRS is not mapped at a scheduling layer in the set S, so that resource utilization may be improved.

When a number of PTRS mapping layers corresponding to one of the PTRS ports is greater than 1, PTRS pattern parameters at each mapping layer corresponding to the PTRS port may be the same or may be different. PTRS mapping locations at each mapping layer corresponding to the PTRS port may be the same or may be different. In other words, the PTRS pattern parameters at each mapping layer corresponding to the PTRS port are the same, and the PTRS mapping locations at each mapping layer may be the same or may be different. The PTRS pattern parameters at each mapping layer corresponding to the PTRS port are different, and the PTRS mapping locations at each mapping layer may be the same or may be different.

The network device may determine to map the PTRS port to all scheduling layers in the set S corresponding to the PTRS port. That is, the number of mapping layers is equal to a number of scheduling layers in the set S corresponding to the PTRS port. Because all mapping layers of one PTRS port have same phase noise, PTRSs are sent at all the mapping layers, so that a probability of performance deterioration caused by channel instability may be reduced.

Figure 10:
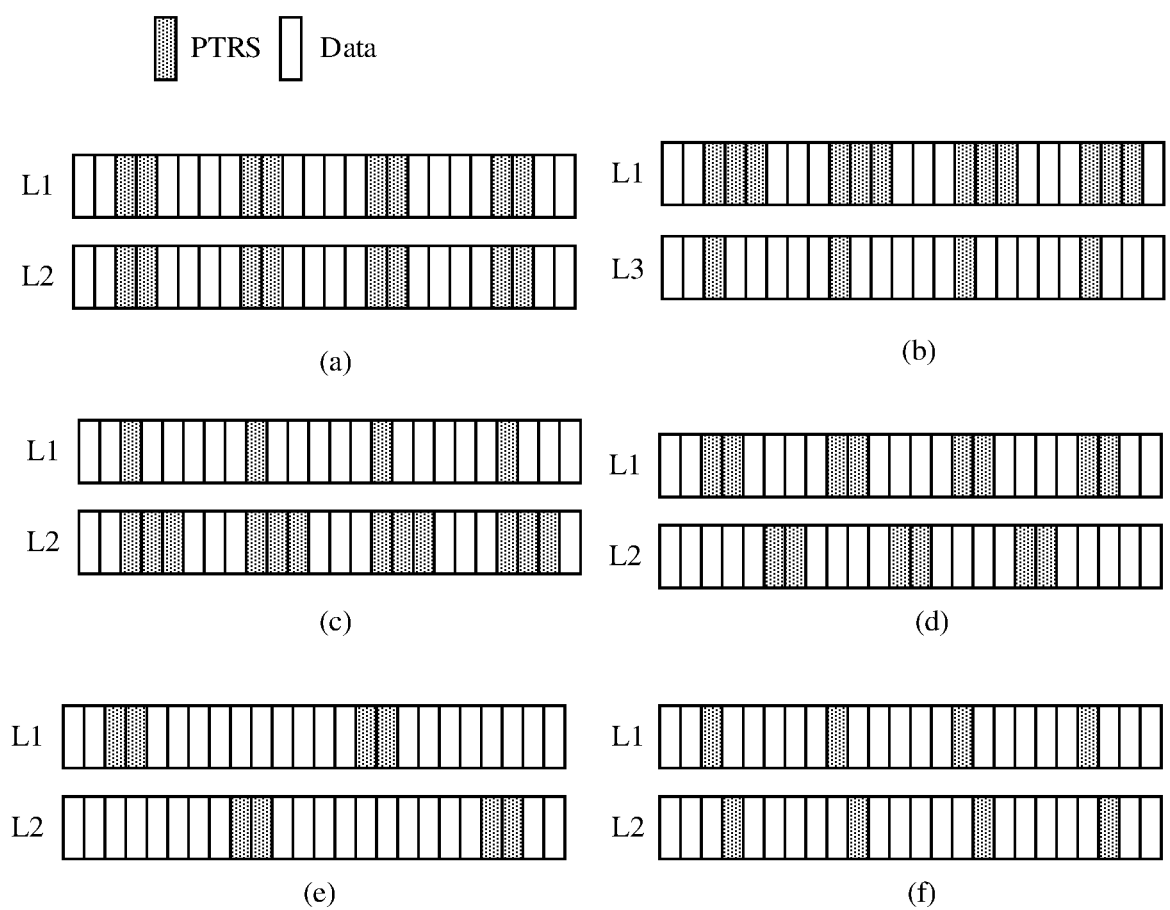
FIG. 10 is a schematic diagram of a PTRS pattern in which one PTRS port is mapped to two layers according to an embodiment.

FIG. 10 is a schematic diagram of a pattern of each mapping layer of one PTRS port. In FIG. 10, an example in which a number of scheduling layers in a set S corresponding to FIG. 10 is 2 is used, that is, S={L1, L2}. In addition, in FIG. 10, an example in which a PTRS pattern parameter includes four PTRS groups and two samples per PTRS group when a number of ports is 1 and a number of scheduling layers is 1 is used.

In an example, a PTRS mapping parameter at each mapping layer is the same as the PTRS mapping parameter when the number of ports is 1 and the number of scheduling layers is 1. A PTRS mapping location at each mapping layer is also the same as a PTRS mapping location when the number of ports is 1 and the number of scheduling layers is 1, as shown in (a) in FIG. 10. The solution may reduce the impact of channel instability on performance and has good robustness. In addition, because all mapping layers belonging to S may have the same phase noise, when a PTRS is sent, PTRSs at all the mapping layers may not need to be orthogonal. In addition, because resources that may be used for transmitting data at each mapping layer belonging to S are completely the same, that is, the resources that may be used for transmitting data are completely symmetric at each mapping layer, a mapping rule of the data is simple.

In another example, a number of PTRS groups and/or a number of samples per PTRS group that are/is mapped to each mapping layer belonging to S may be determined based on channel quality. For example, more PTRSs may be mapped to a mapping layer with good channel quality, and fewer PTRSs may be mapped to a mapping layer with poor channel quality. For example, channel quality of a first layer is higher than channel quality of a second layer, and more PTRSs may be mapped to the first layer. As shown in (b) in FIG. 10, assuming that the channel quality of the first layer (L1) is better than that of the second layer (L2), a number of samples per PTRS group mapped to the L1 is greater than a number of samples per PTRS group mapped to the L2.

It should be understood that although channel quality of a mapping layer (for example, the first layer) is good, if the channel quality of the first layer is close to an upper limit or the channel quality of the first layer is far higher than the channel quality of the second layer, increasing a number of PTRSs at the layer does not improve performance. Alternatively, after a number of PTRSs at the first layer is ensured, remaining PTRSs with same overheads may be mapped to another layer (for example, the second layer). For example, as shown in (c) in FIG. 10, assuming that a difference between the channel quality of the first layer (L1) and the channel quality of the second layer (L2) is greater than a preset positive real number, the number of samples per PTRS group mapped to the L2 is greater than the number of samples per PTRS group mapped to the L1. The solution may better reduce impact of noise, performance is more robust, and accuracy of signal noise estimation may be improved.

In still another example, a PTRS mapping parameter at each mapping layer is the same as or different from a PTRS mapping parameter when the number of ports is 1 and the number of scheduling layers is 1, and a PTRS mapping location at each mapping layer is different from a PTRS mapping location when the number of ports is 1 and the number of scheduling layers is 1, so that phase noise estimation performance may be further ensured and PTRS overheads is reduced.

For example, PTRS parameters at all the mapping layers are the same, and PTRS mapping locations at different mapping layers are different. As shown in (d) in FIG. 10, a PTRS pattern parameter at the L1 is the same as a PTRS pattern parameter when the number of ports is 1 and the number of scheduling layers is 1, and a PTRS mapping location at the L1 is the same as a PTRS mapping location when the number of ports is 1 and the number of scheduling layers is 1. A PTRS mapping parameter at the L2 is different from both a mapping parameter and a mapping location at the L1. A number of PTRS groups at the L2 is one less than that at the L1, and a PTRS mapping location at the L2 is located in the middle of two adjacent PTRS groups at the L1. In other words, the PTRS mapping location at the L2 is located at a tail of each segment and a header of a next segment.

In another example, a PTRS pattern parameter transmitted at a single layer may be separately mapped to each mapping layer in a unit of groups. For example, the PTRS pattern parameter transmitted at a single layer may be evenly mapped to each mapping layer in a unit of groups. The solution may reduce overheads. A union set of location sets at each layer is the same as a PTRS mapping location when the number of ports is 1 and the number of scheduling layers is 1. For example, a PTRS mapping layer corresponding to a PTRS port P1 includes a first layer and a second layer. In a unit of PTRS groups, odd-numbered PTRS groups are mapped to the first layer, and even-numbered PTRS groups are mapped to the second layer. If the PTRS groups cannot be evenly distributed between mapping layers, a layer to which a large number of PTRS groups are mapped may be agreed on in advance. When channel energy or an SNR of each mapping layer is close, the solution may further better improve the impact of channel instability.

As shown in (e) in FIG. 10, assuming that the number of PTRS groups transmitted at a single layer is four, and the PTRS mapping layer corresponding to the PTRS port P1 includes the first layer (L1) and the second layer (L2). Odd-numbered PTRS groups in the four PTRS groups may be mapped to the L1, and even-numbered PTRS groups may be mapped to the L2. In addition, a mapping location of a PTRS group at the L1 is the same as a mapping location of an odd-numbered PTRS group when the number of ports is 1 and the number of scheduling layers is 1, and a mapping location of a PTRS group at the L2 is the same as a mapping location of an even-numbered PTRS group when the number of ports is 1 and the number of scheduling layers is 1.

In still another example, each PTRS group when the number of mapping layers is 1 and the number of scheduling layers is 1 may be divided based on the number of mapping layers. Each PTRS group may be divided into the number of mapping layers and samples may be obtained after each PTRS group is divided are mapped to each mapping layer in a dispersive manner. A number of PTRS groups at each mapping layer is the same as the number of PTRS groups transmitted at a single layer. A sum of samples per PTRS group at each mapping layer is equal to a number of samples per PTRS group transmitted at a single layer. The solution has low overheads. When channel energy or an SNR of each mapping layer is close, the solution may further better improve the impact of channel instability. As shown in (f) in FIG. 10, assuming that the number of PTRS groups transmitted at a single layer is four, and a PTRS mapping layer corresponding to a PTRS port includes the first layer (L1) and the second layer (L2). After a mapped PTRS group is divided based on the number of PTRS mapping layers, eight PTRS groups may be obtained. In addition, a number of samples per PTRS group is half of a number of samples per PTRS group before division, and the eight PTRS groups are respectively mapped to the first layer and the second layer. It should be understood that if each PTRS group is divided into the number of mapping layers, the PTRS group may be evenly mapped to each mapping layer if possible. Otherwise, a layer to which a large number of PTRS groups are mapped may be agreed on in advance.

The foregoing describes a mapping rule of a PTRS port at a scheduling layer in a set S corresponding to the PTRS port. The following describes a mapping rule between different PTRS ports.

When the number of scheduling layers is greater than 1 and the number of PTRS ports is greater than 1, phase noise at mapping layers corresponding to different PTRS ports are different. For example, scheduling layers are L1, L2, L3, and L4, and scheduled PTRS ports are P1 and P2. A layer corresponding to P1 is S1={L1, L2}, and a layer corresponding to P2 is S2={L3, L4}. When P1 is mapped in S1, either of the foregoing two cases may be used. Mapping may be performed by selecting K layers in S1, where $1 \le K \le K_{S1}$. $K_{S1}$ represents a number of layers in S1, and data is mapped at PTRS mapping locations at K layers corresponding to $K_{S1}-K$ layers to which no PTRS is mapped, thereby improving resource utilization. A receiving end may use phase noise estimated at the K layers to compensate for phase noise of signals of all layers in S1. Similarly, any one of the foregoing two cases may be used when P2 is mapped in S2, and details are not described herein again. For different PTRS ports, PTRS pattern parameters of mapping layers of different PTRS ports may be the same or may be different, and PTRS mapping locations of the mapping layers may be the same or may be different.

For example, PTRS pattern parameters of different PTRS ports mapped to each mapping layer are the same as PTRS pattern parameters when the number of ports is 1 and the number of scheduling layers is 1. A mapping location of a PTRS at each mapping layer is the same as a mapping location of a PTRS when the number of ports is 1 and the number of scheduling layers is 1, which is simple. In another example, PTRS pattern parameters of different PTRS ports mapped to each mapping layer are the same, and mapping locations of different PTRS ports mapped to each mapping layer are the same or different, to randomize interference between PTRS ports as much as possible. Alternatively, when the number of first PTRS ports is greater than 1 and a number of second PTRS ports is greater than 1, PTRS pattern parameters of different PTRS ports mapped to each mapping layer are different, and mapping locations of different PTRS ports mapped to each mapping layer are the same or different, to reduce PTRS overheads and/or reduce PTRS mapping complexity while ensuring PTRS estimation performance.

Figure 11:
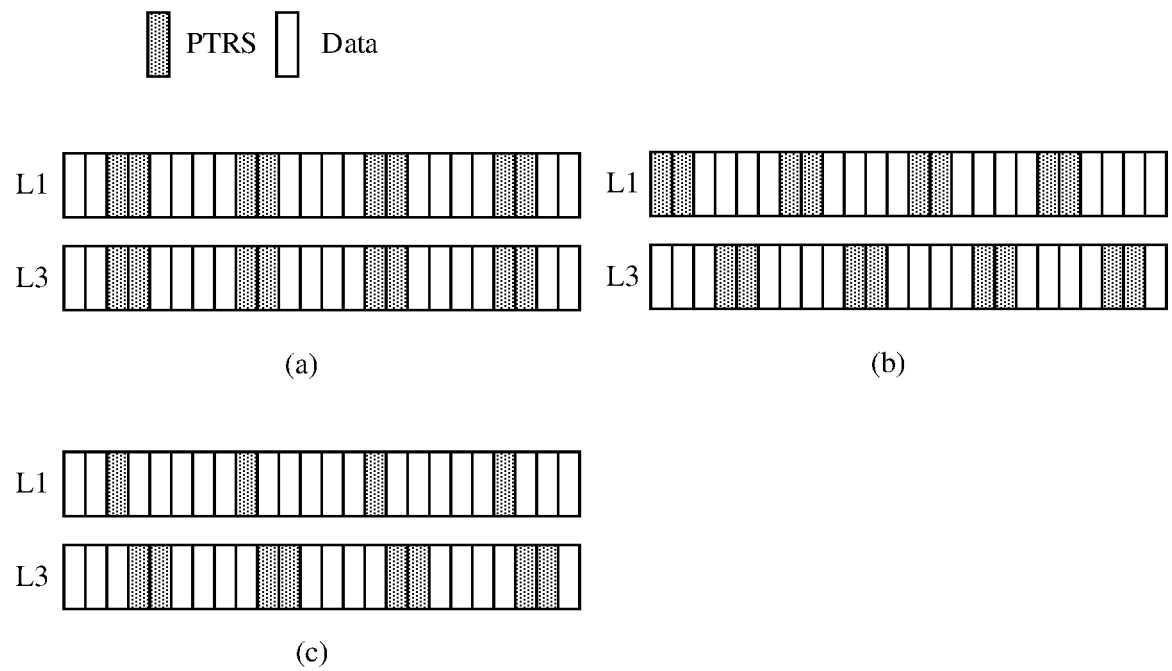
FIG. 11 is a schematic diagram of a PTRS pattern in which two PTRS ports are mapped to a plurality of layers according to an embodiment.

FIG. 11 is a schematic diagram of a pattern of mapping layers of two PTRS ports. In FIG. 11, an example in which a PTRS port P1 is mapped to L1, and a PTRS port P2 is mapped to L3 is used. In addition, in FIG. 11, an example in which a PTRS pattern parameter includes four PTRS groups and two samples per PTRS group when a number of ports is 1 and a number of scheduling layers is 1 is used.

In an example, a PTRS mapping parameter of the PTRS port P1 at the L1 and a PTRS mapping parameter of the PTRS port P2 at the L3 are the same as a PTRS mapping parameter when the number of ports is 1 and the number of scheduling layers is 1, and a PTRS mapping location at the L1 is also the same as a PTRS mapping location when the number of ports is 1 and the number of scheduling layers is 1, as shown in (a) in FIG. 11. In the solution, resources that may be used for transmitting data at each mapping layer are completely the same. That is, the resources that may be used for transmitting data are completely symmetric at each mapping layer. In this case, a mapping rule of the data is simple.

In another example, PTRS mapping parameters of different PTRS ports at a mapping layer are the same, and PTRS mapping locations at the mapping layer are different. For example, as shown in (b) in FIG. 11, the PTRS mapping parameter of the PTRS port P1 at the L1 is the same as the PTRS mapping parameter when the number of ports is 1 and the number of scheduling layers is 1. However, the PTRS mapping location at the L1 is different from the PTRS mapping location when the number of ports is 1 and the number of scheduling layers is 1. For example, a PTRS is mapped to a header of each segment at the L1. The PTRS mapping parameter of the PTRS port P2 at the L3 is the same as the PTRS mapping parameter when the number of ports is 1 and the number of scheduling layers is 1. However, the PTRS mapping location at the L3 is different from the PTRS mapping location when the number of ports is 1 and the number of scheduling layers is 1. For example, each PTRS group mapped to the L3 has an offset compared with a mapping location of a corresponding PTRS group when the number of ports is 1 and the number of scheduling layers is 1. It should be understood that (b) in FIG. 11 is only an example, and PTRS mapping locations at the L1 and the L3 are not limited in this embodiment. For example, a PTRS at the L1 may also be mapped to a tail of each segment, and the PTRS mapping location at the L3 has one PTRS offset relative to the L1.

In still another example, a number of PTRS groups mapped to a mapping layer corresponding to each port may be determined based on channel quality. For example, more PTRSs may be mapped to a mapping layer with good channel quality, and fewer PTRSs may be mapped to a mapping layer with poor channel quality. For example, as shown in (c) in FIG. 11, in the solution, PTRS pattern parameters at each mapping layer are different, and PTRSs cannot be orthogonal in sequences. Therefore, when the PTRSs are sent, mutual interference between the PTRSs at each mapping layer needs to be avoided.

In this embodiment, when a mapping layer is selected from a port association layer (a set S), a network device and a terminal device may agree on in advance or predefine, in a system, that a mapping layer to which a PTRS is mapped is which layer or layers at a scheduling layer. Alternatively, the network device may preferentially determine a mapping layer from a scheduling layer with better channel quality. For example, when the number of scheduling layers is greater than 2, the network device may select some scheduling layers with good channel quality from all scheduling layers as mapping layers. For example, there are three scheduling layers, and the three scheduling layers are respectively L1, L2, and L3. The L1, the L2, and the L3 all have a same source, and channel quality of the L1 and the L3 is good. The network device may select the L1 and the L3 as mapping layers, or may select the L1, the L2, and the L3 as mapping layers. A PTRS pattern at each mapping layer may be the same as that in the first case and/or the second case and each PTRS pattern at a mapping layer between different PTRS ports.

Further, to further reduce PTRS overheads while ensuring performance, the network device may further dynamically determine PTRS mapping information on a multi-layer DFT-s-OFDM symbol based on other parameters, for example, one or more of a scheduled bandwidth, a modulation and coding scheme (MCS), or a channel status (for example, a CQI fed back by the terminal device, an RSRP, or channel quality measured by a base station based on a sounding reference signal (SRS)).

For example, when the scheduled bandwidth is small, the network device may select a mapping layer, a PTRS pattern parameter, and a mapping location that correspond to FIG. 8 and that have fewer PTRS overheads. One port may select one layer from a set S corresponding to the port as a mapping layer. On the contrary, when a scheduled bandwidth is large, and when the number of PTRS samples in a DFT-s-OFDM symbol reaches a maximum value, the network device may select a mapping layer, a PTRS pattern parameter, and a mapping location corresponding to (a), (b), (c), or (d) in FIG. 10. In this way, the PTRS overheads may be controlled in a range.

For example, when the MCS is low, an SNR is also low, and the network device may select a mapping layer, a PTRS pattern parameter, and a mapping location that correspond to (a), (b), or (c) in FIG. 9. In this way, estimation precision may be improved, the MCS is low, and an increase in the PTRS overheads has low impact on a system throughput. On the contrary, when the MCS is high, the estimation precision is high, and the network device may select a mapping layer, a PTRS pattern parameter, and a mapping location that correspond to FIG. 8 or (e) and (f) in FIG. 10, so that phase noise estimation precision may be ensured, and the PTRS overheads may be reduced.

For example, when the channel quality of the first layer is obviously better than that of another layer, the network device may select a mapping layer, a PTRS pattern parameter, and a mapping location that correspond to FIG. 8) or (b) in FIG. 10, to reduce the PTRS overheads. When channel quality of each layer differs slightly, the network device may select a mapping layer, a PTRS pattern parameter, and a mapping location that correspond to FIG. 9, so that impact of channel instability on performance may be reduced.

Any PTRS pattern corresponding to FIG. 8 to FIG. 10 may be based on a PTRS pattern when the number of ports is 1 and the number of scheduling layers is 1. For example, a PTRS pattern when the number of ports is 1 and the number of scheduling layers is 1 may still be used. The PTRS pattern shown in FIG. 8 is the same as the PTRS pattern when the number of ports is 1 and the number of scheduling layers is 1. In another example, moving is performed between layers in a unit of PTRS groups, for example, the PTRS pattern shown in (d) in FIG. 10. In another example, moving is performed between layers in a unit of samples per PTRS group, for example, the PTRS pattern shown in (f) in FIG. 10. In this case, a PTRS pattern corresponding to each mapping layer may be shown through an association criterion similar to Table 1, that is, may be indicated through an association criterion similar to Table 1 that corresponds to each mapping layer. Alternatively, a PTRS pattern corresponding to each mapping layer may be indicated through an association criterion similar to Table 1 and a PTRS offset value.

The network device may indicate the PTRS mapping information on the DFT-s-OFDM symbol through first indication information. It should be understood that after determining the PTRS mapping information on the DFT-s-OFDM symbol, the network device may generate the first indication information, and send the first indication information to the terminal device. The terminal device receives the first indication information and may map a PTRS to the DFT-s-OFDM symbol based on mapping information indicated by the first indication information, and send the PTRS to the network device.

S702. The network device sends first indication information to the terminal device, and the terminal device receives the first indication information, where the first indication information is used for determining mapping information of a PTRS on a DFT-s-OFDM symbol, and the mapping information includes at least one of a number of second PTRS ports, a mapping layer of each PTRS port, a number of PTRS groups at a mapping layer, or a number of samples per PTRS group.

The first indication information may be carried in one or more fields of existing signaling, which helps be compatible with the existing signaling. For example, the first indication information may be carried in one or more of RRC signaling, MAC CE signaling, DCI signaling, or the like. The one or more fields may be a field defined by the RRC signaling, a field defined by the MAC CE signaling, or a field defined by the DCI signaling, or may be a newly defined RRC field, MAC CE field, or DCI field. This is not limited in this embodiment. The first indication information may also be carried in newly defined signaling. The first indication information may be sent through one piece of signaling or may be sent through a plurality of pieces of signaling. This is not limited in this embodiment.

In this embodiment, the first indication information indicates the PTRS mapping information on the DFT-s-OFDM symbol. In different implementations, for example, the first indication information may directly indicate the PTRS pattern parameter or may indirectly indicate the PTRS pattern parameter through information associated with the PTRS pattern parameter. For example, the first indication information may indicate an association criterion (for example, Table 1) corresponding to the PTRS pattern parameter, and the PTRS pattern parameter is determined based on the association criterion.

It should be understood that implementations of the first indication information may vary with PTRS patterns mapped to the DFT-s-OFDM symbol. For ease of understanding, the following describes several possible implementations of the first indication information with reference to a possible PTRS pattern mapped to the DFT-s-OFDM symbol.

In a possible implementation, the first indication information includes information about a mapping layer of each PTRS port. The first indication information may directly indicate the mapping layer of each PTRS port or may indirectly indicate the mapping layer of each PTRS port.

In an example, the first indication information may include a layer number of the mapping layer of each PTRS port. The terminal device receives the first indication information, and directly determines the mapping layer of each PTRS port based on the layer number carried in the first indication information, which is simple and clear. In a possible implementation, the first indication information may be carried in the DCI signaling, the RRC signaling, or the MAC CE signaling. The network device may carry the layer number of the mapping layer of each PTRS port through the DCI signaling, the RRC signaling, or the MAC CE signaling, and may notify the terminal device of which mapping layer or mapping layers of the DFT-s-OFDM symbol to which the PTRS is mapped.

In another example, the first indication information may include information (which may be referred to as association information for short) associated with the mapping layer of each PTRS port. In other words, the first indication information may indirectly indicate the mapping layer of each PTRS port through the association information. An implementation of the association information is not limited in this embodiment. For example, the association information may be an identifier (index) established for the mapping layer of each PTRS port or may select some scheduling parameters and/or measurement parameters which the mapping layer is based on, for example, the MCS, the scheduled bandwidth, a frequency, a subcarrier spacing, a number of scheduling layers, a demodulation reference signal (DMRS) port configuration, an SRS configuration, or the like. Which type of association information is carried in the first indication information is not limited in this embodiment. Therefore, the indication manner is flexible.

For example, the first indication information may include the identifier (index) established for the mapping layer of each PTRS port, and the first indication information may also be carried in the DCI signaling. The terminal device may receive the DCI signaling and may determine a corresponding mapping layer based on the identifier (index) carried in the first indication information.

For example, a first correspondence between one or more of parameters such as the MCS, the scheduled bandwidth, the frequency, the subcarrier spacing, the number of scheduling layers, the DMRS port configuration, or the SRS configuration and the mapping layer of each PTRS port may be predefined. The first indication information may include one or more of parameters such as the MCS, the scheduled bandwidth, the frequency, the subcarrier spacing, the number of scheduling layers, or the DMRS port configuration. The first indication information may be carried in the RRC signaling or the MAC CE signaling. After receiving the RRC signaling or the MAC CE signaling, the terminal device may determine to which layer or layers of the DFT-s-OFDM symbol the PTRS is mapped based on the parameter carried in the first indication information and the first correspondence.

It should be noted that the first indication information may alternatively not include the information about the mapping layer of each PTRS port. For example, the network device and the terminal device may predefine or may agree on in advance that which layer or layers of the DFT-s-OFDM symbol are the mapping layer of each PTRS port. In this case, even if the mapping layer of each PTRS port is not indicated through the first indication information, the terminal device and the network device may still determine which layer or layers of the DFT-s-OFDM symbol are the mapping layer of each PTRS port.

It should be understood that to map the PTRS to the DFT-s-OFDM symbol, in addition to the mapping layer of each PTRS port, the terminal device further needs to know a PTRS pattern parameter, that is, a number of PTRS groups and a number of samples per PTRS group of the PTRS at the mapping layer.

Therefore, in some embodiments, the network device and the terminal device may predefine or agree on in advance the number of PTRS groups and the number of samples per PTRS group of the PTRS at the mapping layer. For example, the number of PTRS groups and the number of samples per PTRS group may be agreed on in advance. For example, the number of PTRS groups is two, and the number of samples per PTRS group is two or four; or the number of PTRS groups is four, and the number of samples per PTRS group is one, two, or four; or the number of PTRS groups is eight, and the number of samples per PTRS group is four; or the number of PTRS groups is three, and the number of samples per PTRS group is two or four, or the like, which are not listed herein one by one. In this way, the terminal device may also map the PTRS to the DFT-s-OFDM symbol after receiving the first indication information.

In some other embodiments, the network device may indicate the PTRS pattern parameter (which may directly indicate the PTRS pattern parameter or indicate the association criterion of the PTRS pattern parameter) through the first indication information. For example, the first indication information may indicate at least one of the number of PTRS groups or the number of samples per PTRS group of the PTRS at the mapping layer. In other words, the first indication information includes the mapping layer of each PTRS port, and at least one of the number of PTRS groups or the number of samples per PTRS group. If the first indication information indicates only the number of PTRS groups, it may be considered that the number of samples per PTRS group is predefined or agreed on in advance. Similarly, if the first indication information indicates only the number of samples per PTRS group, it may be considered that the number of PTRS groups is predefined or agreed on in advance.

In a possible implementation, if the first indication information indicates both the mapping layer of each PTRS port and the PTRS pattern parameter, the first indication information may be carried in one piece of signaling, for example, the RRC signaling. Alternatively, the first indication information may be carried in a plurality of pieces of signaling. For example, information about the mapping layer of each PTRS port is carried in the DCI signaling, and the PTRS pattern parameter is carried in the RRC signaling. It should be noted that the RRC signaling and the DCI signaling herein are only used for indicating whether the first indication information is carried in one piece of signaling or a plurality of pieces of signaling. Which piece of information included in the first indication information is carried in which piece of signaling is not limited in this embodiment.

The first indication information may directly indicate the PTRS pattern parameter or may indirectly indicate the PTRS pattern parameter. The following describes several implementations in which the first indication information indicates the PTRS pattern parameter.

In a first form, the first indication information may directly indicate the PTRS pattern parameter, and the following several implementations may be included.

In an example, the first indication information may include a number N of PTRS groups and a number M of samples per PTRS group.

In another example, the first indication information may include only the number M of samples per PTRS group, to reduce signaling overheads. In this case, the terminal device and the network device may agree on or predefine the number N of PTRS groups in a system. Alternatively, the network device may indirectly indicate the number N of PTRS groups through the first indication information, for example, determine the number N of PTRS groups in another indirect manner (for example, based on the scheduled bandwidth in Table 2). After receiving the first indication information, the terminal device may determine the number N of PTRS groups and the number M of samples per PTRS group.

Similarly, the first indication information may include only the number N of PTRS groups, to reduce signaling overheads. In this case, the terminal device and the network device may agree on or predefine the number M of samples per PTRS group in a system. Alternatively, the network device may indirectly indicate the number M of samples per PTRS group through the first indication information, for example, determine the number M of samples per PTRS group in another indirect manner (for example, based on the scheduled bandwidth in Table 2). After receiving the first indication information, the terminal device may determine the number N of PTRS groups and the number M of samples per PTRS group.

In a second form, the first indication information may indirectly indicate the PTRS pattern parameter. For example, the first indication information may indicate the association criterion corresponding to the PTRS pattern parameter, for example, a correspondence between the PTRS pattern parameter and the scheduled bandwidth. The terminal device may determine the PTRS pattern parameter based on the association criterion corresponding to the PTRS pattern parameter.

It may be understood from Table 1 that the PTRS pattern parameter may be related to the scheduled bandwidth, and PTRS pattern parameters corresponding to a same scheduled bandwidth under different scheduled bandwidth thresholds are also different. Therefore, in this embodiment, the first indication information may indirectly indicate the PTRS pattern parameter through at least one scheduled bandwidth threshold. In a possible implementation, the first indication information may directly indicate the at least one scheduled bandwidth threshold or may indirectly indicate the at least one scheduled bandwidth threshold.

In an example, Table 2 shows a mapping relationship between a scheduled bandwidth applicable to multi-layer DFT-s-OFDM and a PTRS pattern parameter. A PTRS mapping rule applicable to the multi-layer DFT-s-OFDM may be indicated through Table 2. Because Table 2 may indicate a PTRS mapping rule, it may be considered that Table 2 is a mapping table (which may be referred to as an association criterion) associated with the PTRS mapping rule (the PTRS pattern parameter).

TABLE 2

Mapping relationship between a scheduled bandwidth and a PTRS pattern parameter

| Scheduled bandwidth (Scheduled bandwidth) | Number of PT-RS groups (Number of PT-RS groups) | Number of samples per PT-RS group (Number of samples per PT-RS group) |
|---|---|---|
| $N_{RB10} \leq N_{RB} < N_{RB11}$ | 2 | 2 |
| $N_{RB11} \leq N_{RB} < N_{RB12}$ | 2 | 4 |
| $N_{RB12} \leq N_{RB} < N_{RB13}$ | 4 | 2 |
| $N_{RB13} \leq N_{RB} < N_{RB14}$ | 4 | 4 |
| $N_{RB14} \leq N_{RB} < N_{RB15}$ | 8 | 4 |
| $N_{RB20} \leq N_{RB} < N_{RB21}$ | 4 | 1 |
| $N_{RB21} \leq N_{RB} < N_{RB22}$ | 3 | 4 |
| ... | ... | ... |
| $N_{RBni} \leq N_{RB} < N_{RBn(i+1)}$ | 3 | 2 |

It should be noted that in Table 2, a plurality of scheduled bandwidth thresholds, a corresponding number of PTRS groups, and a corresponding number of samples per PTRS group are extended based on Table 1. Table 2 may indicate a PTRS pattern parameter of one PTRS port mapped to one layer or may be used for indicating PTRS pattern parameters of one PTRS port mapped to a plurality of layers. For example, the scheduled bandwidth thresholds in Table 2 may be divided into a plurality of groups. For example, $[N_{RB10}, \ldots, N_{RB15}]$ is a group, which corresponds to single-layer scheduling or an association criterion of a PTRS pattern parameter when one PTRS port is mapped to a single layer, where $N_{RB10} \leq N_{RB11} \leq N_{RB12} \leq N_{RB13} \leq N_{RB14} \leq N_{RB15}$. For example, $[N_{RB20}, \ldots,]$ is a group, which corresponds to an association criterion of a PTRS pattern parameter when one PTRS port is mapped to a plurality of layers, where $N_{RB20} \leq N_{RB21} \leq N_{RB22} \leq \ldots$. It should be understood that Table 2 is only an example, and a number of scheduled bandwidth thresholds is not limited. Thresholds of different groups may be the same or different.

In addition, it should be further noted that in Table 2 only $N_{RBni} \leq N_{RB} < N_{RBn(i+1)}$ is used as an example. That is, a range limited by the scheduled bandwidth threshold is $[N_{RBni}, N_{RBn(i+1)})$. In some embodiments, a range limited by the scheduled bandwidth threshold may be $(N_{RB20}, \ldots, N_{RBn(i+1)}]$. A variant of $N_{RBni} \leq N_{RB} < N_{RBn(i+1)}$ in Table 2 is $N_{RBni} < N_{RB} \leq N_{RBn(i+1)}$. For example, in a first row in Table 2, another variant of $N_{RB10} \leq N_{RB} < N_{RB11}$ may be $N_{RB10} < N_{RB} \leq N_{RB11}$, and examples are not described herein one by one. In some other embodiments, a variant of $N_{RBni} \leq N_{RB} < N_{RBn(i+1)}$ is $N_{RBni} < N_{RB} < N_{RBn(i+1)}$, or $N_{RBni} \leq N_{RB} \leq N_{RBn(i+1)}$. An implementation of the range limited by the scheduled bandwidth threshold in Table 2 is not limited in this embodiment. An implementation of the range of the scheduled bandwidth threshold in Table 2 may include one or more of $N_{RBni} \leq N_{RB} < N_{RBn(i+1)}$, $N_{RBni} \leq N_{RB} < N_{RBn(i+1)}$, $N_{RBni} \leq N_{RB} \leq N_{RBn(i+1)}$, or $N_{RBni} < N_{RB} < N_{RBn(i+1)}$, provided that each possible bandwidth value may and may only fall within a unique interval range.

For example, the first indication information may be used for indicating the association criterion shown in Table 2. For example, the first indication information may include an identifier (index) established for Table 2, and the first indication information may be carried in RRC signaling, DCI signaling, or MAC CE signaling. The terminal device may determine a corresponding PTRS pattern parameter based on the scheduled bandwidth indicated by the network device and the association criterion shown in Table 2.

In some other embodiments, the network device may indirectly indicate the PTRS pattern parameter based on some scheduling parameters and/or measurement parameters and the scheduled bandwidth threshold.

In an example, the first indication information may include at least one scheduling parameter and/or measurement parameter (which may be referred to as a PTRS pattern association parameter for short), for example, an MCS, a scheduled bandwidth, a frequency, a subcarrier spacing, a number of scheduling layers, a DMRS port configuration, or the like. The terminal device may determine the PTRS pattern parameter based on the at least one PTRS pattern association parameter threshold and the current scheduling parameter or the measurement parameter.

For example, a correspondence between the at least one PTRS pattern association parameter and the PTRS pattern parameter may be predefined, for example, an association criterion shown in Table 3. In Table 3, an example in which the PTRS pattern association parameter includes the MCS and the scheduled bandwidth is used. The network device may determine the PTRS pattern parameter based on Table 3 and the first indication information.

TABLE 3

| Scheduled bandwidth | MCS | | | |
|---|---|---|---|---|
| | $[T_{MCS}^1, T_{MCS}^2]$ | $[T_{MCS}^2, T_{MCS}^3)$ | $[T_{MCS}^3, T_{MCS}^4)$ | $[T_{MCS}^4, T_{MCS}^5)$ |
| $[0, T_{RB}^1)$ | {0, 0} | {0, 0} | {0, 0} | {0, 0} |
| $[T_{RB}^1, T_{RB}^2)$ | {0, 0} | {$N_{22}, M_{22}$} | {$N_{23}, M_{23}$} | {$N_{24}, M_{24}$} |
| $[T_{RB}^2, T_{RB}^3)$ | {0, 0} | {$N_{32}, M_{32}$} | {$N_{33}, M_{33}$} | {$N_{34}, M_{34}$} |
| $[T_{RB}^3, T_{RB}^4)$ | {0, 0} | {$N_{42}, M_{42}$} | {$N_{43}, M_{43}$} | {$N_{44}, M_{44}$} |
| $[T_{RB}^4, T_{RB}^5)$ | {0, 0} | {$N_{52}, M_{52}$} | {$N_{53}, M_{53}$} | {$N_{54}, M_{54}$} |
| $[T_{RB}^5, +\infty)$ | {0, 0} | {$N_{62}, M_{62}$} | {$N_{63}, M_{63}$} | {$N_{64}, M_{64}$} |

In Table 3, $T_{MCS}^1$, $T_{MCS}^2$, $T_{MCS}^3$, $T_{MCS}^4$, and $T_{MCS}^5$ are MCS thresholds, and $T_{RB}^1$, $T_{RB}^2$, $T_{RB}^3$, $T_{RB}^4$, and $T_{RB}^5$ are scheduled bandwidth thresholds. $N_{22}$ to $N_{64}$ represent a number of PTRS groups, and $M_{22}$ to $M_{64}$ represent a number of samples per PTRS group. The number of PTRS groups and the number of samples per PTRS group vary with different MCS thresholds and scheduled bandwidth thresholds. For example, when the MCS threshold is $[T_{MCS}^2, T_{MCS}^3)$ and the scheduled bandwidth threshold is $[T_{RB}^2, T_{RB}^3)$ the associated number of samples per PTRS group is $M_{32}$, and the number of PTRS groups is $N_{32}$. In this embodiment, a value of the number of PTRS groups may be 1, 2, or 4, and a value of the number of samples per PTRS group may be 1, 2, 4, 8, 16, or the like. The foregoing is only an example. The value of the number of PTRS groups and the value of the number of samples per PTRS group may alternatively be other possible numbers. Examples are not described herein one by one. It should be noted that in Table 3, only an example in which the PTRS pattern association parameter is the scheduled bandwidth and the MCS is used. A number of types of PTRS pattern association parameters is not limited in this embodiment.

Similarly, similar to Table 2, it should be further noted that an implementation of a range of the MCS threshold in Table 3 and an implementation of the scheduled bandwidth threshold in Table 3 are not limited in this embodiment. $[T_{RB}^1, T_{RB}^2)$ in Table 3 is used as an example. A variant of $[T_{RB}^1, T_{RB}^2)$ may be $[T_{RB}^1, T_{RB}^2]$, or may be $(T_{RB}^1, T_{RB}^2)$ or $(T_{RB}^1, T_{RB}^2]$. $[T_{MCS}^1, T_{MCS}^2]$ in Table 3 is used as an example. A variant of $[T_{MCS}^1, T_{MCS}^2]$ may be $(T_{MCS}^1, T_{MCS}^2]$, or may be $[T_{MCS}^1, T_{MCS}^2)$ or $(T_{MCS}^1, T_{MCS}^2)$. Examples are not described herein one by one. Similarly, similar to Table 2, a range of the scheduled bandwidth threshold in Table 3 may include a plurality of implementations, that is, include one or more of $[T_{RB}^1, T_{RB}^2]$, $(T_{RB}^1, T_{RB}^2)$, $(T_{RB}^1, T_{RB}^2]$, or $[T_{RB}^1, T_{RB}^2)$. The range of the MCS threshold in Table 3 may also include a plurality of implementations, that is, include one or more of $[T_{MCS}^1, T_{MCS}^2]$, $(T_{MCS}^1, T_{MCS}^2]$, $[T_{MCS}^1, T_{MCS}^2)$, or $(T_{MCS}^1, T_{MCS}^2)$.

Table 3 shows an association criterion of the PTRS pattern parameter when single-layer scheduling is performed or one PTRS port is mapped to a single layer. The first indication information may be used for indicating the association criterion shown in Table 3. For example, the first indication information may include an identifier (index) established for Table 3, and the first indication information may be carried in RRC signaling, DCI signaling, or MAC CE signaling. The network device and the terminal device may determine a PTRS pattern parameter corresponding to a single layer based on the association criterion shown in Table 3.

For an indication of multi-layer PTRS pattern parameters, a plurality of tables similar to Table 3 may be defined in this embodiment. Each table corresponds to PTRS pattern parameters at one layer of a plurality of layers, that is, corresponds to a group of thresholds {TBi, MCSj} and/or a group of parameters {Ni, Mj}. For example, a table similar to Table 3 includes Table 3-1 and Table 3-2. Table 3-1 corresponds to a group of thresholds {TBi, MCSj} or a group of parameters {Ni, Mj}, and shows PTRS pattern parameters mapped to one layer. Table 3-2 corresponds to another group of thresholds {TBi, MCSj} or a group of parameters {Ni, Mj}, and shows PTRS pattern parameters mapped to another layer. In this case, the first indication information may be used for indicating association criteria respectively shown in a plurality of tables similar to Table 3. The foregoing example is still used. A table similar to Table 3 includes Table 3-1 and Table 3-2, the first indication information may include identifiers (indexes) established for Table 3-1 and Table 3-2, and the first indication information may be carried in the RRC signaling, the DCI signaling, or the MAC CE signaling. The network device and the terminal device may determine a corresponding PTRS pattern parameter of a PTRS mapped to a plurality of layers based on the association criteria shown in Table 3-1 and Table 3-2.

It should be understood that Table 2 may show a single-layer PTRS pattern parameter or may show a multi-layer PTRS pattern parameter. Table 3 shows only an association criterion of a single-layer PTRS pattern parameter. The PTRS may be mapped to one layer of a DFT-s-OFDM symbol or may be mapped to a plurality of layers of a DFT-s-OFDM symbol. In a possible implementation, the network device may configure a single-layer association criterion, or may configure association criteria of a plurality of mapping layers.

In an example, for each subcarrier or each frequency, the network device may indicate a set of single-layer association criteria to the terminal device. In this case, a conversion manner between a multi-layer association criterion and a single-layer association criterion may be agreed on in advance. For example, a value of a scheduled bandwidth in a dual-layer association criterion may be half of a scheduled bandwidth in the single-layer association criterion, or the scheduled bandwidth threshold in the dual-layer association criterion may be twice the scheduled bandwidth threshold in the single-layer association criterion. When the PTRS needs to be mapped to the plurality of layers of the DFT-s-OFDM symbol, the terminal device may also determine a PTRS pattern parameter based on the conversion manner. Alternatively, it may be agreed on that the dual-layer association criterion is that a PTRS pattern solution is first determined based on a single layer, and then the PTRS is sequentially mapped to each layer based on a PTRS offset between layers in a unit of PTRS groups. In the solution, because the network device needs to indicate only one set of single-layer association criteria, multi-layer mapping of the terminal device may also be implemented, thereby reducing signaling overheads.

In an implementation process, the PTRS offset may be calculated based on a predefined PTRS offset determining method. For example, in any PTRS pattern in FIG. 8 to FIG. 10, a PTRS offset of one layer relative to another layer in each PTRS pattern may be specified. Because the PTRS offset is predefined, and does not need to be additionally indicated, the signaling overheads may be reduced. Additionally, the network device may alternatively indicate a PTRS offset of PTRS mapping locations of other mapping layers relative to a single layer to the terminal device, which is more flexible.

In another example, for each subcarrier or each frequency, the network device may indicate a plurality of sets of association criteria to the terminal device, for example, include the single-layer association criterion and the multi-layer association criterion. In this way, when the terminal device needs to map the PTRS to a single layer of the DFT-s-OFDM symbol, the terminal device may map the PTRS based on the single-layer association criterion indicated by the network device. When the terminal device needs to map the PTRS to the plurality of layers of the DFT-s-OFDM symbol, the terminal device may map the PTRS based on the multi-layer association criterion indicated by the network device. In the solution, the terminal device does not need to calculate the multi-layer association criterion based on the single-layer association criterion, thereby reducing calculation burden of the terminal device.

In a possible implementation, the network device may notify, by sending the scheduled bandwidth threshold to the terminal device, the terminal device of a PTRS pattern parameter (the scheduled bandwidth threshold) configured for the terminal device. For example, the first indication information may include a group of scheduled bandwidth thresholds $[N_{RB10}, \ldots, N_{RBn(i+1)}]$ in Table 2. The group of scheduled bandwidth thresholds may be carried in sample Density in transformprecoderEnabled in PTRS-UplinkConfig carried in the RRC signaling.

In a possible implementation, the first indication information may be determined by the network device based on a threshold recommended by the terminal device. In other words, in addition to notifying the network device of a number of first PTRS ports, the terminal device may further notify the network device of a PTRS pattern parameter recommended by the terminal device for mapping the PTRS to the DFT-s-OFDM symbol, an association criterion corresponding to the PTRS pattern parameter, or the like. The network device may determine, based on the PTRS pattern parameter recommended by the terminal device or the association criterion corresponding to the PTRS pattern parameter, with reference to a system capability and/or a scheduling requirement, a final PTRS pattern parameter or an association criterion corresponding to the PTRS pattern parameter, to reduce the PTRS overheads or complexity while ensuring system performance.

S703. The terminal device sends second information to the network device, and the network device receives the second information, where the second information indicates a PTRS pattern parameter, recommended by the terminal device, of the PTRS at a mapping layer.

In this embodiment, the terminal device may notify, through the second information, the network device of the PTRS pattern parameter recommended by the terminal device or the association criterion corresponding to the PTRS pattern parameter. Each mapping layer corresponds to a group of PTRS pattern parameters (the scheduled bandwidth threshold). Similar to the first indication information, the second information may also be carried in one or more fields of existing signaling (for example, the RRC signaling and the UCI signaling). The foregoing one or more fields may be fields defined in the RRC signaling or the UCI signaling or may be newly defined RRC fields or UCI fields.

The following describes several possible implementations of the PTRS pattern parameter of the PTRS at the mapping layer recommended by the second information, that is, implementations of the second information.

Indication manner 1. The second information directly indicates the PTRS pattern parameter of the PTRS at the mapping layer.

For example, the second information may include a number N of PTRS groups and a number M of samples per PTRS group. Alternatively, the second information may include the number M of samples per PTRS group or the number N of PTRS groups, so that the signaling overheads may be reduced. When the second information may include the number M of samples per PTRS group, the terminal device and the network device may agree on or predefine the number N of PTRS groups in a system. When the second information may include the number M of samples per PTRS group or the number N of PTRS groups, the terminal device and the network device may agree on or predefine the number M of samples per PTRS group in a system.

Indication manner 2. The second information may indirectly indicate the PTRS pattern parameter. Similar to the first indication information, the second information may indicate an association criterion corresponding to the PTRS pattern parameter, for example, the association criterion shown in Table 2. The network device may determine the PTRS pattern parameter recommended by the terminal based on the association criterion corresponding to the PTRS pattern parameter.

For example, the second information may include scheduled bandwidth thresholds [$N_{RB10}, \ldots, N_{RBn(i+1)}$] in the association criterion shown in Table 2, and the second information may be carried in the RRC signaling, the DCI signaling, or the MAC CE signaling. For example, the second information carries a plurality of sample Density in ptrs-Density Recommendation Set UL in an element preferred threshold sets in Uplink PTRS density recommendation carried in the RRC signaling.

After receiving the second information, the network device may determine that one or more groups of scheduled bandwidth thresholds are [$N_{RB10}, \ldots, N_{RBn(i+1)}$]. A value of n may be 1, or may be another positive integer. The PTRS pattern parameter recommended by the terminal device may be determined based on the association criterion shown in Table 2. Then, the network device may reconfigure a PTRS parameter for the terminal device based on the PTRS pattern parameter recommended by the terminal device and with reference to system performance and a scheduling requirement. In this way, the PTRS overheads may be reduced while the system performance is ensured and the scheduling requirement is met.

Similar to the first indication information, the second information may also include at least one PTRS pattern association parameter threshold, for example, may include one or more of a phase noise model, an operating frequency, a subcarrier spacing, a number of uplink PTRS ports, a channel quality indication (CQI), or a reference signal received power (RSRP). The terminal device may select to report one or more PTRS pattern association parameter thresholds, which is flexible.

In a possible implementation, a correspondence between a PTRS pattern association parameter and the PTRS pattern parameter may be predefined, as shown in the association criterion shown in Table 3. The second information may include an MCS threshold and the scheduled bandwidth threshold in the association criterion shown in Table 3, and the second information may be carried in the RRC signaling, the UCI signaling, or the MAC CE signaling. After receiving the second information, the network device may determine the PTRS pattern parameter recommended by the terminal device based on the MCS threshold and the scheduled bandwidth threshold in the second information and the association criterion shown in Table 3. Further, the network device may re-update the PTRS parameter configured for the terminal device based on the PTRS pattern parameter recommended by the terminal device and with reference to the system performance and the scheduling requirement. In this way, the PTRS overheads may be reduced, the system performance may be ensured, and the scheduling requirement may be met.

Further, the terminal device may dynamically adjust the recommended PTRS pattern parameter (the scheduled bandwidth threshold) in real time based on channel quality, to obtain better performance.

In a possible implementation, when reporting the recommended PTRS pattern association parameter threshold, the terminal device reports one or more groups of thresholds at each subcarrier spacing and at each frequency based on a supported maximum modulation order. The maximum modulation order supported by the terminal device, as a capability of the terminal device, also needs to be reported to the network device. In this embodiment, in addition to the maximum modulation order indicating a modulation capability of the terminal device, the maximum modulation order reported by the terminal device to the network device may further include a maximum modulation order that may be correctly demodulated by the terminal device. The maximum modulation order that may be correctly demodulated is related to a waveform and a subcarrier spacing. For example, a maximum modulation order that may be correctly demodulated and that is supported by DFT-s-OFDM is greater than or equal to a maximum modulation order that may be correctly demodulated and that is supported by CP-OFDM. A larger subcarrier spacing indicates a larger supported maximum modulation order that may be correctly demodulated. As shown in Table 4, a higher frequency indicates a smaller supported maximum modulation order that may be correctly demodulated. The maximum modulation order that may be correctly demodulated may be further updated based on an update capability of a receiver of the terminal device.

In a possible implementation, the terminal device may further report the recommended PTRS pattern association parameter threshold to the network device based on the maximum modulation order that may be correctly demodulated at parameters such as a given frequency and a subcarrier spacing.

TABLE 4

| Frequency | Waveform | 60k | 120k | 240k | 480k |
|---|---|---|---|---|---|
| 28 G | DFT-s-OFDM | 64 QAM | 256 QAM | 256 QAM | 256 QAM |
| 28 G | CP-OFDM | 64 QAM | 64 QAM | 256 QAM | 256 QAM |
| 70 G | DFT-s-OFDM | 64 QAM | 64 QAM | 256 QAM | 256 QAM |
| 70 G | CP-OFDM | 64 QAM | 64 QAM | 64 QAM | 256 QAM |
| ... | | | | | |

In a possible implementation, the terminal device may further report the recommended PTRS pattern association parameter threshold to the network device based on the maximum modulation order that may be correctly demodulated at parameters such as a given frequency and a subcarrier spacing.

S704. The terminal device sends the DFT-s-OFDM symbol to which the PTRS is mapped to the network device, and the network device receives the DFT-s-OFDM symbol to which the PTRS is mapped, where a number of PTRS mapping layers is less than or equal to a number of DFT-s-OFDM scheduling layers, the number of PTRS mapping layers is greater than or equal to 1, the number of DFT-s-OFDM scheduling layers is greater than 1, and data is mapped to a location corresponding to a PTRS at a layer to which the PTRS is not mapped at the DFT-s-OFDM scheduling layers.

After receiving the first indication information, the terminal device may map the PTRS to the DFT-s-OFDM symbol based on the first indication information and may send the DFT-s-OFDM symbol to which the PTRS is mapped to the network device.

However, if the terminal directly maps the PTRS to the DFT-s-OFDM symbol based on mapping information that is on the DFT-s-OFDM symbol and that is indicated by the first indication information, PTRSs between mapping layers may interfere each other. For example, if the first indication information indicates that a number of second PTRS ports is greater than 1, and one PTRS port is mapped to a plurality of mapping layers, for example, as shown in (a) and (c) in FIG. 11. Because PTRS pattern parameters and/or PTRS mapping locations at the plurality of mapping layers are different, PTRSs at each mapping layer may interfere each other. In this case, an orthogonal cover code (OCC) may be introduced before the terminal device sends the PTRS, to avoid mutual interference between PTRSs at each mapping layer.

In some embodiments, the terminal device may superimpose the OCC on the PTRSs between mapping layers in a unit of PTRS groups, and a length of the OCC is equal to the number of samples per PTRS group. In an implementation, the OCC may be determined based on a port number of a PTRS port or a layer number of a mapping layer.

In some other embodiments, the terminal device may perform scrambling at a PTRS sequence of the mapping layer by using the layer number of the mapping layer or the port number of the PTRS port. Scrambling may be introduced to the PTRS sequence at the mapping layer, and a scrambling factor may be the layer number of the mapping layer or may be the port number of the PTRS port.

In another example, if the first indication information indicates that a number of PTRS ports is mapped to one layer, for example, a mapping layer corresponding to one PTRS port is L1 shown in (a) in FIG. 8, or mapping layers corresponding to two PTRS ports are respectively L1 and L3 shown in (b) in FIG. 8. Because a plurality of PTRS ports undertake different phase noise estimation tasks, to obtain more accurate phase noise estimation of each PTRS port, the terminal device may introduce an orthogonal cover code (OCC) before sending the PTRS. For example, the terminal device may superimpose the OCC on the PTRSs between mapping layers in a unit of PTRS groups, or scramble at the PTRS sequence of the mapping layer by using the layer number of the mapping layer or the port number of the PTRS port.

If a plurality of UEs perform transmission, interference may also exist between the plurality of UEs. In this case, a UE-ID may be further introduced into scrambling and/or a location offset between the foregoing sequences. For example, an offset is selected based on a UE-ID scrambling sequence and based on the UE-ID. Offsets corresponding to different UEs may be the same or may be different. For example, an offset set may be predefined. For example, the offset set includes four offsets. Each UE may select an offset from the offset set based on the UE-ID.

In addition, if resources that may be used for transmitting data at each mapping layer on the DFT-s-OFDM symbol indicated by the first indication information are not completely the same, the resources that may be used for transmitting data are asymmetric at each mapping layer, for example, (c) and (d) in FIG. 10. In this case, if an existing layer mapping manner is still used, for example, data is sequentially mapped to the L1 and the L2. If resources that may be used for mapping data at the L1 and the L2 are asymmetric, a transmitting end does not determine how to map data, and a receiving end cannot correctly parse which locations to which data is mapped at the L1 and the L2.

Therefore, in this embodiment, before sending the DFT-s-OFDM symbol to which the PTRS is mapped to the receiving end, the transmitting end may also calculate a resource occupied by the PTRS in a transport block size (TBS), that is, calculate the TBS based on a total number of resources of the PTRS and a total number of resources of the data. Then, the data is mapped by using a modulation symbol corresponding to the TBS, the data is punctured at a location of the PTRS at a mapping layer, and the PTRS is mapped.

In the solution, the data is punctured at the location of the PTRS at the mapping layer, so that resources for mapping data at each mapping layer may be symmetrical. Therefore, an existing layer mapping manner may be compatible. For example, a manner of performing data mapping by using a modulation symbol corresponding to a TBS is similar to a CP-OFDM multi-layer mapping manner. A to-be-transmitted DFT-s-OFDM signal at a mapping layer i and a QAM symbol before mapping or sorting may meet the following Formula (1):

$$yi = [x(i), x(i+P_0), x(i+2P_0), \ldots] \tag{1}$$

In Formula (1), yi is the to-be-transmitted DFT-s-OFDM signal at the mapping layer i, x is a data QAM symbol before mapping or sorting, a number of QAM symbols included in x is a total number of resources at all layers, and $P_0$ is a total number of scheduling layers of the UE.

Before sending the DFT-s-OFDM symbol to which the PTRS is mapped to the receiving end, the transmitting end may map data by using the modulation symbol corresponding to the TBS based on Formula (1), and then puncture the data at the location of the PTRS at the mapping layer, that is, remove a corresponding x signal or cover a corresponding x signal.

An example in which a modulation manner of the PTRS is pi/2 BPSK is used. A phase of a pi/2 BPSK modulation manner has two implementations.

In a first manner, BPSK modulation of the PTRS is first completed, PTRS mapping is completed, and then pi/2 phase shift is performed on a PTRS signal at each layer. In other words, the pi/2BPSK modulation manner includes two steps. In a first step, BPSK modulation is completed, and signal mapping for the BPSK modulation is completed. In a second step, the pi/2 phase shift is performed on a mapped signal at each layer. The pi/2 BPSK modulation manner is also applicable to data whose modulation order is pi/2 BPSK.

For example, when the data is also pi/2 BPSK modulation, the first step includes the following steps:

(1) generating a BPSK modulated data signal, that is, x(i)=BPSK signal, where i=1, and P0*Nre, where Nre=Nrb*12 is a total number of resource units on one symbol at one layer;

(2) mapping a data signal to a scheduling layer, where a signal at a $j^{th}$ layer is yj=[x(j),x(j+P0),x(j+2P0), . . . ];

(3) replacing a location that belongs to the PTRS and that is at the $j^{th}$ layer with a PTRS signal, that is, yj(k) =PTRS, where k is the location of the PTRS at the $j^{th}$ layer, and the PTRS signal is a BPSK modulation signal; and (4) completing a phase shift of pi/2 on the signal of the $j^{th}$ layer, that is:
yj(i)=yj(i)*exp(1j*pi/2*mod(i,2)) or yj(i)=yj(i)*exp (1j*pi/2*mod(i,4)), where represents an $i^{th}$ signal at the $j^{th}$ layer.

In a second manner, Pi/2 and BPSK are completed before mapping, which may include the following two cases.

In a first case, when the data modulation order is not pi/2 BPSK, there are two implementations of a phase amount of pi/2 BPSK modulation of the PTRS (assuming that a signal obtained after pi/2 BPSK modulation is q).

Manner 1: may be determined by a location of the modulated symbol in a PTRS sequence, that is:

q(k)=BPSK*exp(1j*pi/2*mod(k,2)), or q(k)=BPSK*exp (1j*pi/2*mod(k,4)), where k represents a modulation signal of a $k^{th}$ PTRS on the port.

Manner 2: may be determined by locations of the modulation symbol in the data and an overall PTRS sequence, that is:

q(k)=BPSK*exp(1j*pi/2*mod(k', 2)), or PTRS(k)=BPSK*exp(1j*pi/2*mod(k', 4)), where is an absolute location of the $k^{th}$ PTRS at a layer after mapping, and the value may be determined before mapping based on a mapping rule.

In a second case, when data modulation is pi/2 BPSK modulation, a phase amount of the pi/2 BPSK modulation of the PTRS needs to be determined by a location of the PTRS in an overall sequence at a layer to which the data and the PTRS are mapped. The modulation method is also applicable to a data modulation implementation method in multi-layer mapping without a PTRS.

For example, a location of the modulation symbol in the data and the overall PTRS sequence is:

q(k)=BPSK*exp(1j*pi/2*mod(k', 2)), or q(k)=BPSK*exp (1j*pi/2*mod(k', 4)), where k' is an absolute location of the $k^{th}$ PTRS at a layer after mapping, and the value may be determined before mapping based on the mapping rule.

The pi/2 BPSK modulation of the data is x(i)=BPSK*exp (1j*pi/2*mod(floor(i/P0),2)), or pi/2 BPSK modulation of the data is x(i)=BPSK*exp(1j*pi/2*mod(floor(i/P0),4)), where floor represents rounding down, or floor may be further replaced with ceil (rounding up).

In an alternative solution, before sending the DFT-s-OFDM symbol to which the PTRS is mapped to the receiving end, the transmitting end may sort PTRS signals and to-be-mapped x signals at all mapping layers in an order to generate a new signal sequence (which may be referred to as a first symbol sequence). That is, the TBS is obtained through calculation based on the total number of resources of the data, the PTRSs at all the scheduling layers and modulation symbols corresponding to the TBS are re-sorted based on a preset rule to generate a first symbol sequence, and the first symbol sequence is mapped to each scheduling layer. For example, symbols {k, L+k, 2L+k, ...} in the first symbol sequence are mapped to a $k^{th}$ scheduling layer, where L is a total number of scheduling layers, or PTRS signals and data signals are sorted in a unit of PTRS groups, two modulation symbols, or four modulation symbols, and are then mapped. For example, assuming that a size of a PTRS group is two, or two modulation symbols are used as a unit, in this case, a sorted signal s is $[x_1, x_2, \ldots, x_{2n-1}, x_{2n}, p_1, p_2, x_{2n+1}, x_{2n+2}, \ldots, x_{2m-1}, x_{2m}, p_3, p_4, \ldots]$, where $x_i$ is a data signal, $p_j$ is a PTRS signal, and a symbol sequence mapped to the $k_{th}$ scheduling layer is {2k−1, 2k, 2k−1+2L, 2k+2L, 2k−1+4L, 2k+4L, ...}. In the solution, because the TBS corresponding to the first sequence symbol is calculated based on the total number of resources of the data, the resource occupied by the PTRS is not used for calculating the TBS, that is, puncturing does not cause a loss of valid information, and demodulation performance is better than that in a puncturing manner.

Figure 12:
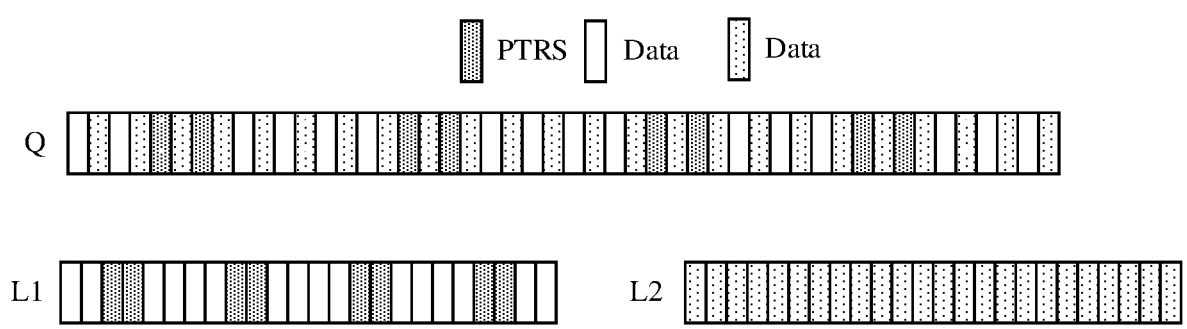
FIG. 12 is a schematic diagram of data mapping when a PTRS port is mapped to a layer according to an embodiment.

For example, FIG. 12 is a schematic diagram of layer mapping. FIG. 11 includes mapping layers L1 and L2. A PTRS is mapped to the L1, and data is mapped to the L2. A TBS may be calculated based on a total number of resources of data at the L1 and the L2, and PTRSs at all scheduling layers and modulation symbols corresponding to the TBS are re-sorted based on a preset rule to generate a first symbol sequence (for example, Q in FIG. 12). A location of the PTRS in Q may be determined in advance based on a location of the PTRS at the L1. When a CP-OFDM multi-layer mapping manner is still used, Q is mapped to each mapping layer. Because the location of the PTRS in Q is known, a data mapping location other than a PTRS mapping location in Q may also be known, so that data may be correctly parsed.

Similarly, an example in which a PTRS modulation manner is pi/2 BPSK is used. A phase of a pi/2 BPSK modulation manner has two implementations. One of the implementations is the same as the first manner, and details are not repeated herein again. A difference from the second manner is that when Pi/2 and BPSK are completed before mapping, determining of a phase amount for pi/2 BPSK modulation of the PTRS varies based on different manners in which the sorted signals are mapped layer by layer in a unit of one or two symbols. The following two manners are included.

Manner 1. When the sorted signals are mapped layer by layer in a unit of one symbol, for a PTRS modulation method, refer to the foregoing related descriptions. When the data is modulated by pi/2 BPSK, a phase amount of a signal of the data needs to be determined by a location of the data in an overall sequence at a layer to which the PTRS and the data are mapped, that is, x(i)=BPSK*exp(1j*pi/2*mod (i', 2)). i' is an absolute location of an $i^{th}$ piece of data at a layer to which the $i^{th}$ piece of data is mapped, and the value may be determined before mapping based on a mapping rule.

Manner 2. When the sorted signals are mapped layer by layer in a unit of two symbols, and a number of samples per PTRS group is an even number or an integer multiple of 4, a phase amount of the PTRS may be determined by a location of a modulation symbol corresponding to the PTRS in a PTRS sequence, that is:

q(k)=BPSK*exp(1j*pi/2*mod(k,2)), or q(k)=BPSK*exp (1j*pi/2*mod(k,4)), where k represents a modulation signal of a $k^{th}$ PTRS on the port.

A phase amount of the data may be determined by a location x(i) of the data in a data sequence, that is:

x(i)=BPSK*exp(1j*pi/2*mod(i,2)), or x(i)=BPSK*exp (1j*pi/2*mod(i,4)), where i is the $i^{th}$ piece of data before sorting.

S705. The network device completes PTRS extraction at each mapping layer, and continues phase noise estimation.

The network device may extract PTRSs at each mapping layer based on mapping information on a DFT-s-OFDM symbol indicated by first indication information, and then perform phase noise estimation based on the extracted PTRSs. Different mapping information corresponds to different phase noise estimation methods. For example, phase noise estimation may be separately performed on each mapping layer, or phase noise at all mapping layers may be averaged to obtain final phase noise estimation. For example, phase noise at all mapping layers may be linearly averaged or weighted averaged to obtain final phase noise estimation.

For example, a PTRS pattern corresponding to the first indication information is the pattern shown in FIG. 8). Because phase noise of some scheduling layers sharing a local oscillator are the same, the network device needs to perform phase noise estimation of only one mapping layer.

For example, the PTRS pattern corresponding to the first indication information is the pattern shown in (a) and (c) in FIG. 10). The terminal device needs to average the phase noise at all the mapping layers to obtain the final phase noise estimation. For example, the terminal device may perform linear averaging or weighted averaging on the phase noise at all the mapping layers to obtain the final phase noise estimation.

For example, the PTRS pattern corresponding to the first indication information is the pattern shown in (d), (e), and (f) in FIG. 10). The terminal device may separately estimate the phase noise at each mapping layer, and then combine the phase noise at each mapping layer. Because sending moments of PTRS groups at each mapping layer are different, the PTRS groups cannot be averaged. In this case, interpolation processing needs to be performed with reference to estimated values of all scheduling layers, so that accuracy of phase noise estimation may be improved. The PTRS pattern shown in (d) in FIG. 10) may shorten a distance between an $(N-1)^{th}$ PTRS group and an $N^{th}$ PTRS, thereby reducing an error introduced by interpolation and improving interpolation accuracy.

It should be noted that the terminal device sends a DFT-s-OFDM symbol to which the PTRS is mapped to the network device, and the network device extracts PTRSs at each mapping layer, and then performs phase noise estimation based on the extracted PTRSs. In some embodiments, after sending the first indication information to the terminal device, the network device may alternatively send the DFT-s-OFDM symbol to which the PTRS is mapped to the terminal device. The terminal device extracts PTRSs at each mapping layer, and then performs phase noise estimation based on the extracted PTRSs.

S706. The terminal device completes PTRS extraction at each mapping layer, and continues phase noise estimation.

The terminal device receives the DFT-s-OFDM symbol to which the PTRS is mapped, completes PTRS extraction at each mapping layer, and continues the phase noise estimation. An implementation is the same as that in which the network device completes the PTRS extraction at each mapping layer and continues the phase noise estimation. Refer to related descriptions of S705, and details are not repeated herein again.

It should be noted that a sequence of performing S705 and S706 is not limited in this embodiment. In other words, S705 may be performed before S706, and S706 may be performed before S705.

This embodiment proposes a mapping rule for mapping the PTRS to a plurality of layers of the DFT-s-OFDM symbol, so that overheads and/or complexity of the PTRS may be reduced while a system throughput is improved.

In addition, in this embodiment, in addition to configuring a PTRS pattern parameter for the terminal device, the network device may further reconfigure a modulation order and a bit rate of an MCS for the terminal. In some embodiments, the terminal device may further report highest modulation orders and/or code rates that may be supported in different waveforms or different subcarriers. For example, the terminal device may report highest modulation orders and/or bit rates corresponding to some frequencies in a CP-OFDM waveform, or the terminal device may report highest modulation orders and/or bit rates corresponding to some frequencies in a DFT-s-OFDM waveform. It should be understood that the highest modulation order and/or bit rate reported by the terminal device is a highest modulation order and/or bit rate actually supported by the terminal device at a corresponding frequency in a corresponding waveform, and is used for indicating a capability of the terminal device. For example, although the highest modulation order supported by the terminal device is 256, when a waveform is the CP-OFDM waveform and a frequency is 60 k, the highest modulation order that may be supported by the terminal device is actually 64. In this case, the highest modulation order reported by the terminal device to the network device is actually 64. The network device reconfigures the modulation order and/or the bit rate for the terminal device based on the highest modulation order and/or bit rate reported by the terminal device. In this way, an inappropriate modulation order configured for the terminal device by the network device may be prevented, thereby improving spectral efficiency.

The foregoing embodiments describe the method provided in the embodiments from a perspective of interaction between the terminal device and the network device. To implement functions in the foregoing methods provided in the embodiments, the network device and the terminal device may include a hardware structure and/or a software module and implement the foregoing functions in a form of the hardware structure, the software module, or a combination of the hardware structure and the software module. Whether one of the foregoing functions is performed in the manner of a hardware structure, a software module, or a hardware structure and a software module depends on an application.

The following describes communication apparatuses for implementing the foregoing methods in the embodiments with reference to the accompanying drawings. Therefore, all the foregoing content may be used in subsequent embodiments. Repeated content is not described again.

Figure 13:
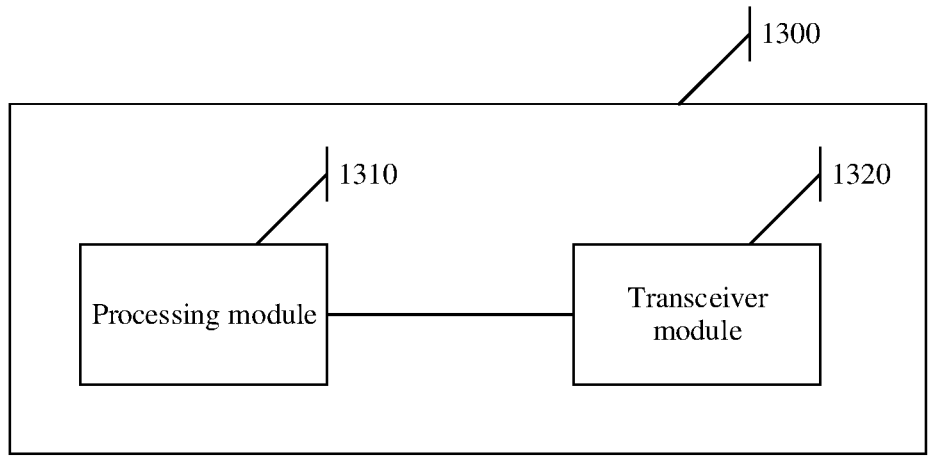
FIG. 13 is a schematic diagram of a structure of a communication apparatus according to an embodiment.

FIG. 13 is a schematic block diagram of a communication apparatus 1300 according to an embodiment. The communication apparatus 1300 may correspondingly implement functions or steps of the terminal or the network device in the foregoing method embodiments. The communication apparatus may include a processing module 1310 and a transceiver module 1320. Optionally, the communication apparatus may further include a storage unit. The storage unit may be configured to store instructions (code or a program) and/or data. The processing module 1310 and the transceiver module 1320 may be coupled to the storage unit. For example, the processing module 1310 may read instructions (code or program) and/or data in the storage unit to implement a corresponding method. The foregoing units may be disposed independently or may be partially or completely integrated.

In some possible implementations, the communication apparatus 1300 can correspondingly implement behavior and functions of the terminal device in the foregoing method embodiments. For example, the communication apparatus 1300 may be a terminal device, or may be a component (for example, a chip or a circuit) used in the terminal device. The transceiver module 1320 may be configured to perform all receiving or sending operations performed by the terminal device in the embodiment shown in FIG. 7, such as S701 to S704 in the embodiment shown in FIG. 7, and/or to support the other processes of the technology described in the embodiments. The processing module 1310 is configured to perform all operations performed by the terminal device in the embodiment shown in FIG. 7 except the receiving or sending operation, for example, S706 in the embodiment shown in FIG. 7, and/or to support the other processes of the technology described in the embodiments.

In some embodiments, the processing module 1310 is configured to generate first information, where the first information indicates a number of first PTRS ports, and the number of first PTRS ports is a number of ports recommended by the communication apparatus 1300. The transceiver module 1320 is configured to send the first information to a network device, receive first indication information from the network device, and send a DFT-s-OFDM symbol to which a PTRS is mapped to the network device, where the first indication information is used for determining mapping information of the PTRS on the DFT-s-OFDM symbol, and the mapping information includes at least one of a number of second PTRS ports scheduled by the network device, a mapping layer of each PTRS port, a number of PTRSs in a PTRS group at a mapping layer, or a number of samples per PTRS group; and a number of PTRS mapping layers is less than or equal to a number of DFT-s-OFDM scheduling layers, the number of PTRS mapping layers is greater than or equal to 1, the number of DFT-s-OFDM scheduling layers is greater than 1, and data is mapped to a location corresponding to a PTRS at a layer to which the PTRS is not mapped at the DFT-s-OFDM scheduling layers.

In some other embodiments, the processing module 1310 is configured to generate first information, where the first information indicates a number of first PTRS ports, and the number of first PTRS ports is a number of ports recommended by the communication apparatus 1300. The transceiver module 1320 is configured to send the first information to a network device, receive first indication information from the network device, and receive the DFT-s-OFDM symbol to which the PTRS is mapped from the network device, where the first indication information is used for determining mapping information of the PTRS on the DFT-s-OFDM symbol, and the mapping information includes at least one of a number of second PTRS ports scheduled by the network device, a mapping layer of each PTRS port, a number of PTRSs in a PTRS group at a mapping layer, or a number of samples per PTRS group; and a number of PTRS mapping layers is less than or equal to a number of DFT-s-OFDM scheduling layers, the number of PTRS mapping layers is greater than or equal to 1, the number of DFT-s-OFDM scheduling layers is greater than 1, and data is mapped to a location corresponding to a PTRS at a layer to which the PTRS is not mapped at the DFT-s-OFDM scheduling layers.

In an optional implementation, an OCC is superimposed on PTRSs between mapping layers in a unit of PTRS groups, and a length of the OCC is equal to a number of samples per PTRS group; or a PTRS sequence at a mapping layer is scrambled by using a layer number or a port number.

In an optional implementation, data is mapped by using a modulation symbol corresponding to a TBS, the data is punctured at a location of a PTRS at the mapping layer, and the PTRS is mapped. The TBS is obtained based on a total number of resources of the PTRS and a total number of resources of the data.

In an optional implementation, a first symbol sequence is sequentially mapped to all scheduling layers, where symbols $\{k, P_0+k, 2P_0+k, \ldots\}$ in the first symbol sequence are mapped to a $k^{th}$ scheduling layer, and $P_0$ is a total number of scheduling layers. The first symbol sequence is generated after PTRSs at all scheduling layers and modulation symbols corresponding to the TBS are re-sorted based on a preset rule, and the TBS is obtained based on the total number of resources of the data.

In an optional implementation, a number of PTRS mapping layers corresponding to a first PTRS port among PTRS ports is greater than 1, and PTRS pattern parameters at the mapping layers corresponding to the first PTRS port are different; and/or PTRS mapping locations at the mapping layers corresponding to the first PTRS port are different.

In an optional implementation, PTRS pattern parameters at a mapping layer corresponding to one PTRS port are different, and a PTRS pattern may be dynamically adjusted by using a channel status, to reduce the PTRS overheads while ensuring demodulation performance. PTRS mapping locations at the mapping layer corresponding to one PTRS port are different, so that interference of PTRSs between layers may be reduced, and estimation accuracy may be improved. Therefore, in this embodiment, the PTRS pattern parameters and the PTRS mapping locations at the mapping layer corresponding to one PTRS port may be determined based on a channel condition.

In an optional implementation, a number of samples per PTRS group mapped to a first layer is greater than a number of samples per PTRS group mapped to a second layer, a difference between channel quality of the first layer and channel quality of the second layer is greater than a preset value, and the preset value is a positive number. In the solution, the number of samples per PTRS group mapped to the first layer is greater than the number of samples per PTRS group mapped to the second layer, so that impact of noise may be better reduced, performance is more robust, and accuracy of phase noise estimation may be improved.

In an optional implementation, the PTRS mapping layers corresponding to the first PTRS port include the first layer and the second layer. A PTRS pattern parameter at the second layer is the same as a PTRS pattern parameter at the first layer, and a PTRS mapping location at the second layer is in the middle of two adjacent PTRS groups at the first layer. In the solution, for dual-layer mapping, a mapping location at one layer is agreed on to be in the middle of two adjacent PTRS groups at the other layer, so that an interpolation distance between PTRS groups may be shortened, and estimation accuracy may be improved. In addition, it is simple that a pattern parameter and a location at the second layer may be directly determined by a pattern parameter and a location at the first layer, thereby reducing complexity of PTRS pattern parameter indication signaling.

In an optional implementation, the PTRS mapping layer corresponding to the first PTRS port includes the first layer and the second layer. In a unit of PTRS groups, odd-numbered PTRS groups are mapped to the first layer, and even-numbered PTRS groups are mapped to the second layer. In the solution, it may be agreed on that the odd-numbered PTRS groups are mapped to the first layer, and the even-numbered PTRS groups are mapped to the second layer. Compared with a case in which a number of scheduling layers is 1, overheads may be reduced by at least half. In addition, a mapping rule is simple, and pattern parameters and locations at a plurality of layers may also be directly determined by existing pattern parameters, thereby reducing complexity of PTRS pattern parameter indication signaling.

In an optional implementation, the PTRS mapping layer corresponding to the first PTRS port includes the first layer and the second layer. Mapped PTRS groups are divided based on the number of PTRS mapping layers and are then mapped to the first layer and the second layer in a dispersive manner. Compared with a pattern in which a number of scheduling layers is 1, in the solution, PTRS overheads may be reduced while performance is ensured.

In an optional implementation, the first indication information further indicates an offset value of a PTRS at another layer to which the PTRS is mapped than the first layer relative to an initial time domain location of the PTRS at the first layer. In the solution, a PTRS pattern at the first layer is used as a reference, and a location of another layer relative to the PTRS pattern at the first layer is indicated through the offset value, so that various PTRS patterns may be implemented, which is flexible.

In an optional implementation, the first indication information includes a group of PTRS pattern association parameter thresholds, an association relationship between the PTRS pattern parameter and the PTRS pattern association parameter threshold is agreed on or configured in advance, and the PTRS pattern association parameter includes one or more of the following parameters: a scheduled bandwidth, a modulation and coding scheme (MCS), or channel quality. The solution provides a manner of indirectly indicating the PTRS pattern parameters. That is, the PTRS pattern parameters may be indirectly indicated through parameters associated with the PTRS pattern parameters, for example, the scheduled bandwidth, the MCS, the channel quality, or the like, thereby saving signaling overheads for notifying pattern parameters each time. In addition, the pattern parameters may dynamically change with the parameters, and are flexible.

In an optional implementation, the first indication information further includes a layer number of a PTRS mapping layer; or the first indication information further includes one or more of the following parameters: an MCS, a scheduled bandwidth, a subcarrier spacing, a number of scheduling layers, or a demodulation reference signal DMRS port configuration parameter. A correspondence between the one or more parameters and a mapping layer is predefined or pre-configured. In the solution, the first indication information may directly indicate the PTRS mapping layer. For example, the first indication information includes the layer number of the PTRS mapping layer, so that complexity of obtaining information about PTRS mapping layer by the terminal device may be reduced. Alternatively, the first indication information may indirectly indicate the PTRS mapping layer through one or more parameters, and an indication manner is more flexible.

In an optional implementation, the transceiver module 1320 is further configured to send second information to the network device. The second information includes one or more groups of PTRS pattern association parameter thresholds, and the PTRS pattern association parameter includes one or more of the following parameters: a phase noise model, an operating frequency, a subcarrier spacing, a number of uplink PTRS ports, a channel quality indication (CQI), or a reference signal received power (RSRP).

It should be understood that in this embodiment, the processing module 1310 may be implemented as a processor or a processor-related circuit component, and the transceiver module 1320 may be implemented as a transceiver or a transceiver-related circuit component, or a communication interface.

In some possible implementations, the communication apparatus 1300 can correspondingly implement behavior and functions of the network device in the foregoing method embodiments. For example, the communication apparatus 1300 may be a network device, or may be a component (for example, a chip or a circuit) used in the network device. The transceiver module 1320 may be configured to perform all receiving or sending operations performed by the network device in the embodiment shown in FIG. 7, such as S701 to S704 in the embodiment shown in FIG. 7, and/or to support the other processes of the technology described in the embodiments. The processing module 1310 is configured to perform all operations performed by the network device in the embodiment shown in FIG. 7 except the receiving or sending operation, for example, S705 in the embodiment shown in FIG. 7, and/or to support the other processes of the technology described in the embodiments.

In some embodiments, the transceiver module 1320 is configured to receive first information from a terminal device, send first indication information determined by the processing module 1310 to the terminal device, and send a DFT-s-OFDM symbol to which a PTRS is mapped to the terminal device, where the first information indicates a number of first PTRS ports, and the number of first PTRS ports is a number of ports recommended by the terminal device; the first indication information is used for determining mapping information of the PTRS on the DFT-s-OFDM symbol, and the mapping information includes at least one of a number of second PTRS ports scheduled by the network device, a mapping layer of each PTRS port, a number of PTRSs in a PTRS group at a mapping layer, or a number of samples per PTRS group; and a number of PTRS mapping layers is less than or equal to a number of DFT-s-OFDM scheduling layers, the number of PTRS mapping layers is greater than or equal to 1, the number of DFT-s-OFDM scheduling layers is greater than 1, and data is mapped to a location corresponding to a PTRS at a layer to which the PTRS is not mapped at the DFT-s-OFDM scheduling layers.

In some embodiments, the transceiver module 1320 is configured to receive first information from a terminal device, send first indication information determined by the processing module 1310 to the terminal device, and receive a DFT-s-OFDM symbol to which a PTRS is mapped from the terminal device, where the first information indicates a number of first PTRS ports, and the number of first PTRS ports is a number of ports recommended by the terminal device; the first indication information is used for determining mapping information of the PTRS on the DFT-s-OFDM symbol, and the mapping information includes at least one of a number of second PTRS ports scheduled by the network device, a mapping layer of each PTRS port, a number of PTRSs in a PTRS group at a mapping layer, or a number of samples per PTRS group; and a number of PTRS mapping layers is less than or equal to a number of DFT-s-OFDM scheduling layers, the number of PTRS mapping layers is greater than or equal to 1, the number of DFT-s-OFDM scheduling layers is greater than 1, and data is mapped to a location corresponding to a PTRS at a layer to which the PTRS is not mapped at the DFT-s-OFDM scheduling layers.

In an optional implementation, an OCC is superimposed on PTRSs between mapping layers in a unit of PTRS groups, and a length of the OCC is equal to a number of samples per PTRS group; or a PTRS sequence at a mapping layer is scrambled by using a layer number or a port number.

In an optional implementation, data is mapped by using a modulation symbol corresponding to a TBS, the data is punctured at a location of a PTRS at the mapping layer, and the PTRS is mapped. The TBS is obtained based on a total number of resources of the PTRS and a total number of resources of the data.

In an optional implementation, a first symbol sequence is sequentially mapped to all scheduling layers, where symbols $\{k, P_0+k, 2P_0+k, \ldots\}$ in the first symbol sequence are mapped to a $k^{th}$ scheduling layer, and $P_0$ is a total number of scheduling layers. The first symbol sequence is generated after PTRSs at all scheduling layers and modulation symbols corresponding to the TBS are re-sorted based on a preset rule, and the TBS is obtained based on the total number of resources of the data.

In an optional implementation, a number of PTRS mapping layers corresponding to a first PTRS port among PTRS ports is greater than 1, and PTRS pattern parameters at the mapping layers corresponding to the first PTRS port are different; and/or PTRS mapping locations at the mapping layers corresponding to the first PTRS port are different.

In an optional implementation, PTRS pattern parameters at a mapping layer corresponding to one PTRS port are different, and a PTRS pattern may be dynamically adjusted by using a channel status, to reduce the PTRS overheads while ensuring demodulation performance. PTRS mapping locations at the mapping layer corresponding to one PTRS port are different, so that interference of PTRSs between layers may be reduced, and estimation accuracy may be improved. Therefore, in this embodiment, the PTRS pattern parameters and the PTRS mapping locations at the mapping layer corresponding to one PTRS port may be determined based on a channel condition.

In an optional implementation, a number of samples per PTRS group mapped to a first layer is greater than a number of samples per PTRS group mapped to a second layer, a difference between channel quality of the first layer and channel quality of the second layer is greater than a preset value, and the preset value is a positive number. In the solution, the number of samples per PTRS group mapped to the first layer is greater than the number of samples per PTRS group mapped to the second layer, so that impact of noise may be better reduced, performance is more robust, and accuracy of phase noise estimation may be improved.

In an optional implementation, the PTRS mapping layers corresponding to the first PTRS port include the first layer and the second layer. A PTRS pattern parameter at the second layer is the same as a PTRS pattern parameter at the first layer, and a PTRS mapping location at the second layer is in the middle of two adjacent PTRS groups at the first layer. In the solution, for dual-layer mapping, a mapping location at one layer is agreed on to be in the middle of two adjacent PTRS groups at the other layer, so that an interpolation distance between PTRS groups may be shortened, and estimation accuracy may be improved. In addition, it is simple that a pattern parameter and a location at the second layer may be directly determined by a pattern parameter and a location at the first layer, thereby reducing complexity of PTRS pattern parameter indication signaling.

In an optional implementation, the PTRS mapping layer corresponding to the first PTRS port includes the first layer and the second layer. In a unit of PTRS groups, odd-numbered PTRS groups are mapped to the first layer, and even-numbered PTRS groups are mapped to the second layer. In the solution, it may be agreed on that the odd-numbered PTRS groups are mapped to the first layer, and the even-numbered PTRS groups are mapped to the second layer. Compared with a case in which a number of scheduling layers is 1, overheads may be reduced by at least half. In addition, a mapping rule is simple, and pattern parameters and locations at a plurality of layers may also be directly determined by existing pattern parameters, thereby reducing complexity of PTRS pattern parameter indication signaling.

In an optional implementation, the PTRS mapping layer corresponding to the first PTRS port includes the first layer and the second layer. Mapped PTRS groups are divided based on the number of PTRS mapping layers and are then mapped to the first layer and the second layer in a dispersive manner. Compared with a pattern in which a number of scheduling layers is 1, in the solution, PTRS overheads may be reduced while performance is ensured.

In an optional implementation, the first indication information further indicates an offset value of a PTRS at another layer to which the PTRS is mapped than the first layer relative to an initial time domain location of the PTRS at the first layer. In the solution, a PTRS pattern at the first layer is used as a reference, and a location of another layer relative to the PTRS pattern at the first layer is indicated through the offset value, so that various PTRS patterns may be implemented, which is flexible.

In an optional implementation, the first indication information includes a group of PTRS pattern association parameter thresholds, an association relationship between the PTRS pattern parameter and the PTRS pattern association parameter threshold is agreed on or configured in advance, and the PTRS pattern association parameter includes one or more of the following parameters: a scheduled bandwidth, a modulation and coding scheme MCS, or channel quality. The solution provides a manner of indirectly indicating the PTRS pattern parameters. That is, the PTRS pattern parameters may be indirectly indicated through parameters associated with the PTRS pattern parameters, for example, the scheduled bandwidth, the modulation and coding scheme MCS, the channel quality, or the like, thereby saving signaling overheads for notifying pattern parameters each time. In addition, the pattern parameters may dynamically change with the parameters, and are flexible.

In an optional implementation, the first indication information further includes a layer number of a PTRS mapping layer; or the first indication information further includes one or more of the following parameters: an MCS, a scheduled bandwidth, a subcarrier spacing, a number of scheduling layers, or a demodulation reference signal DMRS port configuration parameter. A correspondence between the one or more parameters and a mapping layer is predefined or pre-configured. In the solution, the first indication information may directly indicate the PTRS mapping layer. For example, the first indication information includes the layer number of the PTRS mapping layer, so that complexity of obtaining information about PTRS mapping layer by the terminal device may be reduced. Alternatively, the first indication information may indirectly indicate the PTRS mapping layer through one or more parameters, and an indication manner is more flexible.

In an optional implementation, the transceiver module 1320 is further configured to receive second information from the terminal device. The second information includes one or more groups of PTRS pattern association parameter thresholds, and the PTRS pattern association parameter includes one or more of the following parameters: a phase noise model, an operating frequency, a subcarrier spacing, a number of uplink PTRS ports, a channel quality indication (CQI), or a reference signal received power (RSRP).

It should be understood that in this embodiment, the processing module 1310 may be implemented as a processor or a processor-related circuit component, and the transceiver module 1320 may be implemented as a transceiver or a transceiver-related circuit component, or a communication interface.

Figure 14:
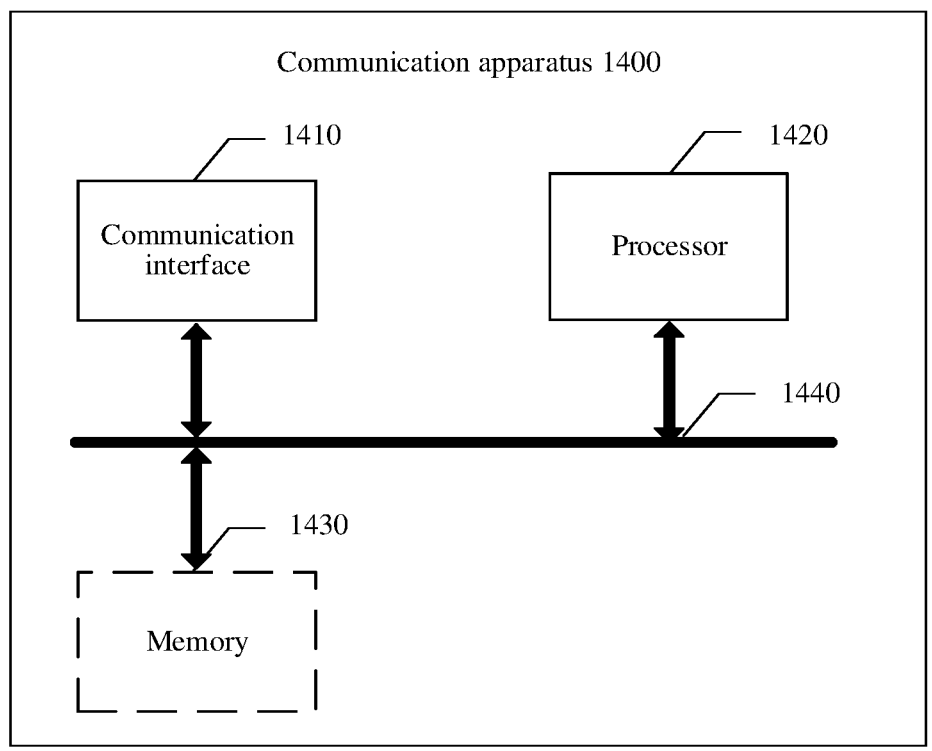
FIG. 14 is another schematic diagram of a structure of a communication apparatus according to an embodiment.

FIG. 14 shows a communication apparatus 1400 according to an embodiment. The communication apparatus 1400 may be a terminal device and may implement a function of the terminal device in the methods provided in embodiments. Alternatively, the communication apparatus 1400 may be a network device, and may implement a function of the network device in the methods provided in embodiments. Alternatively, the communication apparatus 1400 may be an apparatus that may support a terminal device to implement a corresponding function in the methods provided in embodiments or may be an apparatus that may support a network device to implement a corresponding function in the methods provided in embodiments. The communication apparatus 1400 may be a chip system. In this embodiment, the chip system may include a chip, or may include a chip and another discrete device.

In terms of hardware implementation, the transceiver module 1320 may be a transceiver, and the transceiver is integrated in the communication apparatus 1400 to form a communication interface 1410.

The communication apparatus 1400 includes at least one processor 1420, configured to implement or support the communication apparatus 1400 to implement functions of the network device or the terminal device in the method provided in this embodiment. For details, refer to detailed descriptions in the method example. Details are not described herein again.

The communication apparatus 1400 may further include at least one memory 1430, configured to store program instructions and/or data. The memory 1430 is coupled to the processor 1420. The coupling in this embodiment is indirect coupling or a communication connection between apparatuses, units, or modules for information exchange between the apparatuses, the units, or the modules, and may be in electrical, mechanical, or other forms. The processor 1420 may operate with the memory 1430 together. The processor 1420 may execute program instructions and/or data stored in the memory 1430, to cause the communication apparatus 1400 to implement a corresponding method. At least one of the at least one memory may be included in the processor. It should be noted that the memory 1430 is not mandatory, and therefore is shown by the dashed line in FIG. 14.

The communication apparatus 1400 may further include a communication interface 1410, configured to communicate with another device through a transmission medium, so that an apparatus used in the communication apparatus 1400 can communicate with the another device. For example, when the communication apparatus is a terminal device, the another device is a network device. Alternatively, when the communication apparatus is a network device, the another device is a terminal device. The processor 1420 may send and receive data through the communication interface 1410. The communication interface 1410 may be a transceiver.

A connection medium between the communication interface 1410, the processor 1420, and the memory 1430 is not limited in this embodiment. In this embodiment, in FIG. 14, the memory 1430, the processor 1420, and the communication interface 1410 are connected through a bus 1440. The bus is represented by a bold line in FIG. 14. A connection manner between other components is only an example for description and is not limited thereto. The bus may be classified into an address bus, a data bus, a control bus, and the like. For ease of representation, only one thick line is used to represent the bus in FIG. 14, but this does not mean that there is only one bus or only one type of bus.

In this embodiment, the processor 1420 may be a general purpose processor, a digital signal processor, an application-specific integrated circuit, a field programmable gate array or another programmable logic device, a discrete gate or a transistor logic device, or a discrete hardware component, and may implement or perform the methods, steps, and logical block diagrams in the embodiments. The general purpose processor may be a microprocessor or may be any conventional processor or the like. The steps of the method with reference to the embodiments may be directly performed by a hardware processor or may be performed by a combination of hardware and software modules in the processor.

In the embodiments, the memory 1430 may be a non-volatile memory, such as a hard disk drive (HDD) or a solid-state drive (SSD), or may be a volatile memory, such as a random-access memory (RAM). The memory is any other medium that can carry or store expected program code in a form of an instruction structure or a data structure and that can be accessed by a computer but is not limited thereto. The memory in this embodiment may alternatively be a circuit or any other apparatus that can implement a storage function and is configured to store program instructions and/or data.

It should be noted that the communication apparatus in the foregoing embodiment may be a terminal device, a circuit, or a chip used in the terminal device, or may be another combined component or component that has functions of the terminal device. When the communication apparatus is a terminal device, the transceiver module may be a transceiver, and may include an antenna, a radio frequency circuit, and the like. The processing module may be a processor, for example, a central processing unit (CPU). When the communication apparatus is a component that has a function of the terminal device, the transceiver module may be a radio frequency unit, and the processing module may be a processor. When the communication apparatus is a chip system, the transceiver module may be an input/output interface of the chip system, and the processing module may be a processor of the chip system.

Figure 15:
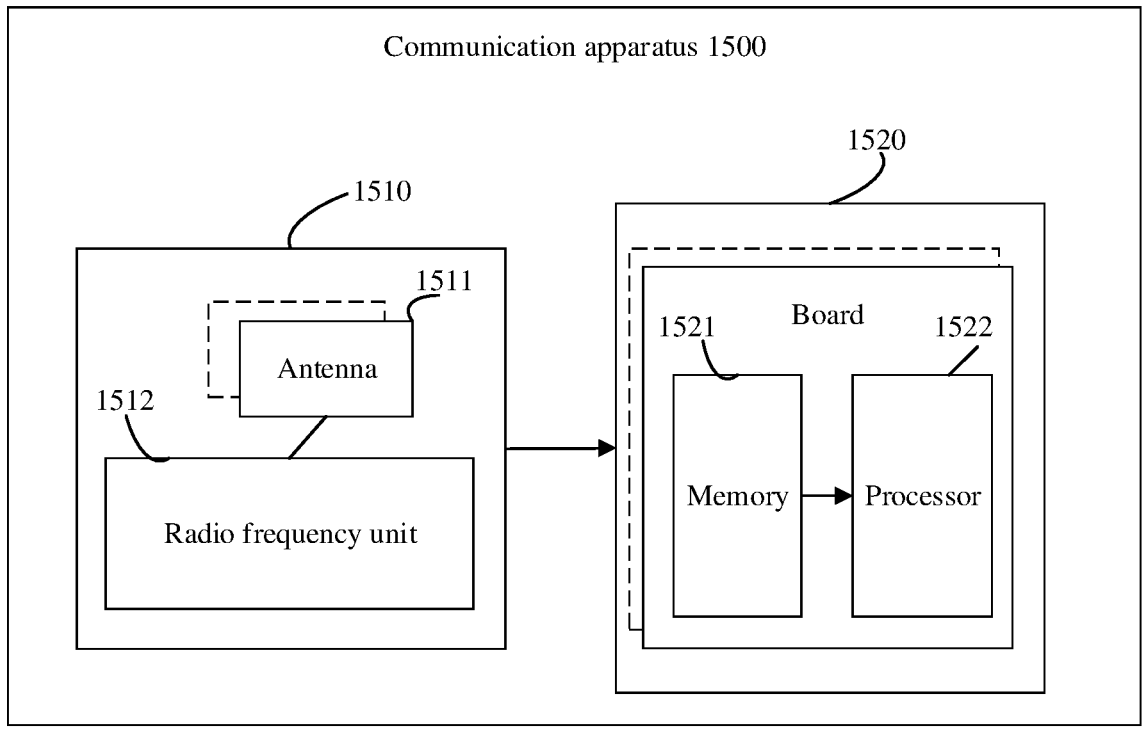
FIG. 15 is an exemplary schematic diagram of a structure of a communication apparatus according to an embodiment.

FIG. 15 is a simplified schematic diagram of a structure of a communication apparatus. For ease of understanding and ease of illustration, in FIG. 15, an example in which the communication apparatus is a base station is used. The base station may be applied to the system shown in FIG. 5, may be the network device in FIG. 5, and performs functions of the network device in the method embodiments.

The communication apparatus 1500 may include a transceiver 1510, a memory 1521, and a processor 1522. The transceiver 1510 may be used by a communication apparatus to perform communication, for example, configured to send the first indication information or receive the first information and the second information. The memory 1521 is coupled to the processor 1522 and may be used for storing programs and data necessary for the communication apparatus 1500 to implement various functions. The processor 1522 is configured to support the communication apparatus 1500 to perform corresponding functions in the method, and the functions may be implemented by invoking programs stored in the memory 1521.

The transceiver 1510 may be a wireless transceiver and may be configured to support the communication apparatus 1500 to receive and send signaling and/or data through a radio air interface. The transceiver 1510 may also be referred to as a transceiver unit or a communication unit. The transceiver 1510 may include one or more radio frequency units 1512 and one or more antennas 1511. The radio frequency unit, such as a remote radio unit (RRU) or an active antenna unit (AAU), may be configured to transmit a radio frequency signal and convert the radio frequency signal and a baseband signal. The one or more antennas may be configured to radiate and receive the radio frequency signal. Optionally, the transceiver 1510 may only include the radio frequency unit, and then the communication apparatus 1500 may include a transceiver 1510, a memory 1521, a processor 1522, and an antenna 1511.

The memory 1521 and the processor 1522 may be integrated with or independent of each other. As shown in FIG. 15, the memory 1521 and the processor 1522 may be integrated into the control unit 1520 of the communication apparatus 1500. For example, the control unit 1520 may include a baseband unit (BBU) of an LTE base station, and the baseband unit may also be referred to as a digital unit (DU). Alternatively, the control unit 1510 may include a distributed unit (DU) and/or a central unit (CU) in a base station in 5G and future radio access technologies. The control unit 1520 may include one or more antenna panels. A plurality of antenna panels may jointly support a radio access network (for example, an LTE network) of a single access standard, or may separately support radio access networks (for example, an LTE network, a 5G network, or another network) of different access standards. The memory 1521 and processor 1522 may serve one or more antenna panels. That is, the memory 1521 and the processor 1522 may be separately disposed on each antenna panel. It is also possible that a plurality of antenna panels may share the same memory 1521 and processor 1522. In addition, a necessary circuit may be disposed on each antenna panel. For example, the circuit may be configured to implement coupling between the memory 1521 and the processor 1522. The transceiver 1510, processor 1522, and memory 21 may be connected through a bus (bus) structure and/or other connection media.

Based on the structure shown in FIG. 15, when the communication apparatus 1500 needs to send data, the processor 1522 may perform baseband processing on to-be-sent data, and output a baseband signal to the radio frequency unit. The radio frequency unit performs radio frequency processing on the baseband signal, and then sends a radio frequency signal in a form of an electromagnetic wave through the antenna. When data is sent to the communication apparatus 1500, the radio frequency unit receives the radio frequency signal through the antenna, converts the radio frequency signal into a baseband signal, and outputs the baseband signal to the processor 1522. The processor 1522 converts the baseband signal into data and processes the data.

Based on the structure shown in FIG. 15, the transceiver 1510 may be configured to perform the steps performed by the transceiver module 1320, and/or, the processor 1522 may be configured to invoke instructions in the memory 1521 to perform the steps performed by the processing module 1310.

Figure 16:
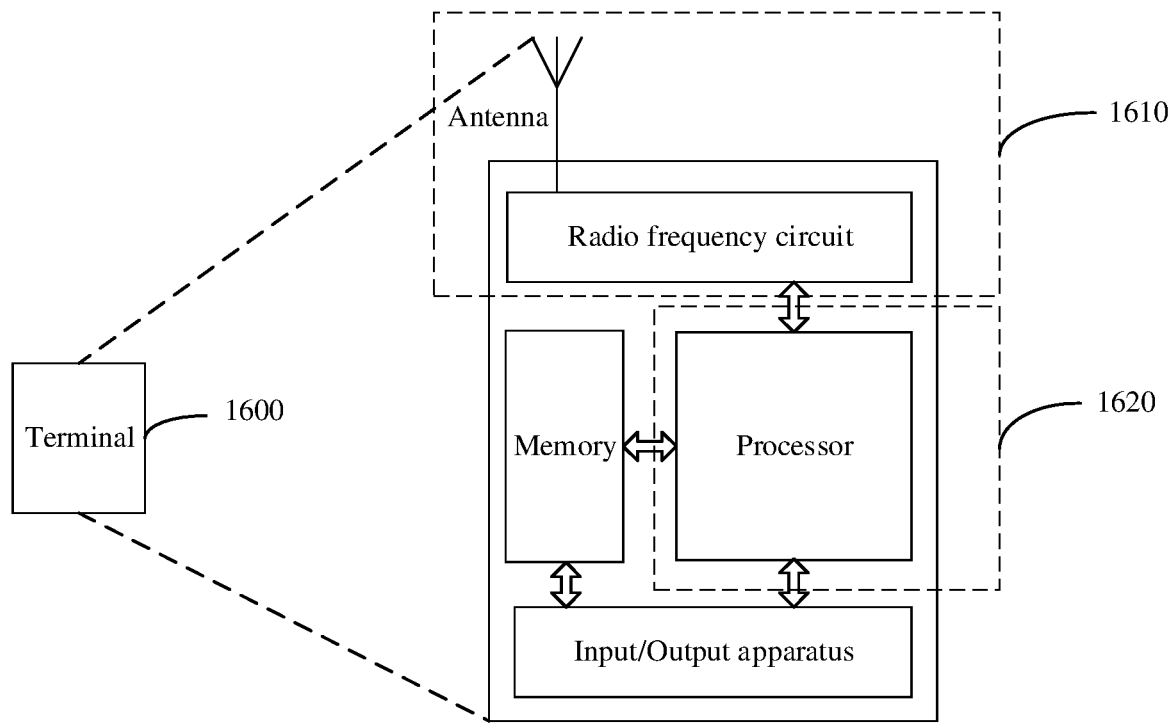
FIG. 16 is an exemplary schematic diagram of a structure of another communication apparatus according to an embodiment.

FIG. 16 is a simplified schematic diagram of a structure of a terminal. For ease of understanding and ease of illustration, in FIG. 16, a mobile phone is used as an example of the terminal 1600. As shown in FIG. 16, the terminal includes a processor, a memory, a radio frequency circuit, an antenna, and an input/output apparatus. The processor may be configured to process a communication protocol and communication data, control an on-board unit, execute a software program, and process data of the software program. The memory may be configured to store a software program and data. The radio frequency circuit may be configured to perform conversion between a baseband signal and a radio frequency signal and process the radio frequency signal. The antenna may be configured to receive and send radio frequency signals in a form of an electromagnetic wave. The input/output apparatus, for example, a touchscreen, a display, or a keyboard, may be configured to receive data entered by a user and output data to the user. It should be noted that some types of devices may have no input/output apparatus.

When data needs to be sent, the processor performs baseband processing on the to-be-sent data, and then outputs a baseband signal to the radio frequency circuit. The radio frequency circuit performs radio frequency processing on the baseband signal and then sends a radio frequency signal to the outside in a form of an electromagnetic wave through the antenna. When data is sent to the device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 16 shows only one memory and one processor. In an actual device product, there may be one or more processors and one or more memories. The memory may also be referred to as a storage medium, a storage device, or the like. The memory may be disposed independent of the processor or may be integrated with the processor. This is not limited in this embodiment.

In this embodiment, the antenna and the radio frequency circuit that have receiving and sending functions may be considered as a transceiver unit of the apparatus, and the processor having a processing function may be considered as a processing unit of the apparatus. As shown in FIG. 16, the apparatus includes a transceiver unit 1610 and a processing unit 1620. The transceiver unit 1610 may also be referred to as a transceiver, a transceiver machine, a transceiver apparatus, or the like. The processing unit 1620 may also be referred to as a processor, a processing board, a processing module, a processing apparatus, or the like. Optionally, a component that is in the transceiver unit 1610 and that is configured to implement a receiving function may be considered as a receiving unit, and a component that is in the transceiver unit 1610 and that is configured to implement a sending function may be considered as a sending unit. In other words, the transceiver unit 1610 includes the receiving unit and the sending unit. The transceiver unit 1610 sometimes may also be referred to as a transceiver machine, a transceiver, a transceiver circuit, or the like. The receiving unit sometimes may also be referred to as a receiver machine, a receiver, a receiver circuit, or the like. The sending unit may also be sometimes referred to as a transmitting machine, a transmitter, a transmit circuit, or the like.

It should be understood that the transceiver unit 1610 is configured to perform a sending operation and a receiving operation on a terminal side in the foregoing method embodiments, and the processing unit 1620 is configured to perform an operation other than the sending operation and the receiving operation on the terminal in the foregoing method embodiments.

For example, in an implementation, the transceiver unit 1610 may be configured to perform S701 to S704 in the embodiment shown in FIG. 7, and/or to support the other processes of the technology described in the embodiments.

When the communication apparatus is a chip apparatus or circuit, the apparatus may include a transceiver unit and a processing unit. The transceiver unit may be an input/output circuit and/or a communication interface. The processing unit is an integrated processor, a microprocessor, or an integrated circuit.

Figure 17:
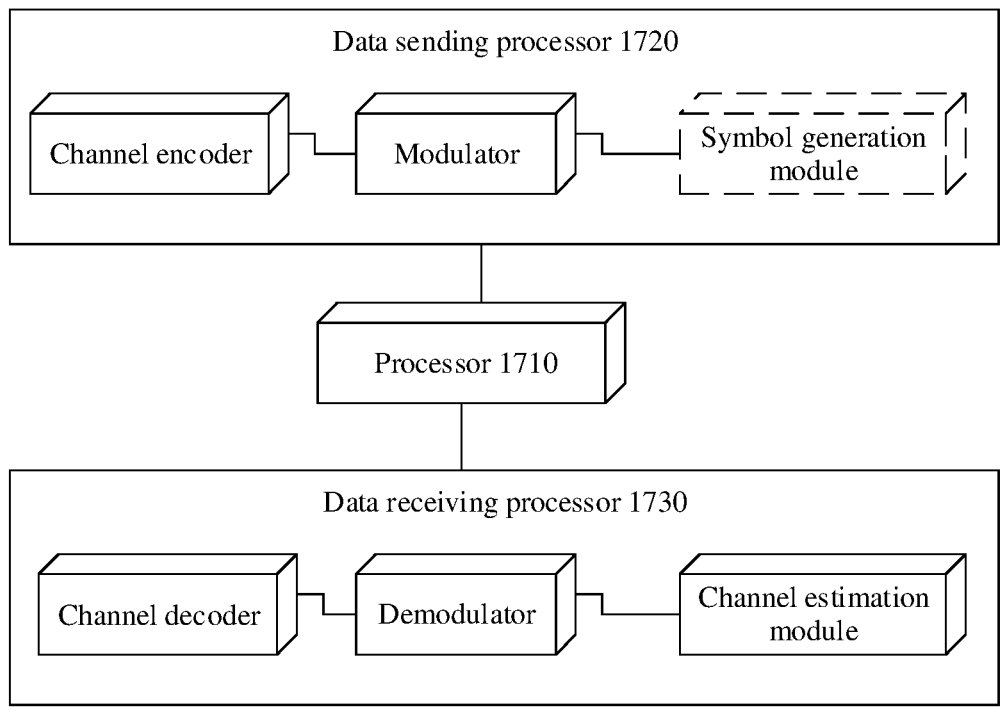
FIG. 17 is another exemplary schematic diagram of a structure of another communication apparatus according to an embodiment.

In this embodiment, reference may be made to the apparatus shown in FIG. 17. In an example, the apparatus may perform functions similar to that of the processing module 1310 in FIG. 13. In FIG. 17, the apparatus includes a processor 1710, a data sending processor 1720, and a data receiving processor 1730. The processing module 1310 in the foregoing embodiment may be the processor 1710 in FIG. 17, and completes a corresponding function. The processing module 1310 in the foregoing embodiment may be the data sending processor 1720 and/or the data receiving processor 1730 in FIG. 17. Although a channel encoder and a channel decoder are shown in FIG. 17, it may be understood that these modules are not intended to constitute limitative description of this embodiment and are only examples.

Figure 18:
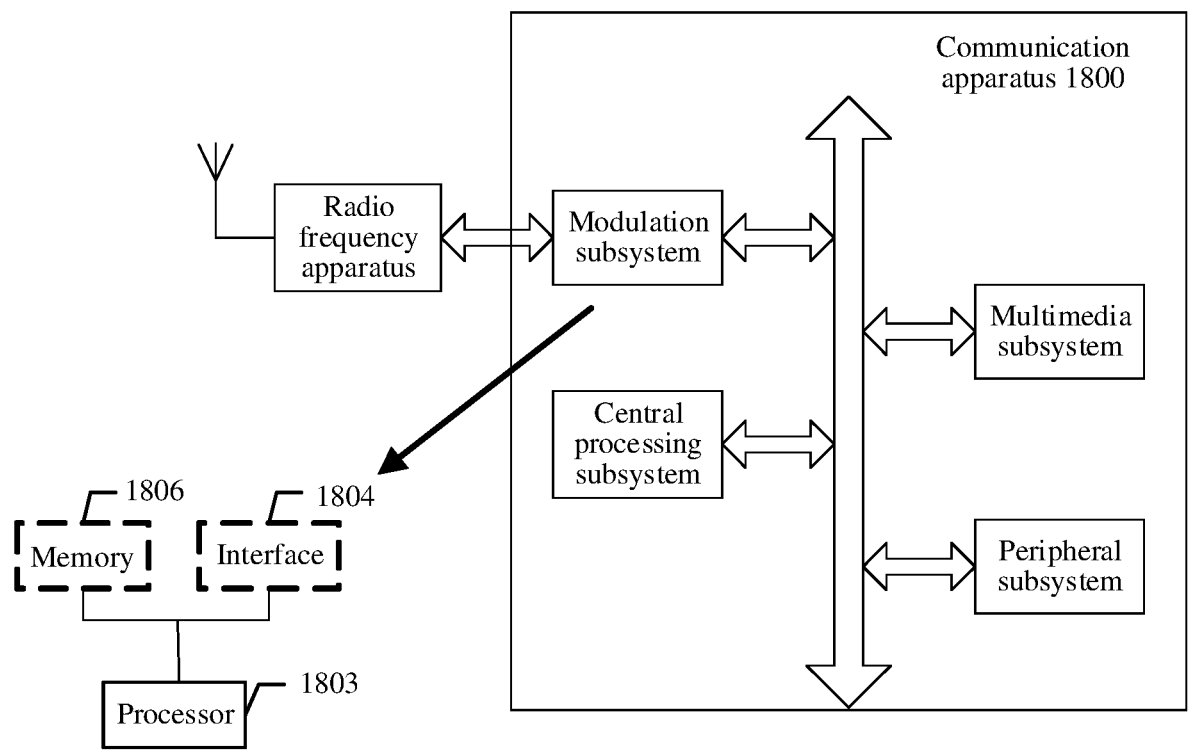
FIG. 18 is yet another exemplary schematic diagram of a structure of another communication apparatus according to an embodiment.

FIG. 18 shows another form of this embodiment. A communication apparatus 1800 includes modules such as a modulation subsystem, a central processing subsystem, and a peripheral subsystem. The communication apparatus in this embodiment may be used as the modulation subsystem. The modulation subsystem may include a processor 1803 and an interface 1804. The processor 1803 completes a function of the processing module 1310, and the interface 1804 completes a function of the transceiver module 1320. In another variant, the modulation subsystem includes a memory 1806, a processor 1803, and a program that is stored in the memory 1806 and that can run on the processor. When executing the program, the processor 1803 implements the method on the terminal in the foregoing method embodiments. It should be noted that the memory 1806 may be nonvolatile or volatile. The memory 1806 may be located in the modulation subsystem, or may be located in the communication apparatus 1800, provided that the memory 1806 can be connected to the processor 1803.

An embodiment may further provide a communication system. The communication system may include a network device and a terminal device or may further include more network devices and a plurality of terminal devices. For example, the communication system includes the network device and the terminal device that are configured to implement the related functions in FIG. 7.

The network device is separately configured to implement functions of the network part related to FIG. 7. The terminal is configured to implement functions of the terminal device related to FIG. 7. For details, refer to the related descriptions in the method embodiment. Details are not described herein again.

An embodiment may further provide a non-transitory computer-readable storage medium, including instructions. The instructions, when run on a computer, enable the computer to perform the method performed by the network device in FIG. 7; or when run on a computer, enable the computer to perform the method performed by the terminal device in FIG. 7.

An embodiment may further provide a computer program product, including instructions. The instructions, when run on a computer, enable the computer to perform the method performed by the network device in FIG. 7; or when run on a computer, enable the computer to perform the method performed by the terminal device in FIG. 7.

An embodiment may provide a chip system. The chip system includes a processor and may further include a memory. The chip system includes a processor and may further include a memory, to implement functions of the network device or the terminal in the method, or to implement functions of the network device and the terminal in the method. The chip system may include a chip or may include a chip and another discrete device. It should be understood that sequence numbers of the foregoing processes do not mean execution sequences in the embodiments. The execution sequences of the processes should be determined based on functions and internal logic of the processes and should not constitute any limitation on implementation processes of the embodiments.

In embodiments, "a plurality of" means two or more. In view of this, "a plurality of" may alternatively be understood as "at least two". "At least one" may be understood as one or more, for example, one, two, or more. For example, "include at least one" means "include one, two, or more", and there is no limitation on which is included. For example, "include at least one of A, B, and C" may mean "include A, B, or C", "include A and B, A and C, or B and C", or "include A, B, and C". The term "and/or" describes an association relationship for describing associated objects and represents that three relationships may exist. For example, A and/or B may represent the following three cases: only A exists, both A and B exist, and only B exists. In addition, unless otherwise specified, the character "/" may indicate an "or" relationship between the associated objects. The terms "system" and "network" may be used interchangeably in embodiments.

Unless otherwise specified, ordinal numbers such as "first" and "second" are used to distinguish between a plurality of objects, and are not intended to limit a sequence, a time sequence, priorities, or importance of the plurality of objects.

A person of ordinary skill in the art may be aware that, illustrative logical blocks and the steps may be implemented by electronic hardware or a combination of computer software and electronic hardware. Whether the functions are performed by hardware or software depends on particular applications. A person skilled in the art may use different methods to implement the described functions for each particular application, but it should not be considered that the implementation goes beyond the scope of the embodiments.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments, it should be understood that the system, apparatus, and method may be implemented in another manner. For example, the described apparatus embodiment is only an example. For example, division into the units is only logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units may be integrated into one processing unit, each of the units may exist alone physically, or two or more units may be integrated into one unit.

When the functions are implemented in the form of a software functional unit and sold or used as an independent product, the functions may be stored in a non-transitory computer-readable storage medium. Based on such an understanding, the embodiments may be implemented in a form of a software product. The computer software product is stored in a non-transitory storage medium and includes several instructions for instructing a computer device (which may be a personal computer, a server, or a network device) to perform all or some of the steps of the methods described in embodiments of this application. The foregoing non-transitory storage medium includes any medium that can store program code, such as a USB flash drive, a removable hard disk, a read-only memory (ROM), a random access memory (RAM), a magnetic disk, or an optical disc.

The foregoing descriptions are only implementations but are not intended to limit the scope of the embodiments. Any variation or replacement readily figured out by a person skilled in the art shall fall within the scope of the embodiments.

What is claimed is:

1. A communication apparatus, comprising a transceiver and a processor, wherein the processor is configured to generate first information, wherein the first information indicates a number of first PTRS ports, and the number of first PTRS ports is a number of ports recommended by the communication apparatus; and the transceiver is configured to send the first information to a network device, receive first indication information from the network device, and send a DFT-s-OFDM symbol to which a PTRS is mapped to the network device, wherein the first indication information is used for determining mapping information of the PTRS on the DFT-s-OFDM symbol, and the mapping information comprises at least one of a number of second PTRS ports scheduled by the network device, a mapping layer of each PTRS port, a number of PTRSs in a PTRS group at a mapping layer, or a number of samples per PTRS group; and a number of PTRS mapping layers is less than or equal to a number of DFT-s-OFDM scheduling layers, the number of PTRS mapping layers is greater than or equal to 1, the number of DFT-s-OFDM scheduling layers is greater than 1, and data is mapped to a location corresponding to a PTRS at a layer to which the PTRS is not mapped at the DFT-s-OFDM scheduling layers.

2. The communication apparatus according to claim 1, wherein the transceiver is further configured to:

send, second information to the network device, wherein the second information comprises one or more groups of PTRS pattern association parameter thresholds, and PTRS pattern association parameters comprise one or more of the following parameters:

a phase noise model, an operating frequency, the subcarrier spacing, a number of uplink PTRS ports, a channel quality indication (CQI), or a reference signal received power (RSRP).

3. The communication apparatus according to claim 1, wherein data is mapped by using a modulation symbol corresponding to a transport block size (TBS), the data is punctured at a location of the PTRS at the mapping layer, the PTRS is mapped, and the TBS is obtained based on a total number of resources of the PTRS and a total number of resources of the data; or a first symbol sequence is sequentially mapped to all scheduling layers, wherein symbols $\{k, P_0+k, 2P_0+k, \ldots\}$ in the first symbol sequence are mapped to a $k^{th}$ scheduling layer, $P_0$ is a total number of scheduling layers, the first symbol sequence is generated after PTRSs at all the scheduling layers and the modulation symbol corresponding to the TBS are re-sorted based on a preset rule, and the TBS is obtained based on the total number of resources of the data.

4. The communication apparatus according to claim 1, wherein a number of PTRS mapping layers corresponding to the first PTRS port among PTRS ports is greater than 1, and PTRS pattern parameters at the mapping layers corresponding to the first PTRS port are different; and/or PTRS mapping locations at the mapping layers corresponding to the first PTRS port are different.

5. The communication apparatus according to claim 1, wherein a number of samples per PTRS group mapped to a first layer is greater than a number of samples per PTRS group mapped to a second layer, a difference between channel quality of the first layer and channel quality of the second layer is greater than a preset value, and the preset value is a positive number.

6. The communication apparatus according to claim 5, wherein the PTRS mapping layers corresponding to the first PTRS port comprise a first layer and a second layer, wherein a PTRS pattern parameter at the second layer is the same as a PTRS pattern parameter at the first layer, and a PTRS mapping location at the second layer is located in the middle of two adjacent PTRS groups at the first layer.

7. The communication apparatus according to claim 5, wherein the PTRS mapping layers corresponding to the first PTRS port comprise a first layer and a second layer, and in a unit of PTRS groups, odd-numbered PTRS groups are mapped to the first layer, and even-numbered PTRS groups are mapped to the second layer.

8. The communication apparatus according to claim 5, wherein the PTRS mapping layers corresponding to the first PTRS port comprise a first layer and a second layer, and after being divided based on the number of PTRS mapping layers, mapped PTRS groups are mapped to the first layer and the second layer in a dispersive manner.

9. The communication apparatus according to claim 5, wherein the first indication information further indicates an offset value of a PTRS at another layer to which the PTRS is mapped than the first layer relative to an initial time domain location of the PTRS at the first layer.

10. The communication apparatus according to claim 1, wherein the first indication information comprises a group of PTRS pattern association parameter thresholds, an association relationship between PTRS pattern parameters and the PTRS pattern association parameter thresholds is agreed on or configured in advance, and PTRS pattern association parameters comprise one or more of the following parameters:

a scheduled bandwidth, a modulation and coding scheme MCS, or channel quality.

11. A communication apparatus, comprising a transceiver and a processor, wherein the transceiver is configured to receive first information from a terminal device, send first indication information determined by the processor to the terminal device, and receive a DFT-s-OFDM symbol to which a PTRS is mapped from the terminal device, wherein the first information indicates a number of first PTRS ports, and the number of first PTRS ports is a number of ports recommended by the terminal device; the first indication information is used for determining mapping information of the PTRS on the DFT-s-OFDM symbol, and the mapping information comprises at least one of a number of second PTRS ports scheduled by the network device, a mapping layer of each PTRS port, a number of PTRSs in a PTRS group at a mapping layer, or a number of samples per PTRS group; and a number of PTRS mapping layers is less than or equal to a number of DFT-s-OFDM scheduling layers, the number of PTRS mapping layers is greater than or equal to 1, the number of DFT-s-OFDM scheduling layers is greater than 1, and data is mapped to a location corresponding to a PTRS at a layer to which the PTRS is not mapped at the DFT-s-OFDM scheduling layers.

12. The communication apparatus according to claim 11, wherein the transceiver is further configured to:
send, second information to the network device, wherein the second information comprises one or more groups of PTRS pattern association parameter thresholds, and PTRS pattern association parameters comprise one or more of the following parameters:
a phase noise model, an operating frequency, the subcarrier spacing, a number of uplink PTRS ports, a channel quality indication (CQI), or a reference signal received power (RSRP).

13. The communication apparatus according to claim 11, wherein data is mapped by using a modulation symbol corresponding to a transport block size (TBS), the data is punctured at a location of the PTRS at the mapping layer, the PTRS is mapped, and the TBS is obtained based on a total number of resources of the PTRS and a total number of resources of the data; or
a first symbol sequence is sequentially mapped to all scheduling layers, wherein symbols $\{k, P_0+k, 2P_0+k, \ldots\}$ in the first symbol sequence are mapped to a $k^{th}$ scheduling layer, $P_0$ is a total number of scheduling layers, the first symbol sequence is generated after PTRSs at all the scheduling layers and the modulation symbol corresponding to the transport block size-TBS are re-sorted based on a preset rule, and the TBS is obtained based on the total number of resources of the data.

14. The communication apparatus according to claim 11, wherein a number of PTRS mapping layers corresponding to the first PTRS port among PTRS ports is greater than 1, and PTRS pattern parameters at the mapping layers corresponding to the first PTRS port are different; and/or PTRS mapping locations at the mapping layers corresponding to the first PTRS port are different.

15. The communication apparatus according to claim 14, wherein a number of samples per PTRS group mapped to a first layer is greater than a number of samples per PTRS group mapped to a second layer, a difference between channel quality of the first layer and channel quality of the second layer is greater than a preset value, and the preset value is a positive number.

16. The communication apparatus according to claim 14, wherein the PTRS mapping layers corresponding to the first PTRS port comprise a first layer and a second layer, wherein
a PTRS pattern parameter at the second layer is the same as a PTRS pattern parameter at the first layer, and a PTRS mapping location at the second layer is located in the middle of two adjacent PTRS groups at the first layer.

17. The communication apparatus according to claim 14, wherein the PTRS mapping layers corresponding to the first PTRS port comprise a first layer and a second layer, and in a unit of PTRS groups, odd-numbered PTRS groups are mapped to the first layer, and even-numbered PTRS groups are mapped to the second layer.

18. The communication apparatus according to claim 14, wherein the PTRS mapping layers corresponding to the first PTRS port comprise a first layer and a second layer, and after being divided based on the number of PTRS mapping layers, mapped PTRS groups are mapped to the first layer and the second layer in a dispersive manner.

19. The communication apparatus according to claim 14, wherein the first indication information further indicates an offset value of a PTRS at another layer to which the PTRS is mapped than the first layer relative to an initial time domain location of the PTRS at the first layer.

20. The communication apparatus according to claim 11, wherein the first indication information comprises a group of PTRS pattern association parameter thresholds, an association relationship between PTRS pattern parameters and the PTRS pattern association parameter thresholds is agreed on or configured in advance, and PTRS pattern association parameters comprise one or more of the following parameters:
a scheduled bandwidth, a modulation and coding scheme (MCS), or channel quality.

* * * * *

UNITED STATES PATENT AND TRADEMARK OFFICE
CERTIFICATE OF CORRECTION

PATENT NO. : 12,407,469 B2  
APPLICATION NO. : 18/170041  
DATED : September 2, 2025  
INVENTOR(S) : Fengwei Liu et al.

Page 1 of 1

It is certified that error appears in the above-identified patent and that said Letters Patent is hereby corrected as shown below:

In the Claims

Column 57, Claim 2, Line 38, please remove "," so the line reads as "send second information to the network device, wherein".

Column 59, Claim 12, Line 5, please remove "," so the line reads as "send second information to the network device, wherein".

Column 59, Claim 13, Line 27, please delete "transport block size-" so the line reads as "symbol corresponding to the TBS".

Signed and Sealed this  
Tenth Day of February, 2026

John A. Squires  
*Director of the United States Patent and Trademark Office*